Figure 1:
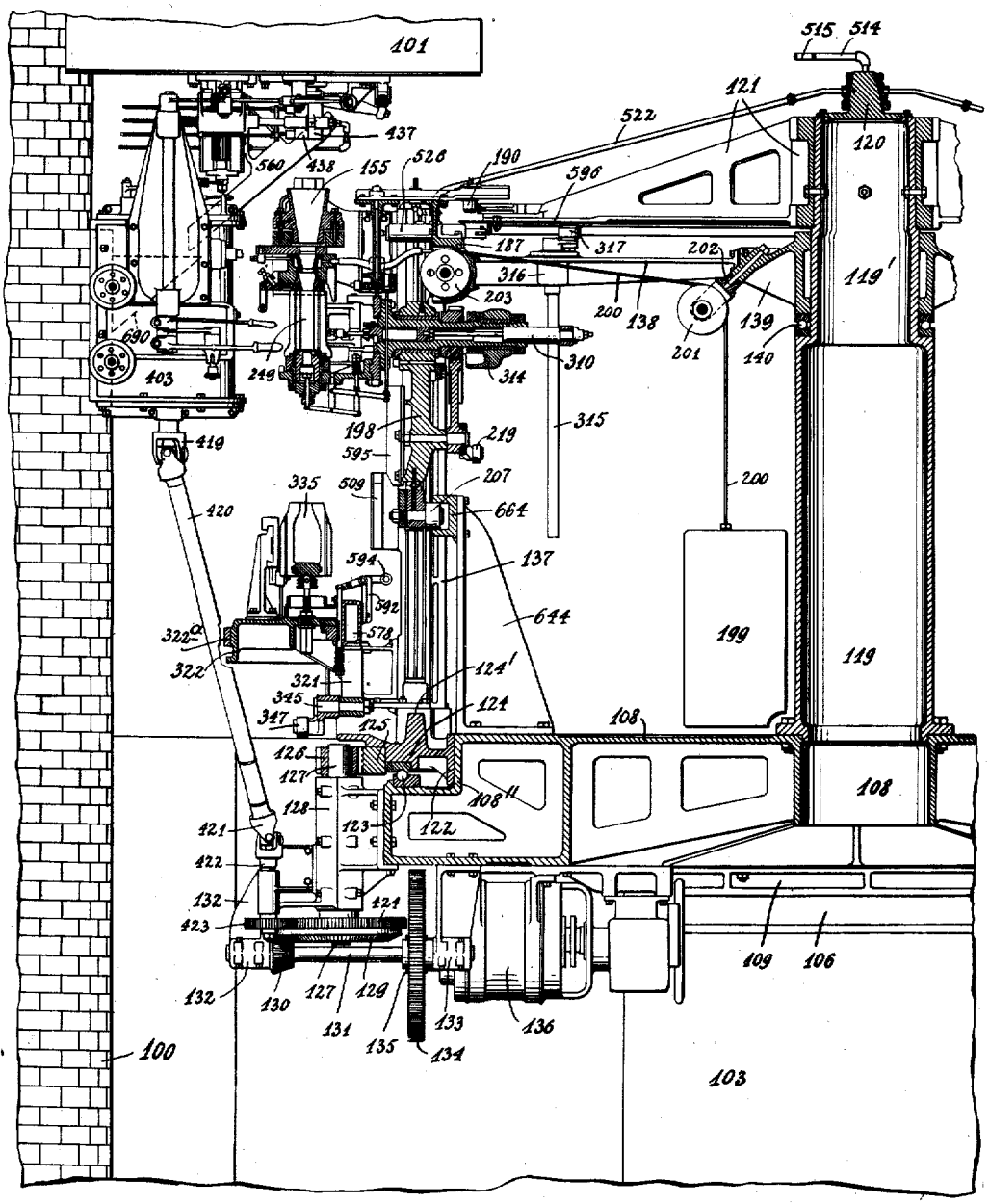

Sept. 20, 1932.　　　　F. H. LOBB　　　　1,878,942
MACHINE FOR MAKING ARTICLES FROM MOLTEN MATERIAL
Filed April 29, 1921　　　28 Sheets-Sheet 1

INVENTOR.
Frank H. Lobb
BY
John Lotka
ATTORNEY.

Sept. 20, 1932.   F. H. LOBB   1,878,942
MACHINE FOR MAKING ARTICLES FROM MOLTEN MATERIAL
Filed April 29, 1921   28 Sheets-Sheet 2
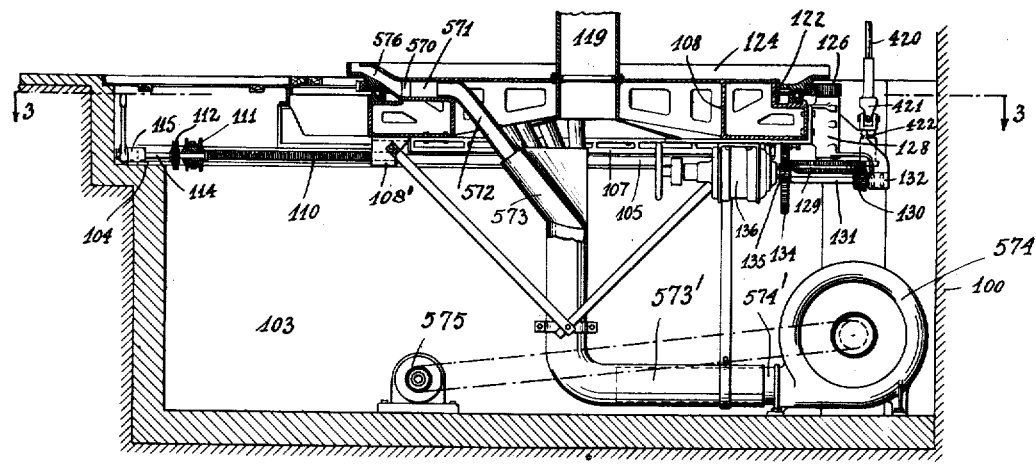
*Fig. 2.*
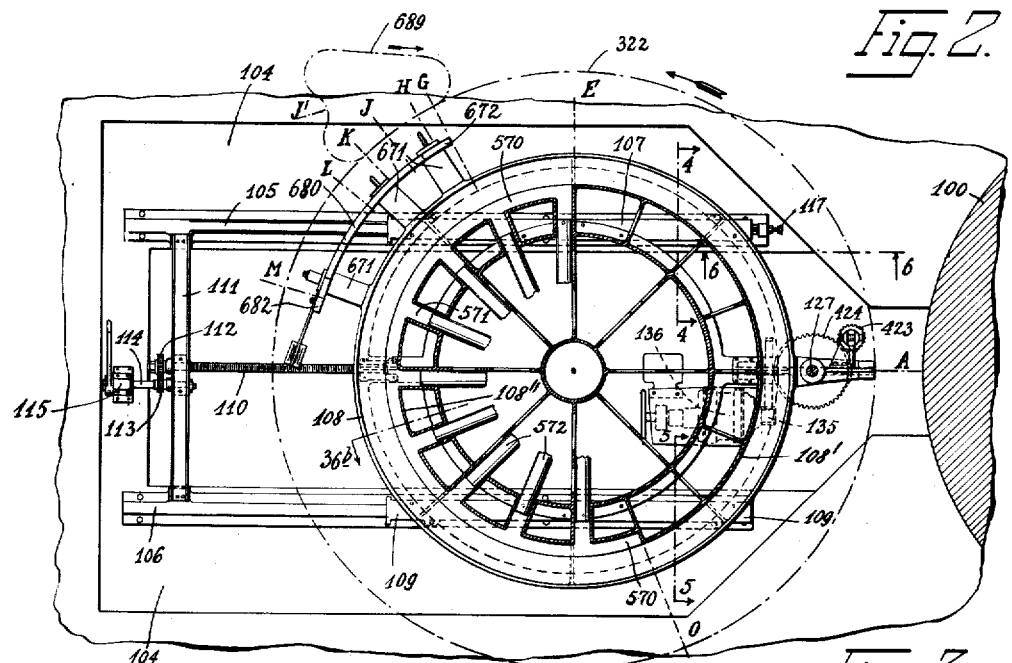
*Fig. 3.*
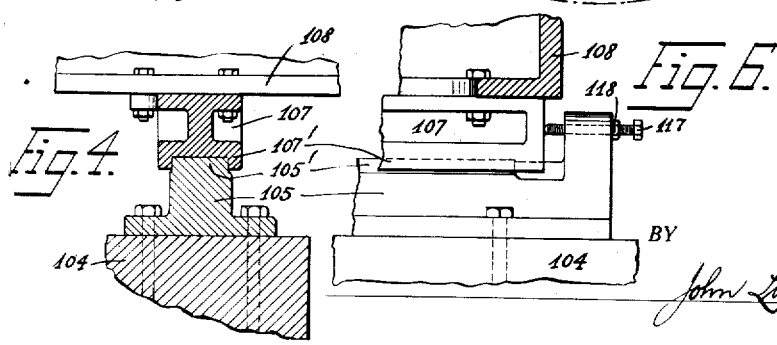
*Fig. 4.*   *Fig. 6.*
INVENTOR.
Frank H. Lobb
BY
John Lorka
ATTORNEY.

Sept. 20, 1932. F. H. LOBB 1,878,942
MACHINE FOR MAKING ARTICLES FROM MOLTEN MATERIAL
Filed April 29, 1921 28 Sheets-Sheet 3
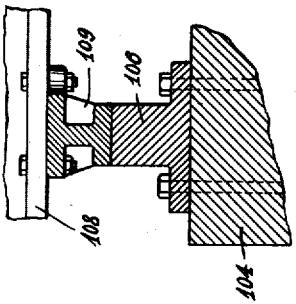
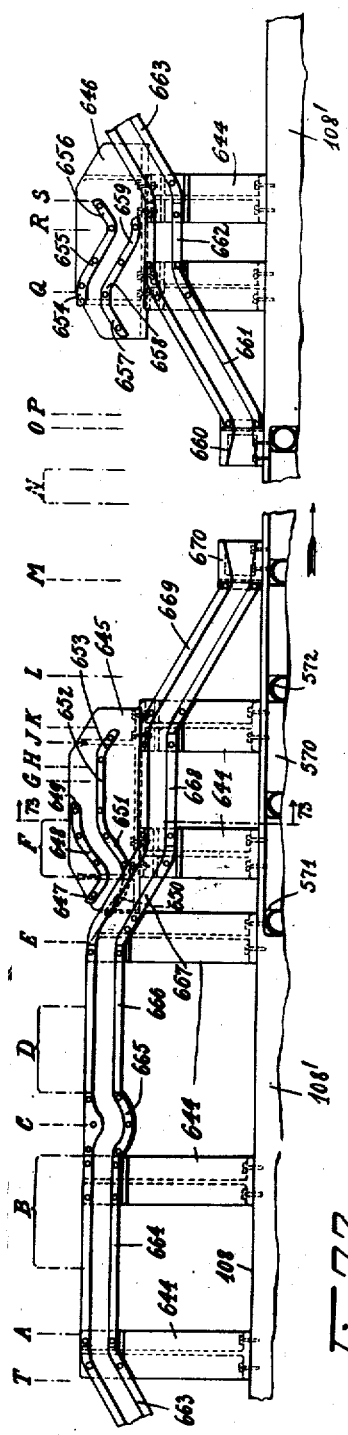
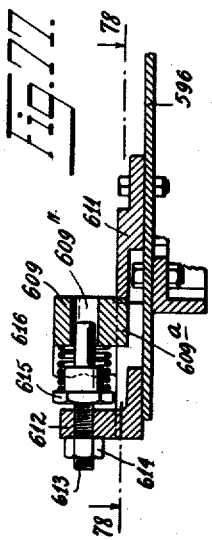
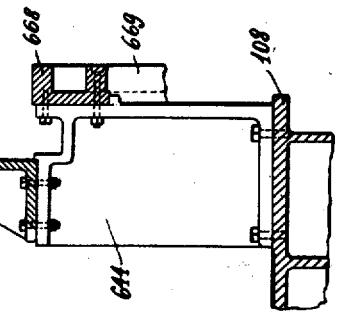
INVENTOR.
Frank H. Lobb
BY
John Locka
ATTORNEY.

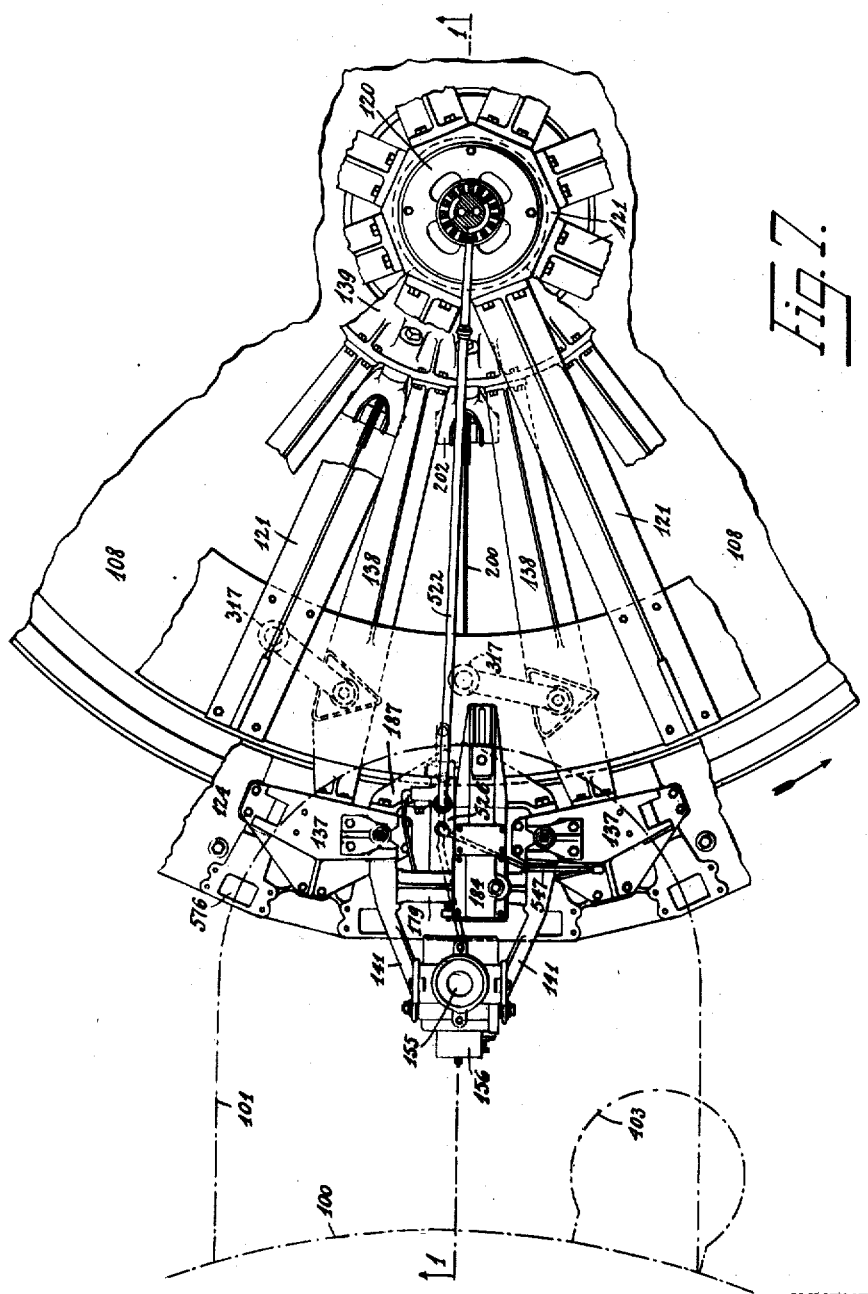

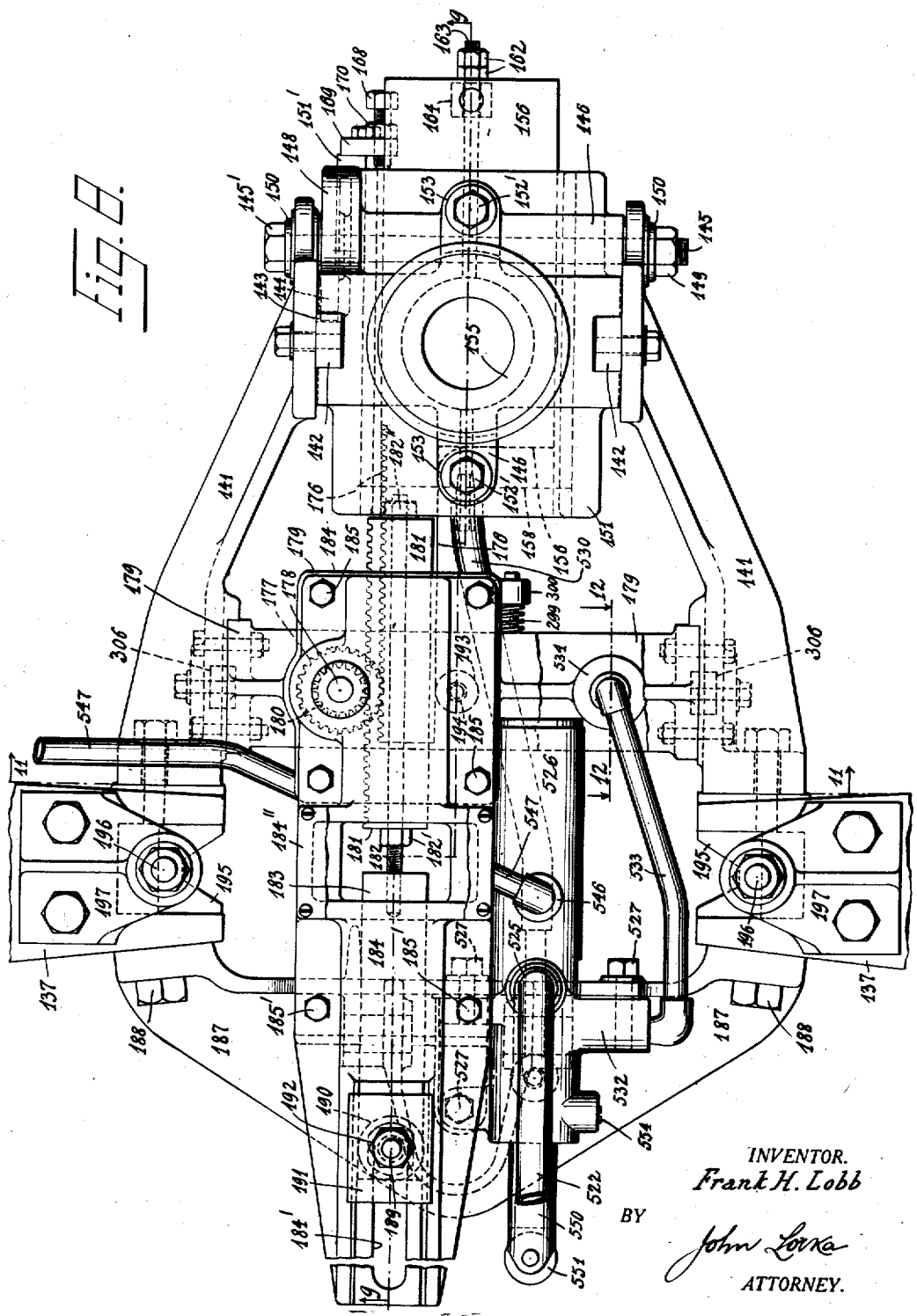

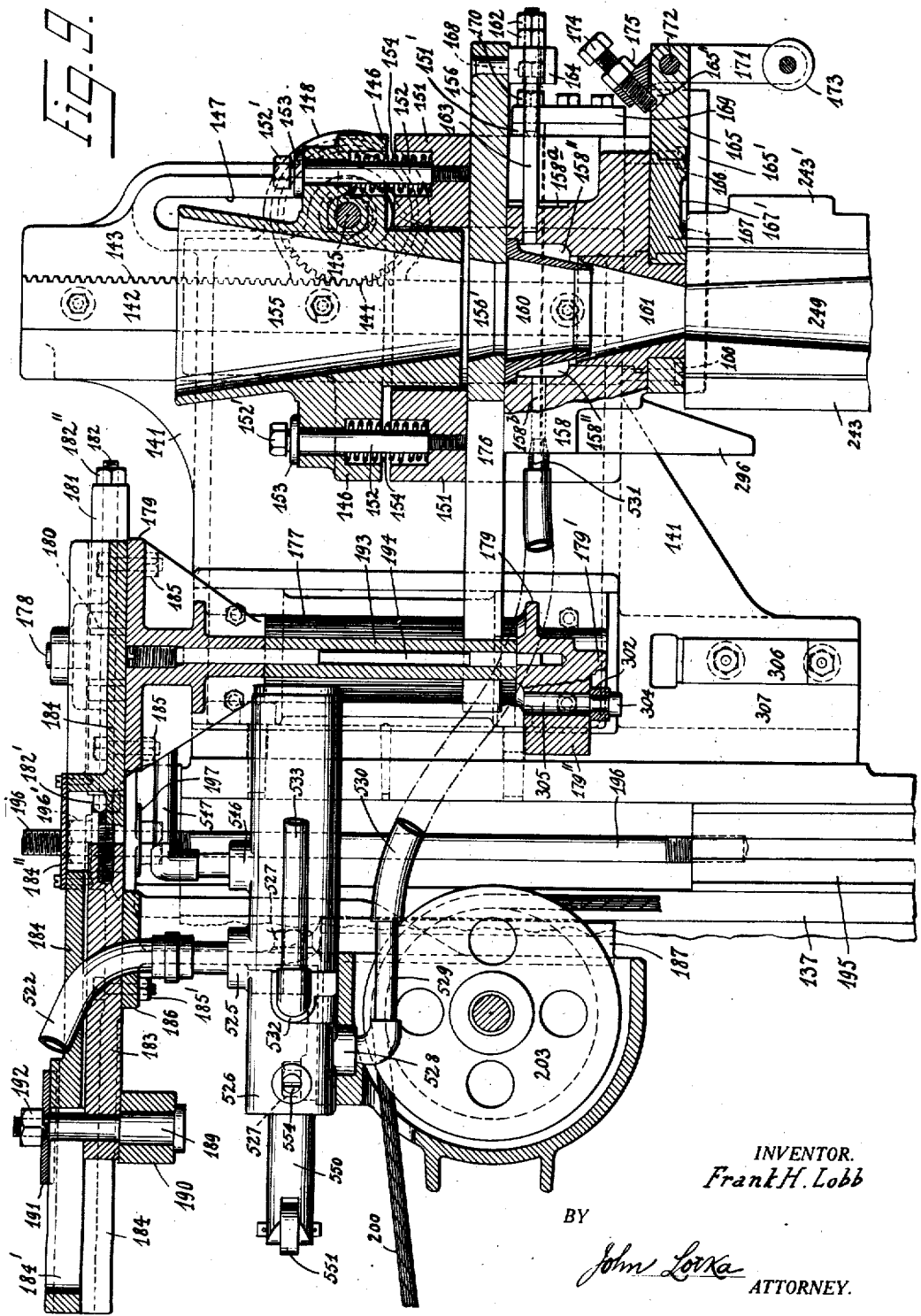

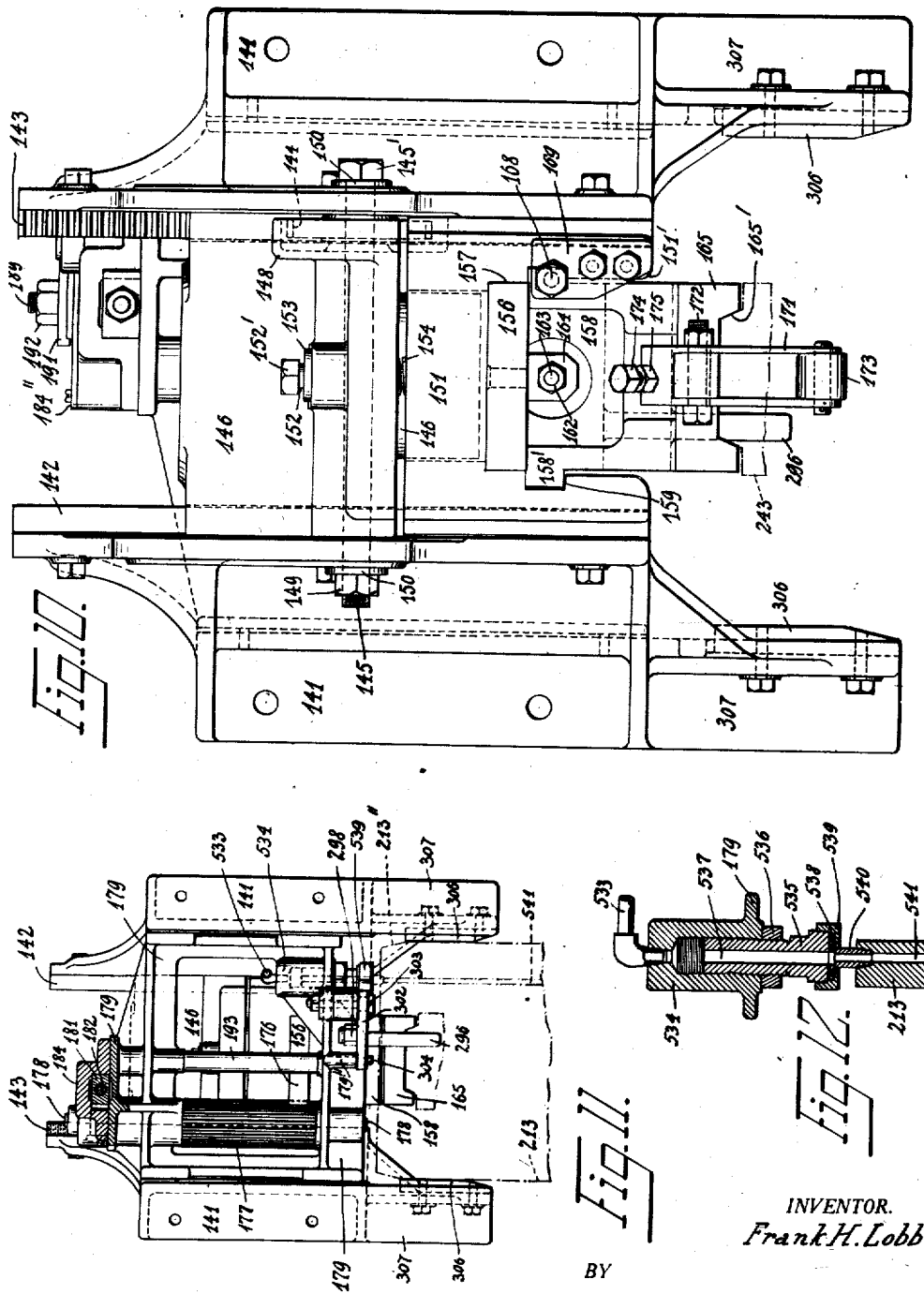

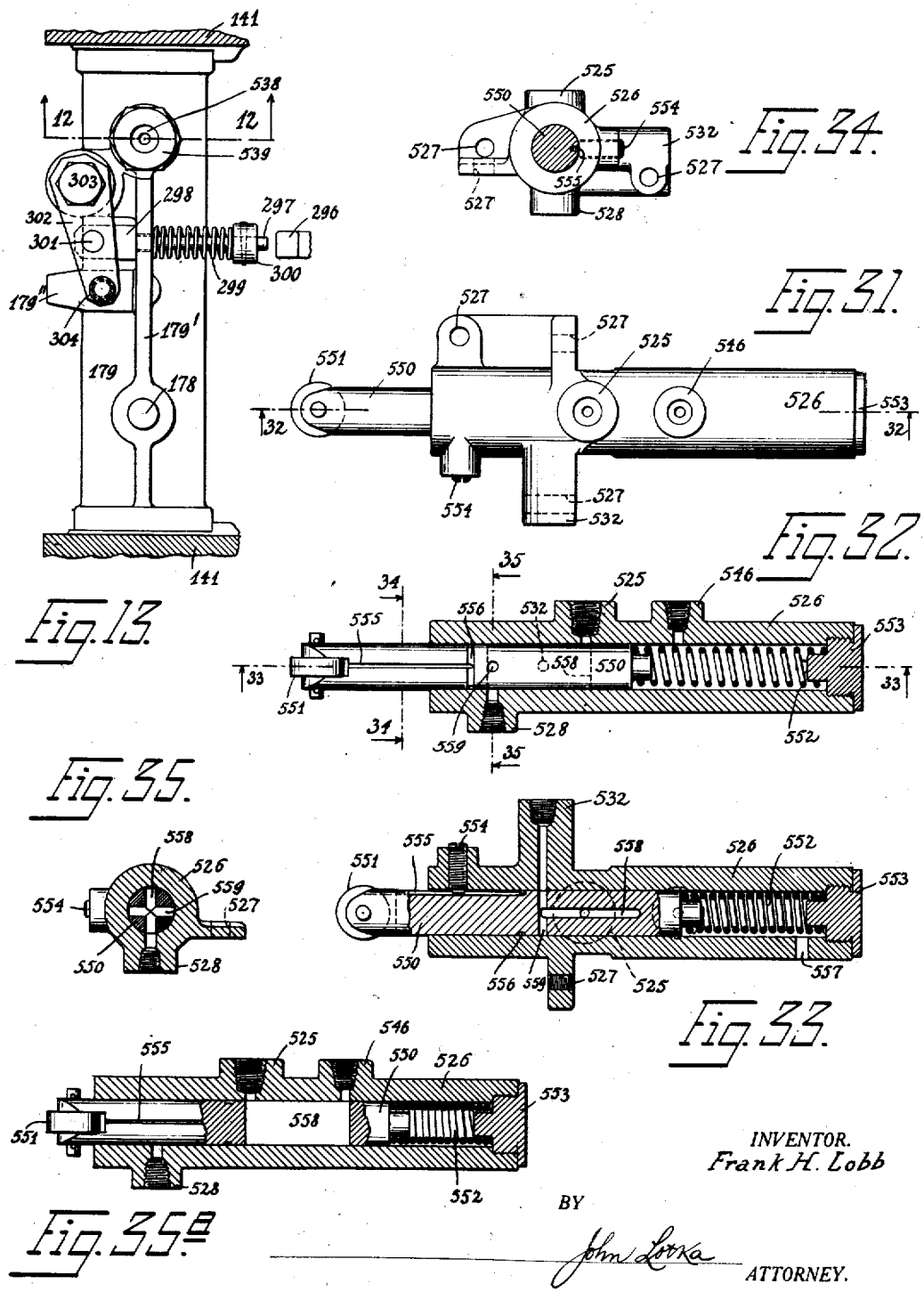

Sept. 20, 1932. F. H. LOBB 1,878,942
MACHINE FOR MAKING ARTICLES FROM MOLTEN MATERIAL
Filed April 29, 1921 28 Sheets-Sheet 9
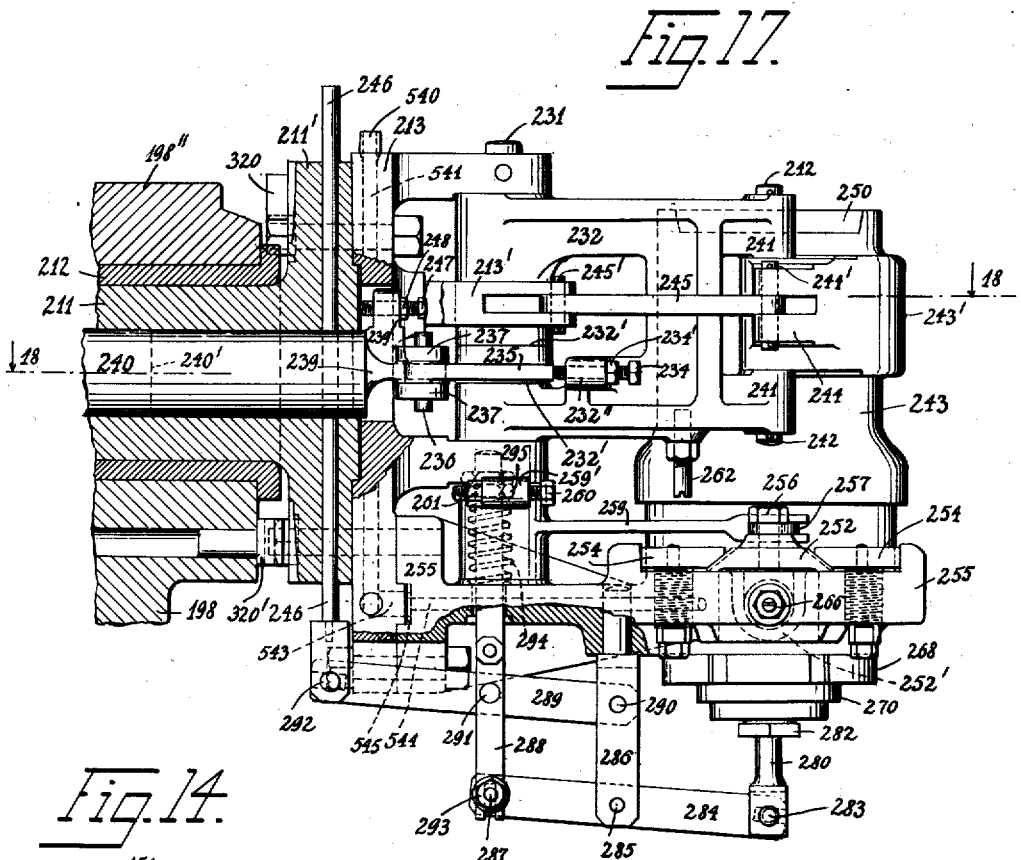
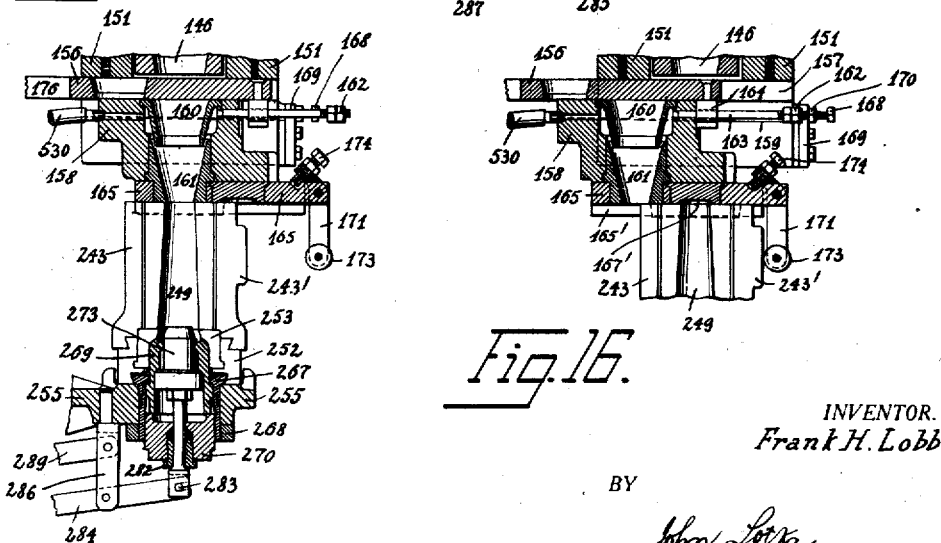
INVENTOR.
Frank H. Lobb
BY
John Lotka
ATTORNEY.

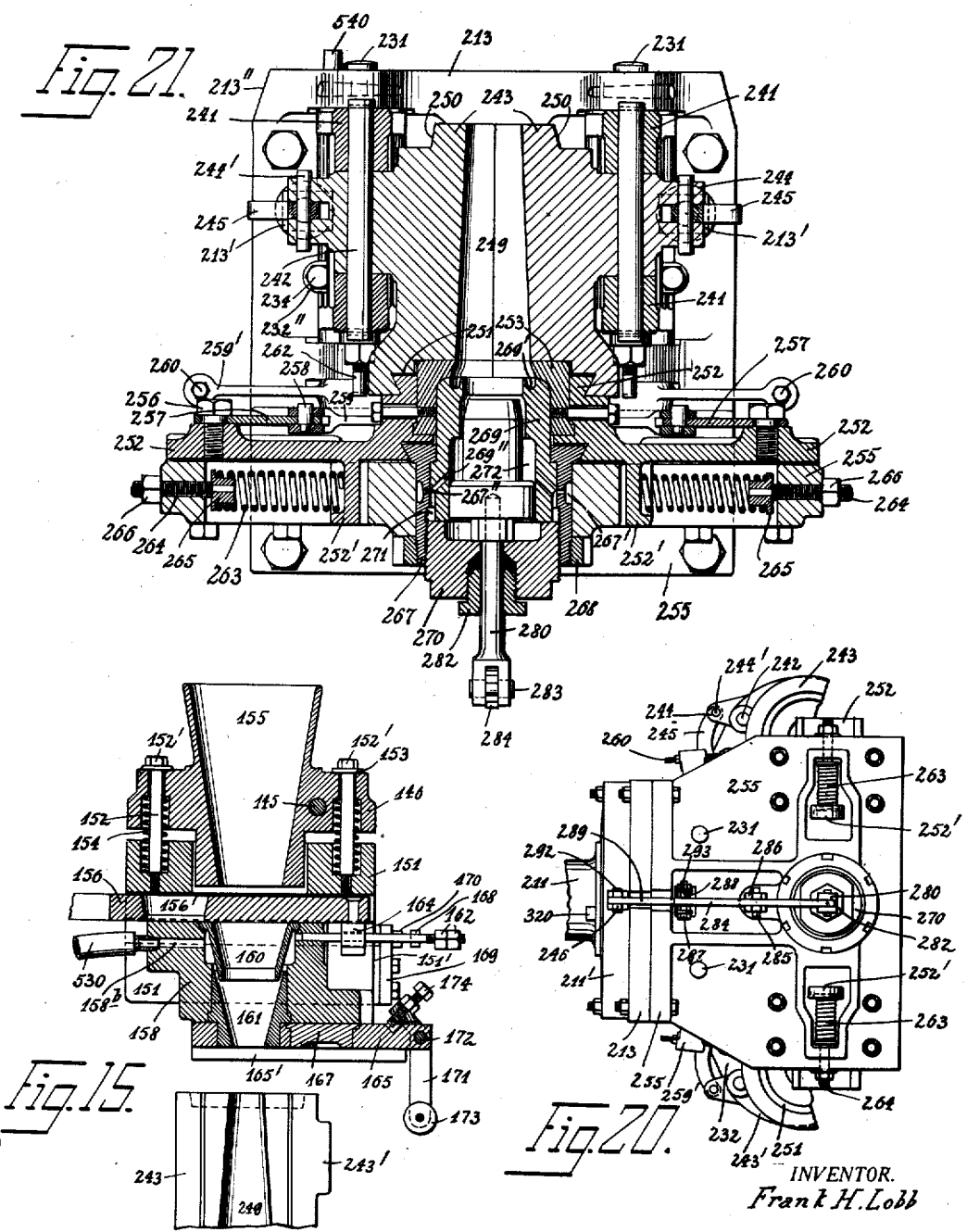

Sept. 20, 1932. F. H. LOBB 1,878,942
MACHINE FOR MAKING ARTICLES FROM MOLTEN MATERIAL
Filed April 29, 1921 28 Sheets-Sheet 11

INVENTOR.
Frank H. Lobb
BY
John Lobb
ATTORNEY.

Sept. 20, 1932. F. H. LOBB 1,878,942
MACHINE FOR MAKING ARTICLES FROM MOLTEN MATERIAL
Filed April 29, 1921 28 Sheets-Sheet 13
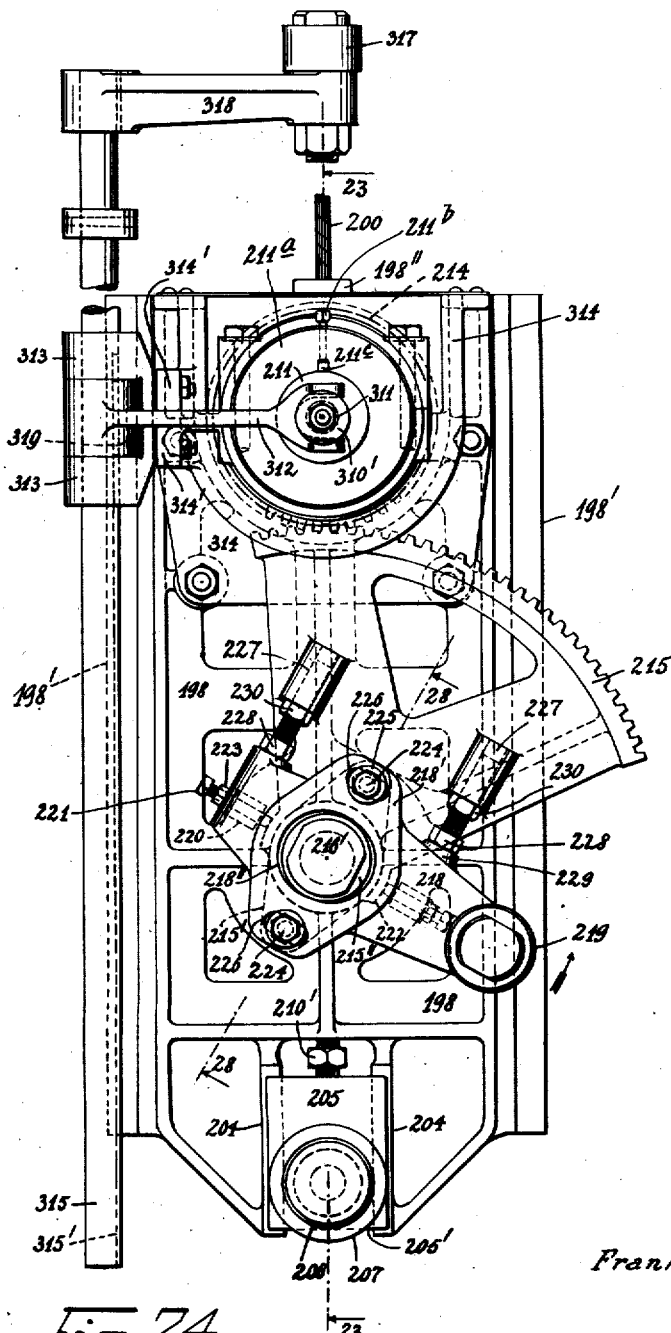
Frank H. Lobb INVENTOR.
BY
John Looke ATTORNEY.

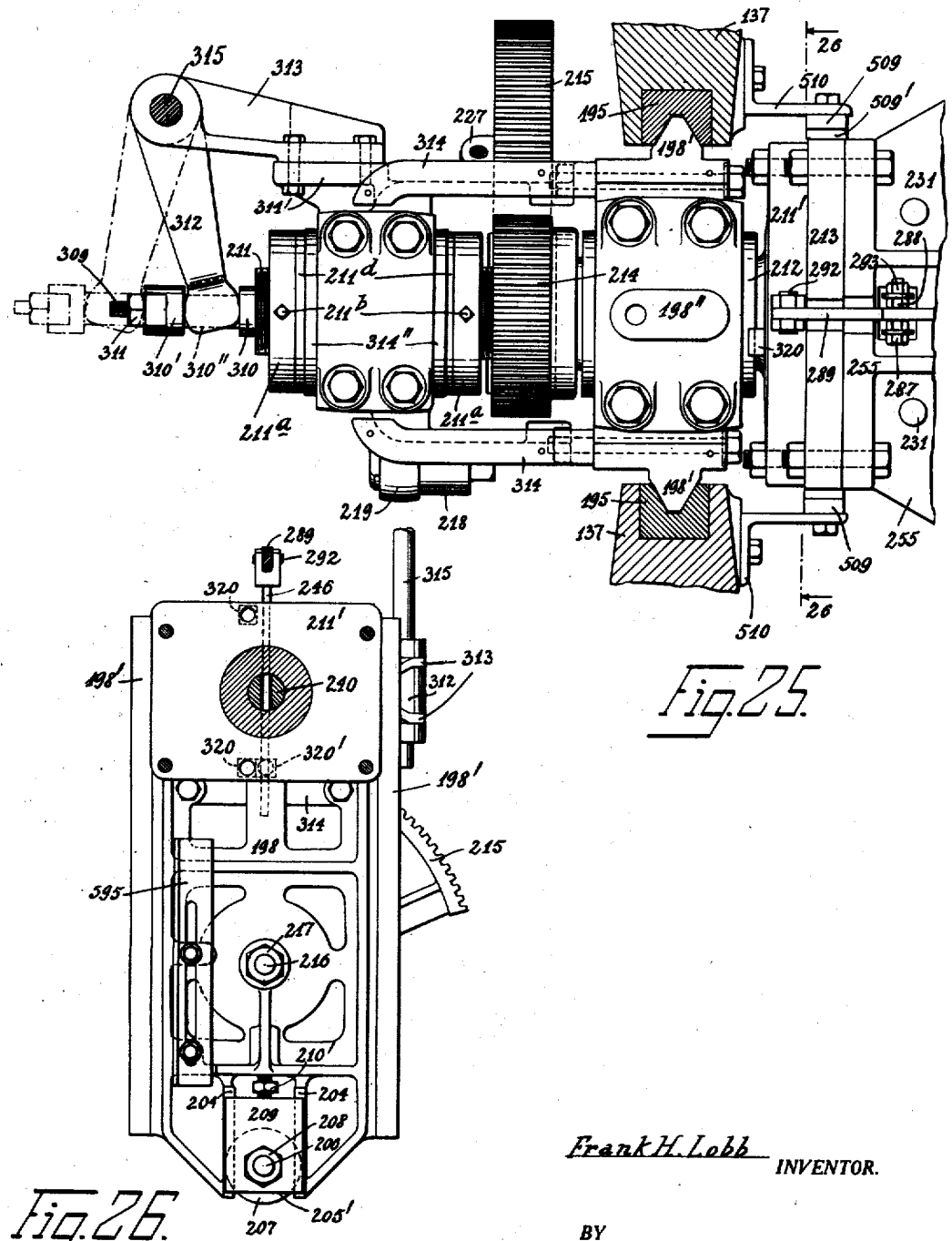

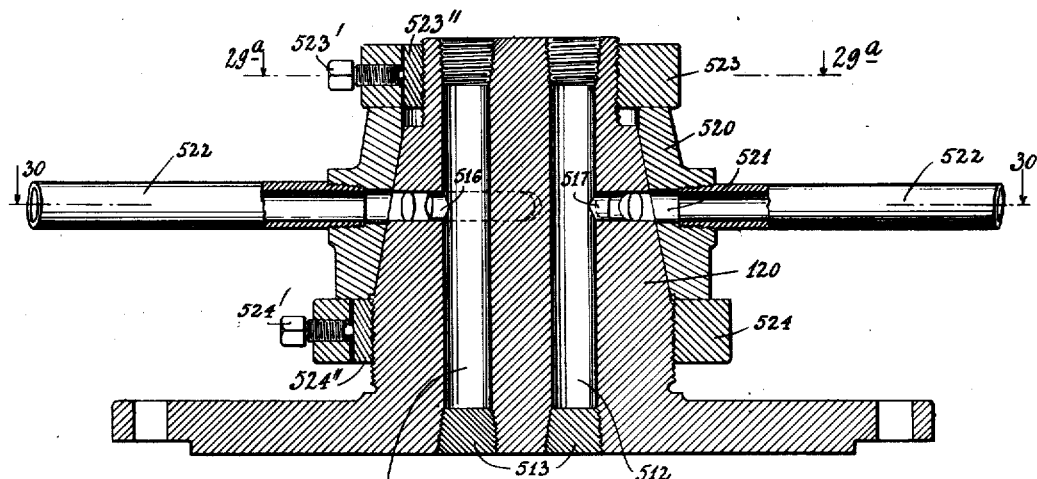
Fig. 29.
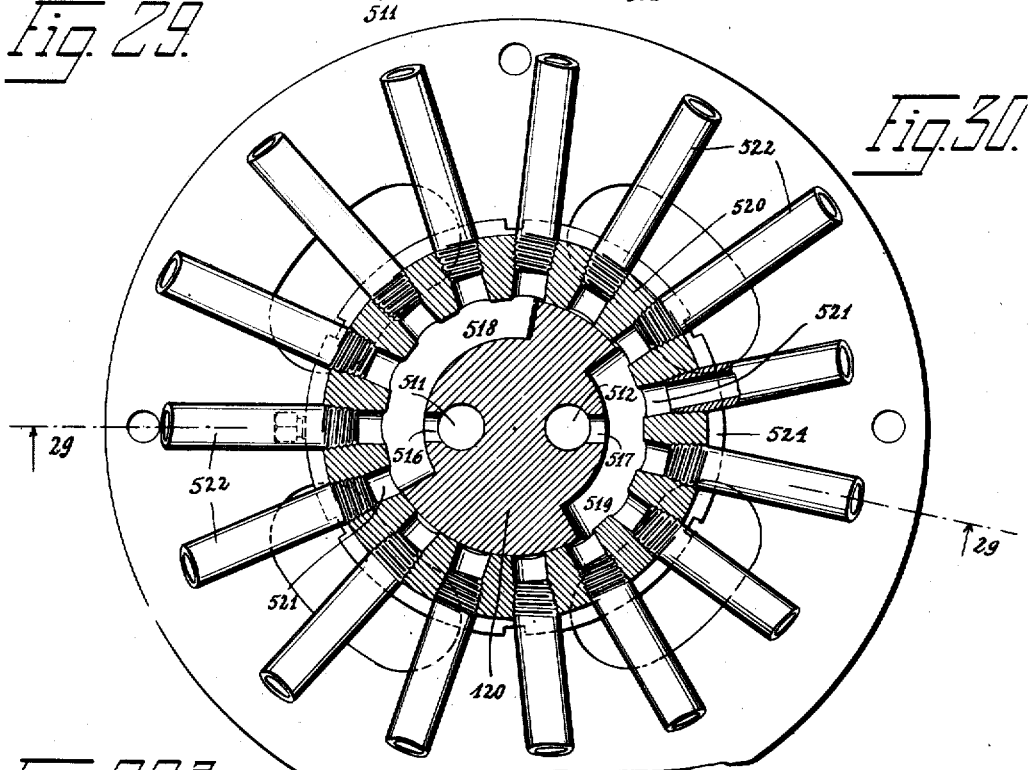
Fig. 30.
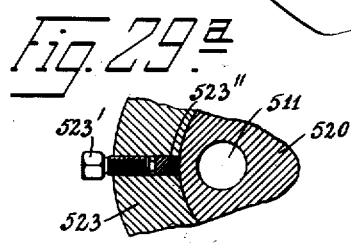
Fig. 29ª

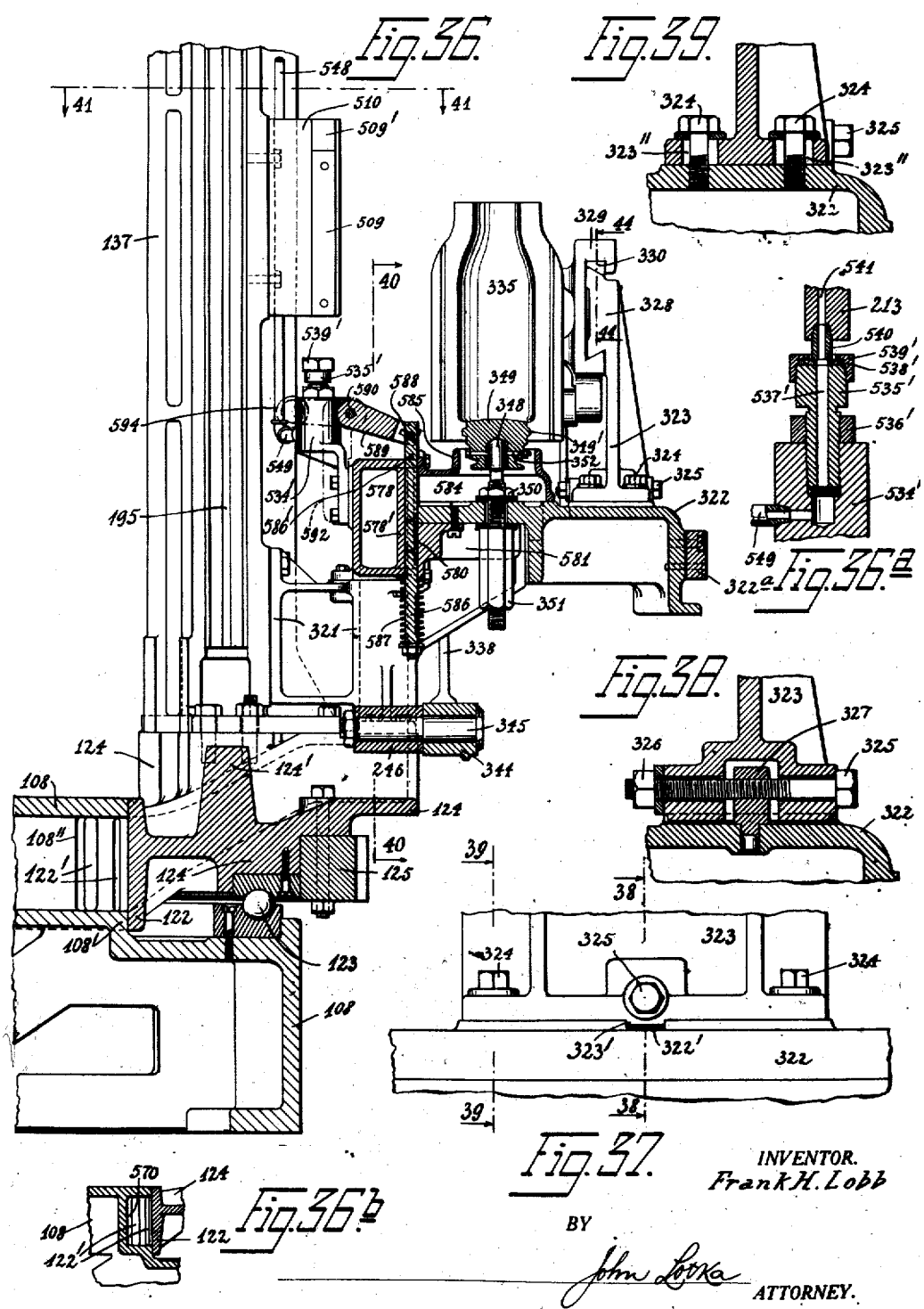

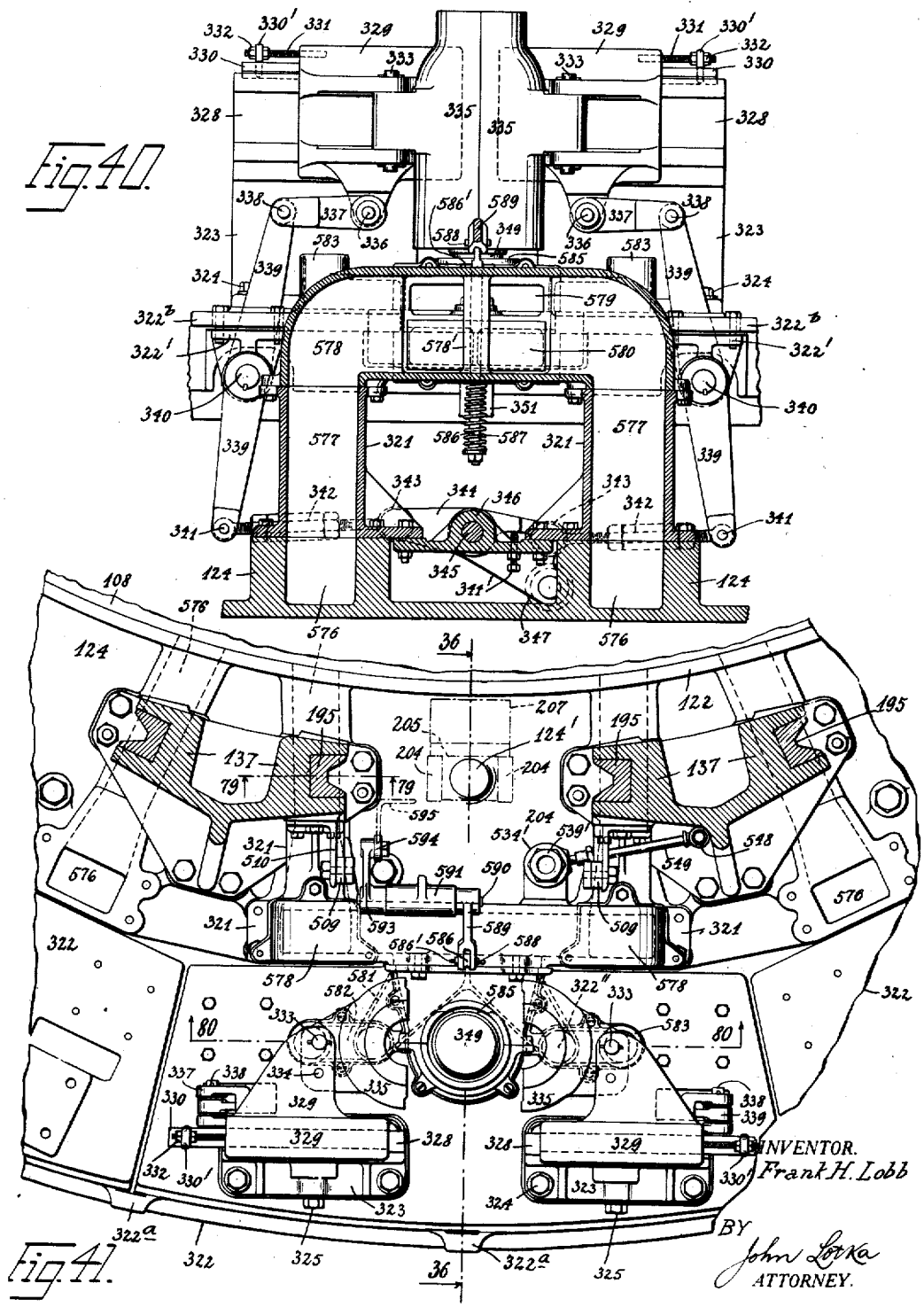

Sept. 20, 1932.   F. H. LOBB   1,878,942
MACHINE FOR MAKING ARTICLES FROM MOLTEN MATERIAL
Filed April 29, 1921   28 Sheets-Sheet 18
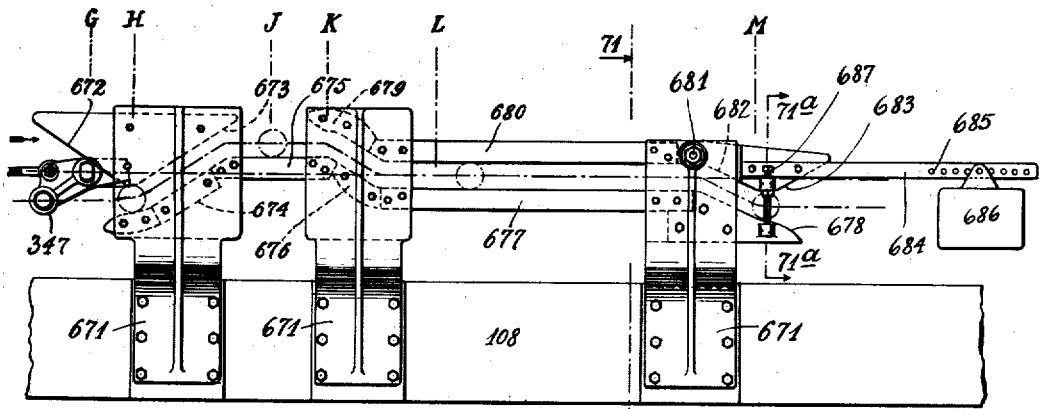
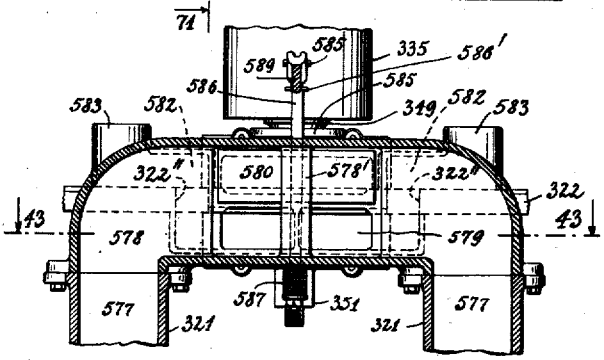
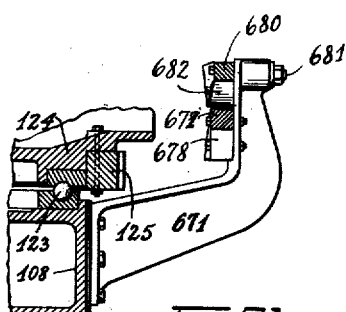
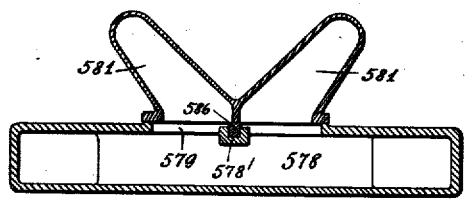
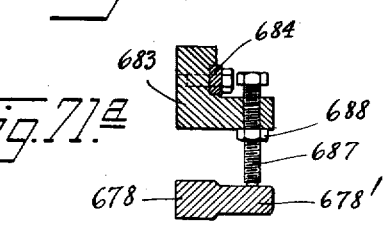
Frank H. Lobb INVENTOR.
BY John Lotka ATTORNEY.

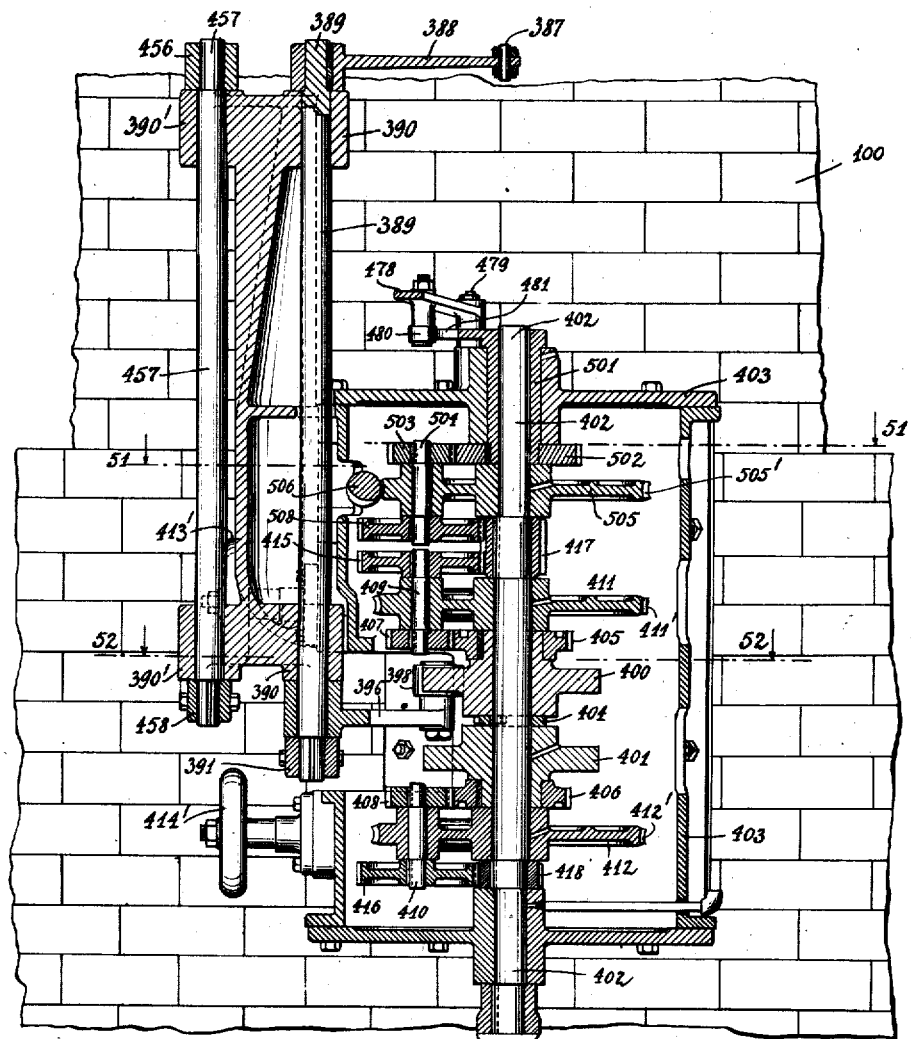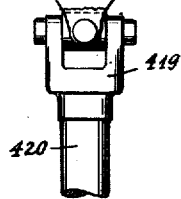

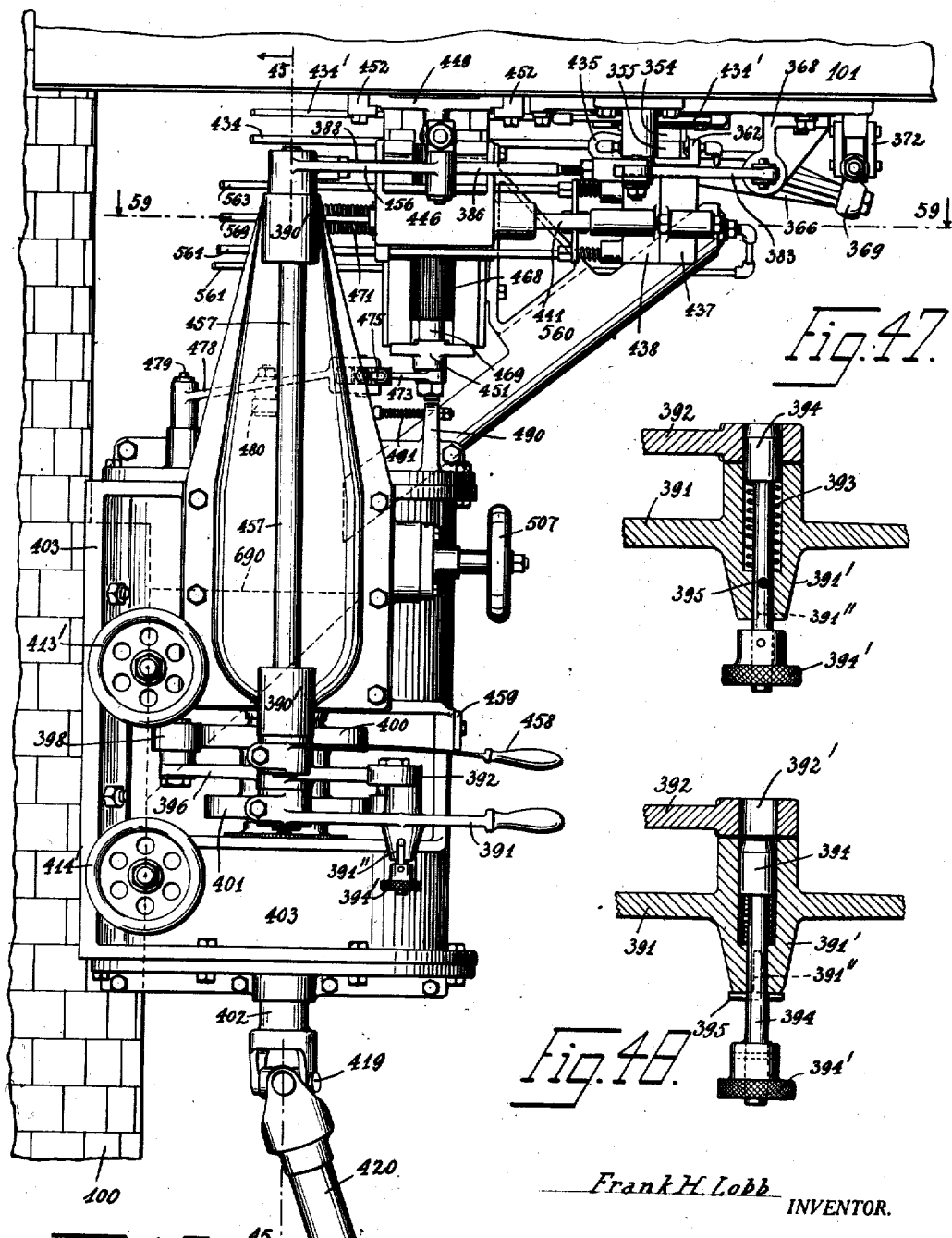

Sept. 20, 1932. F. H. LOBB 1,878,942
MACHINE FOR MAKING ARTICLES FROM MOLTEN MATERIAL
Filed April 29, 1921 28 Sheets-Sheet 21
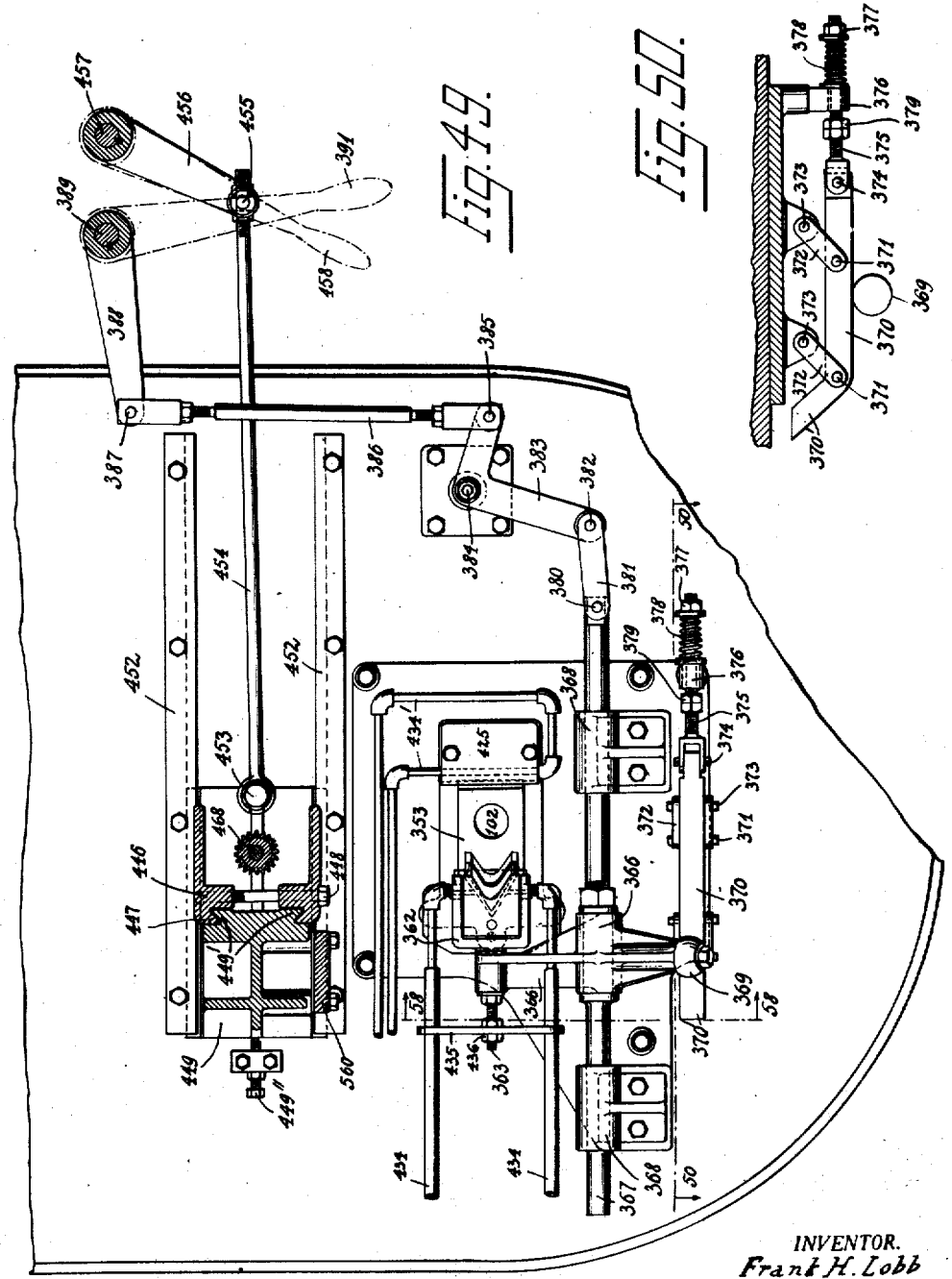
INVENTOR.
Frank H. Lobb
BY
John Lotka
ATTORNEY.

Sept. 20, 1932.  F. H. LOBB  1,878,942
MACHINE FOR MAKING ARTICLES FROM MOLTEN MATERIAL
Filed April 29, 1921  28 Sheets-Sheet 22
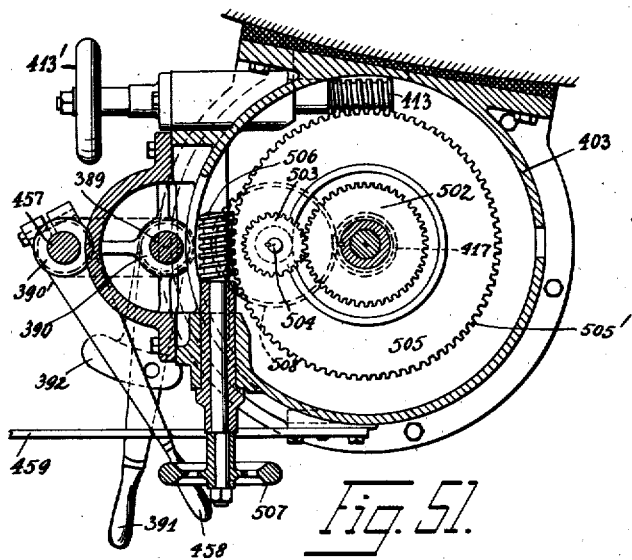
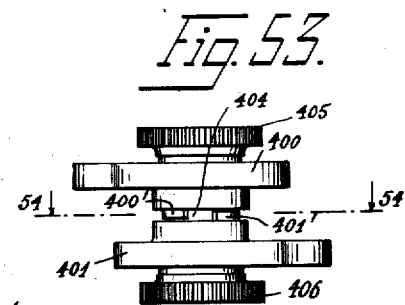
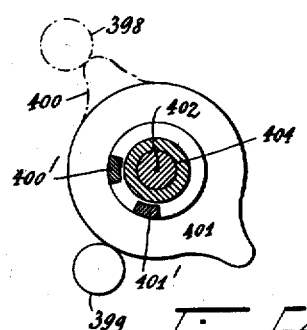
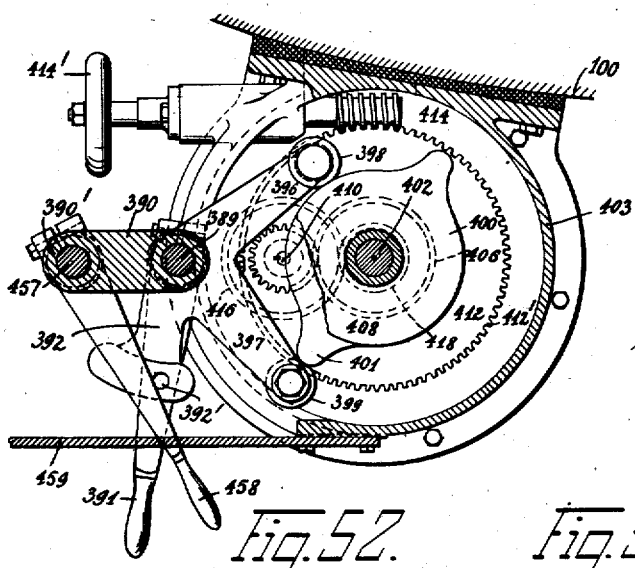
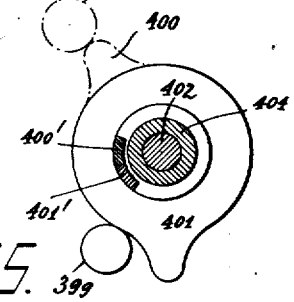
Frank H. Lobb INVENTOR.
BY
ATTORNEY.

Sept. 20, 1932.    F. H. LOBB    1,878,942
MACHINE FOR MAKING ARTICLES FROM MOLTEN MATERIAL
Filed April 29, 1921    28 Sheets-Sheet 23

INVENTOR.
Frank H. Lobb
BY
John Lotka
ATTORNEY.

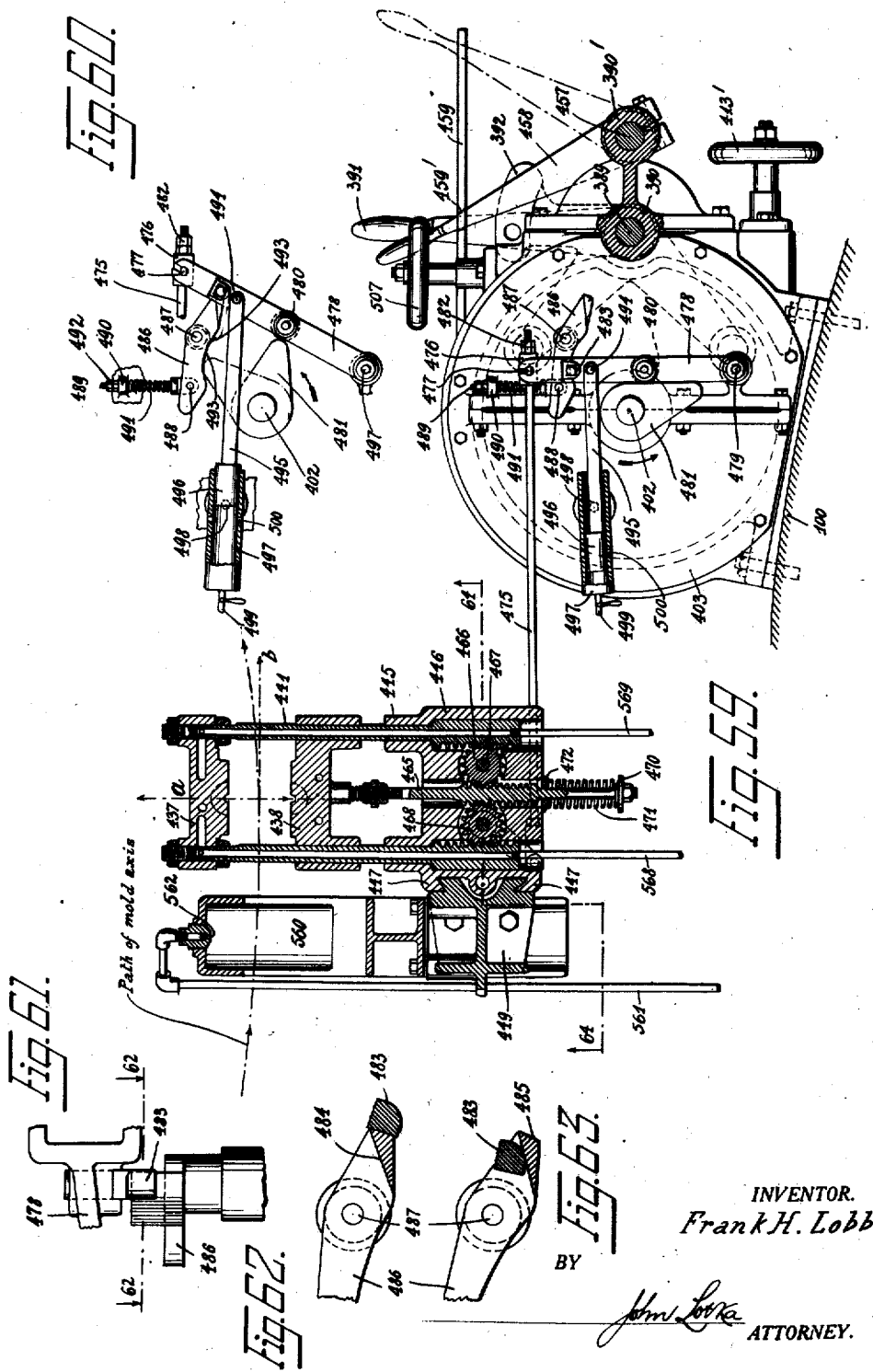

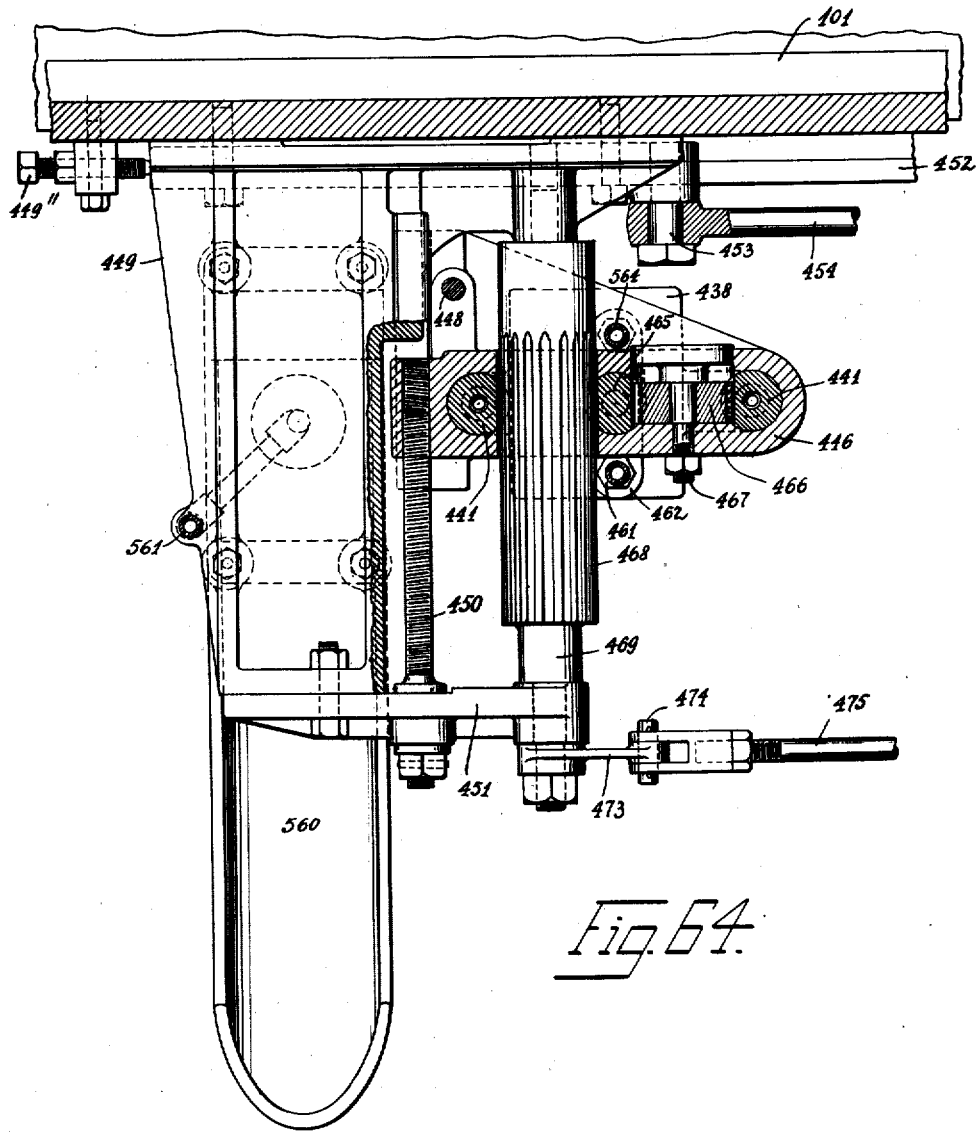

Sept. 20, 1932.   F. H. LOBB   1,878,942
MACHINE FOR MAKING ARTICLES FROM MOLTEN MATERIAL
Filed April 29, 1921   28 Sheets-Sheet 26
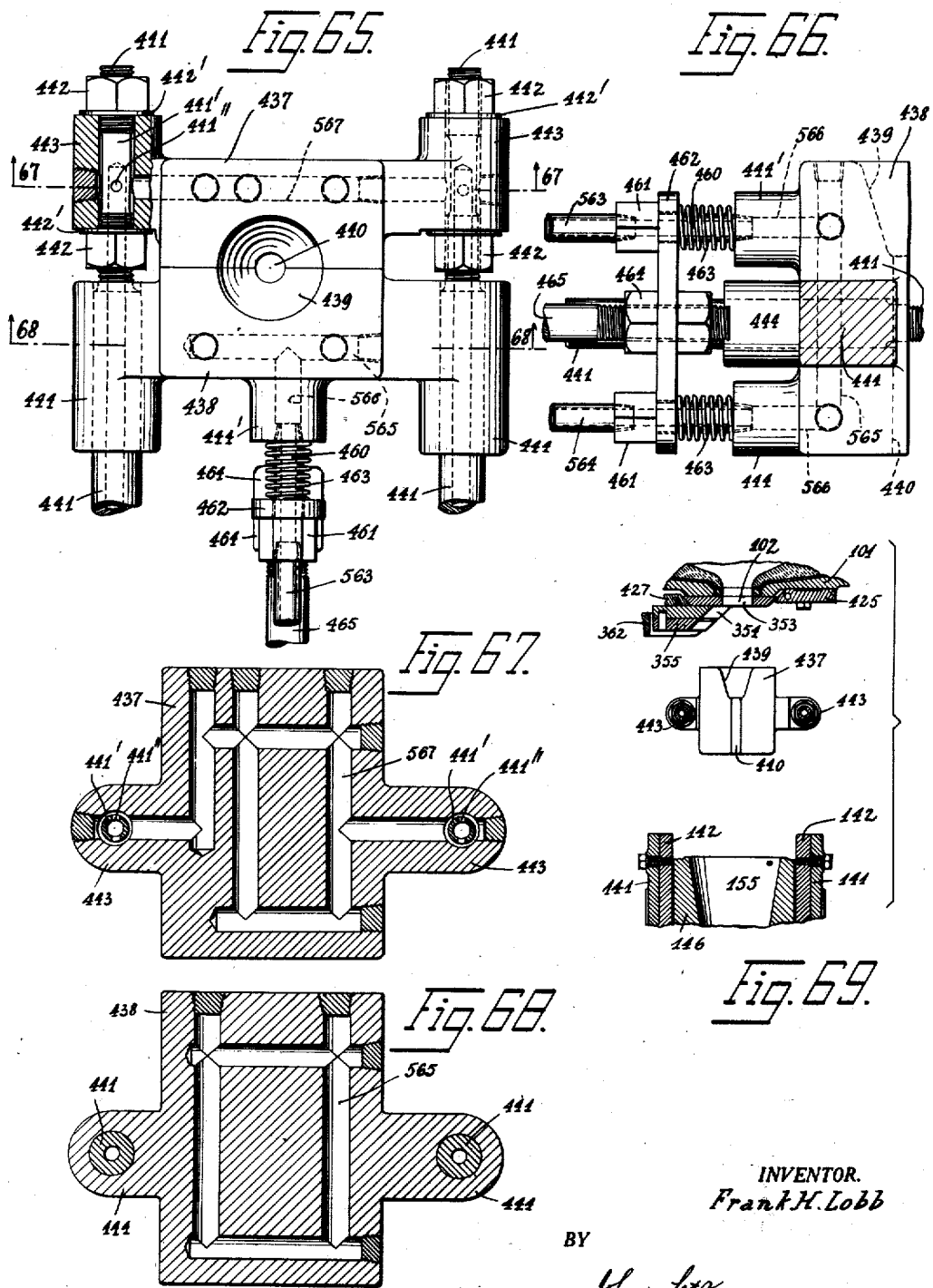

Sept. 20, 1932.   F. H. LOBB   1,878,942
MACHINE FOR MAKING ARTICLES FROM MOLTEN MATERIAL
Filed April 29, 1921   28 Sheets-Sheet 27
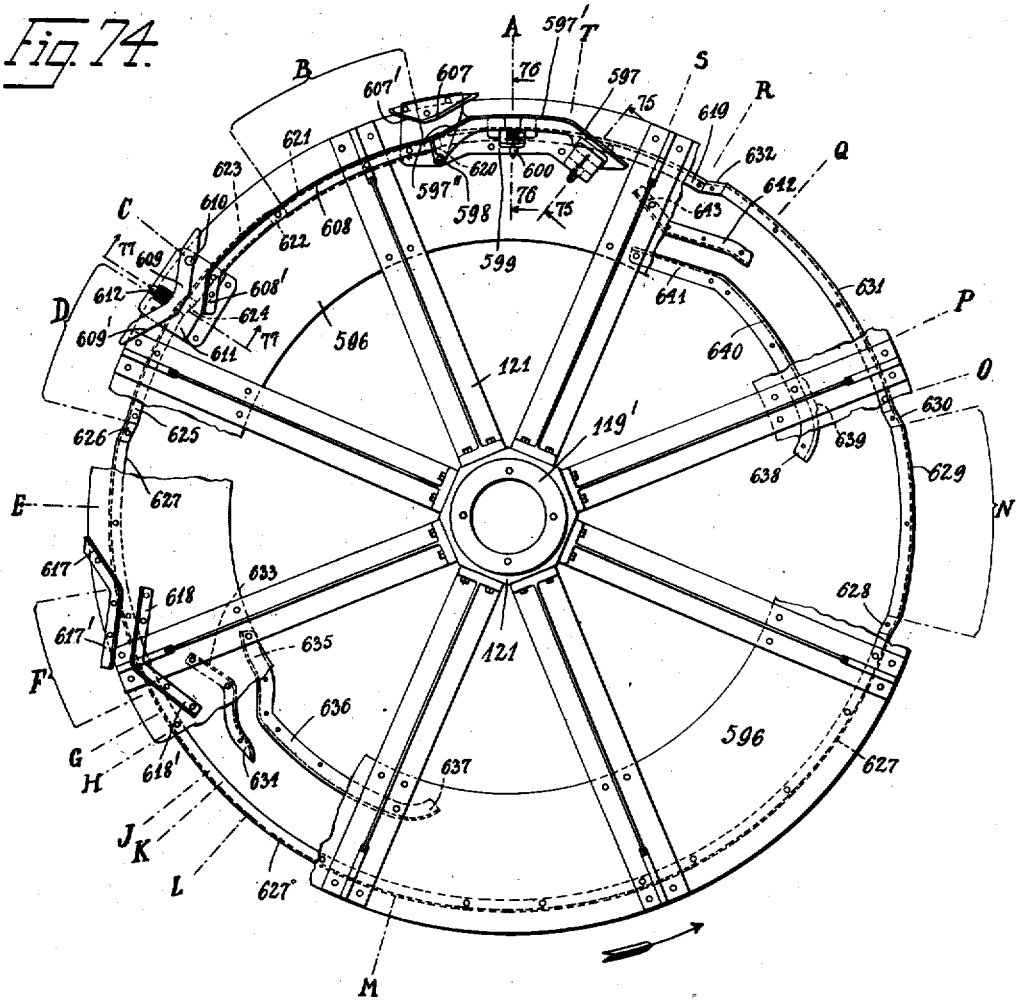
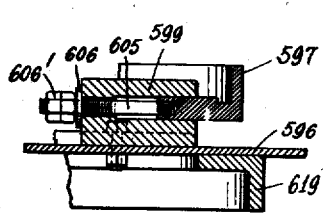
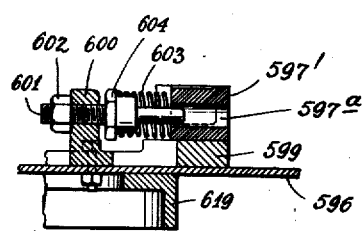
INVENTOR.
Frank H. Lobb
BY
John Lotka
ATTORNEY.

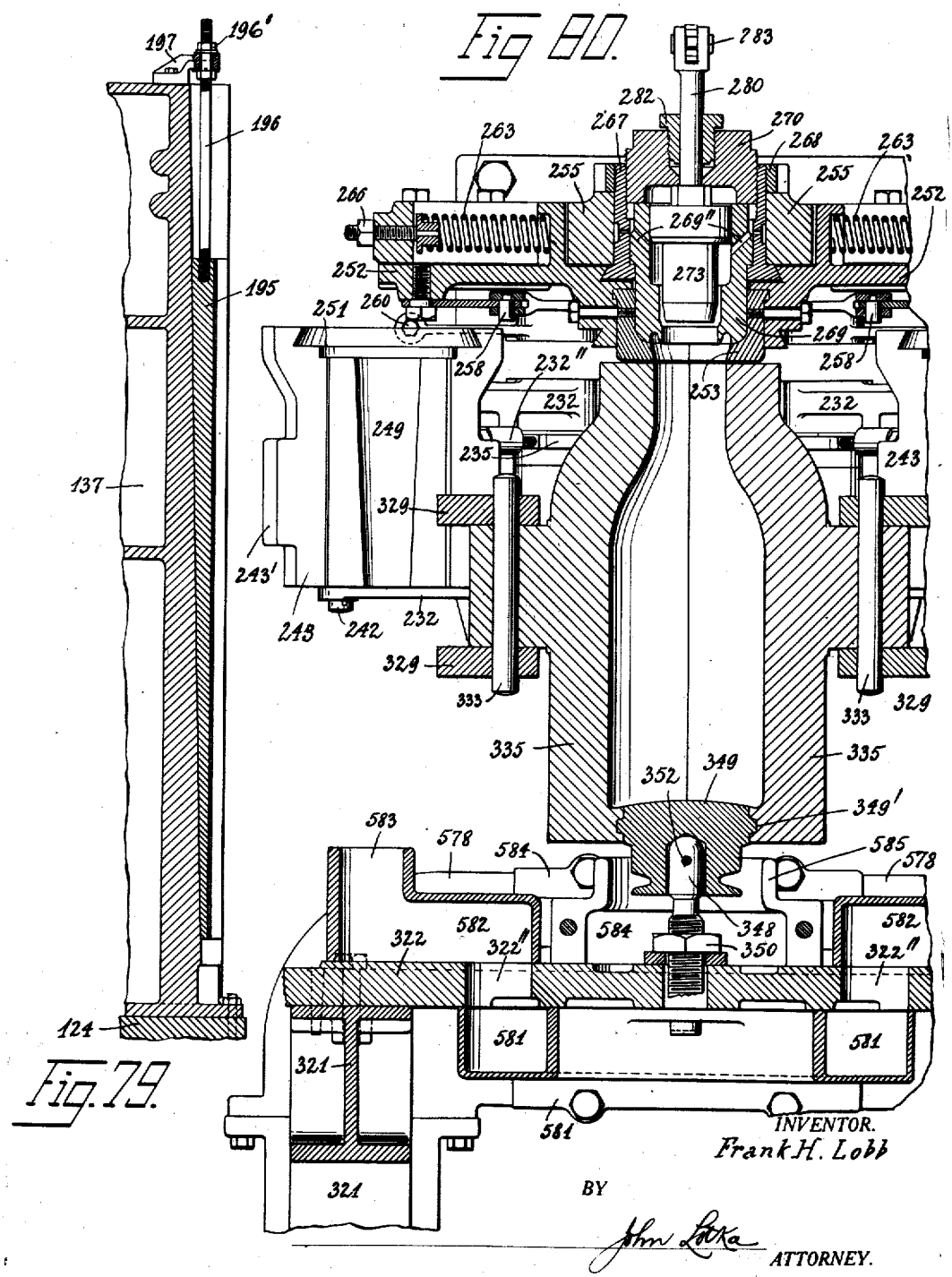

Patented Sept. 20, 1932

1,878,942

UNITED STATES PATENT OFFICE

FRANK H. LOBB, OF PHILADELPHIA, PENNSYLVANIA, ASSIGNOR, BY MESNE ASSIGNMENTS, TO HARTFORD-EMPIRE COMPANY, OF HARTFORD, CONNECTICUT, A CORPORATION OF DELAWARE

MACHINE FOR MAKING ARTICLES FROM MOLTEN MATERIAL

Application filed April 29, 1921. Serial No. 465,440.

My invention relates to machines for making articles from molten material, such as molten glass, and has been designed particularly for blowing bottles and the like. The object of my invention is to secure a reliable operation and a considerable output, also a great durability of the machine and accessibility of its parts. Other objects and advantages will appear from the description following hereinafter.

Without intending to restrict myself to the specific features shown, I have illustrated, in the accompanying drawings, a preferred embodiment of my invention as constructed for the blowing of glass bottles.

Figure 18:
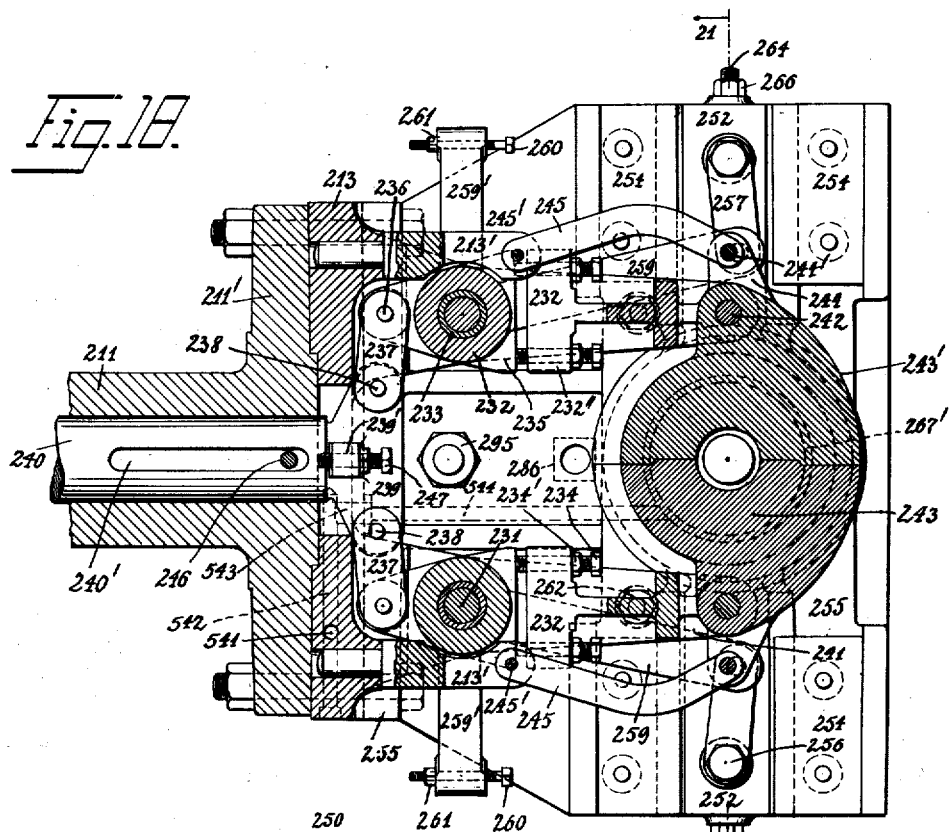
Figure 19:
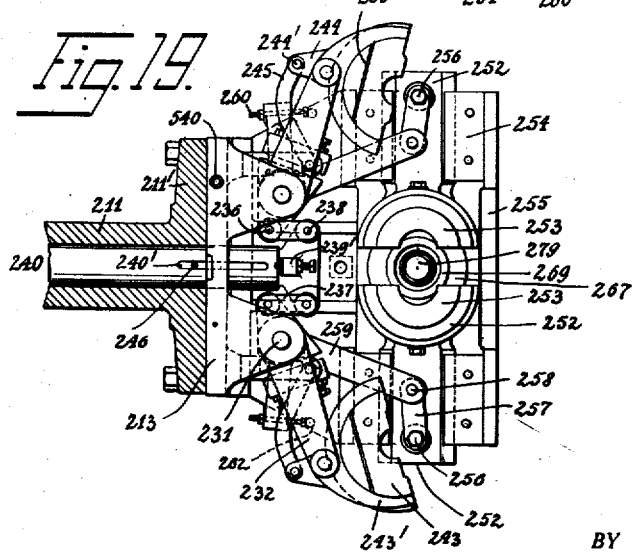
Figure 22:
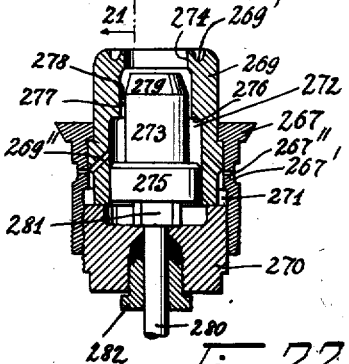
Figure 23:
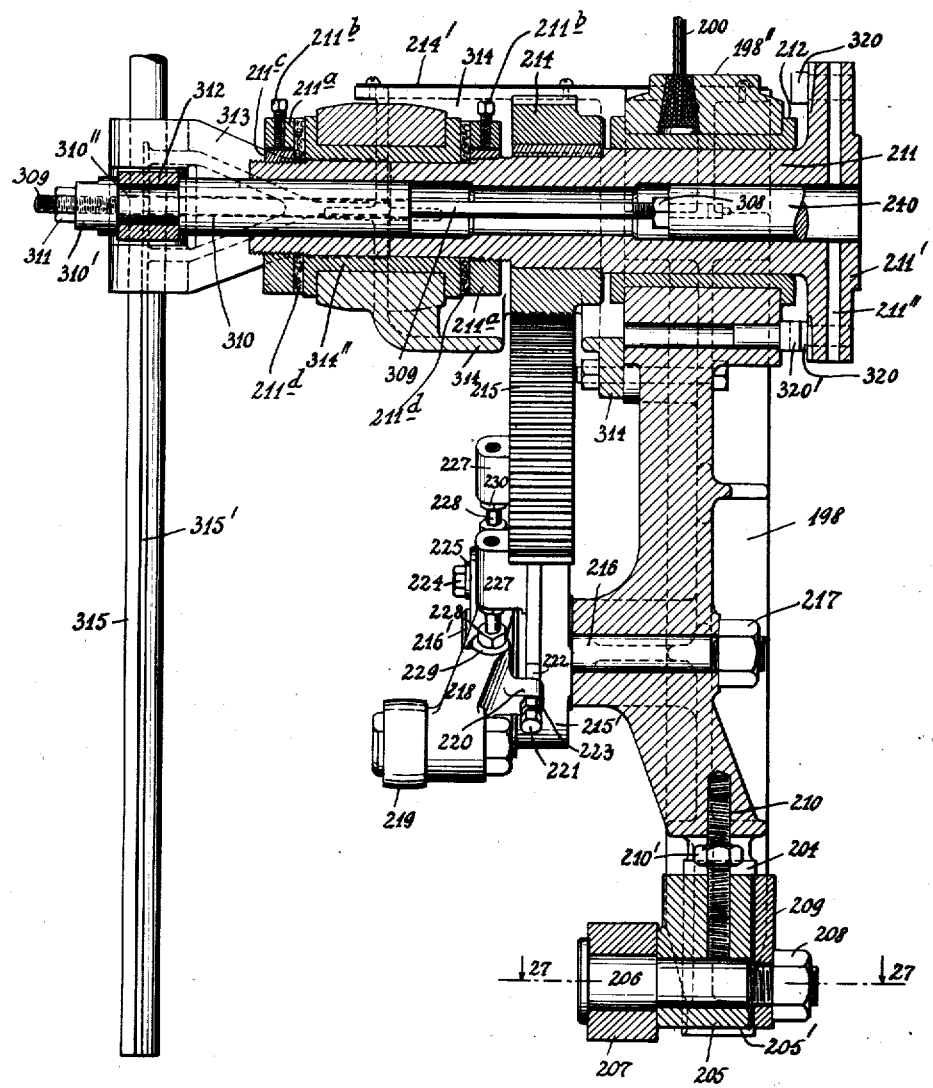
Figure 56:
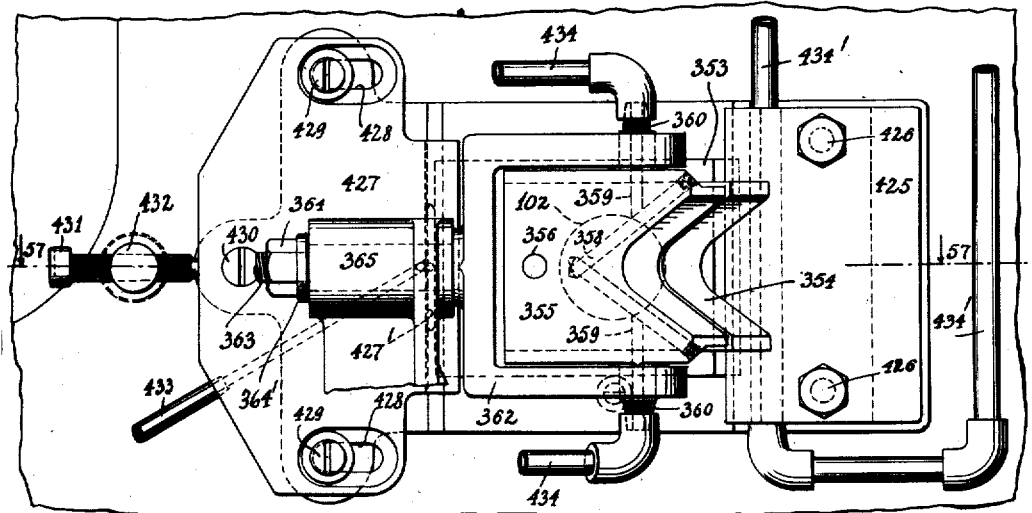
Figure 57:
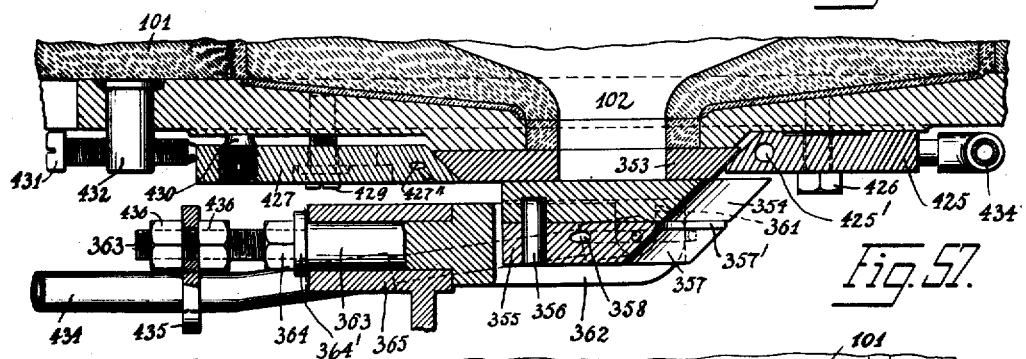
Figure 58:
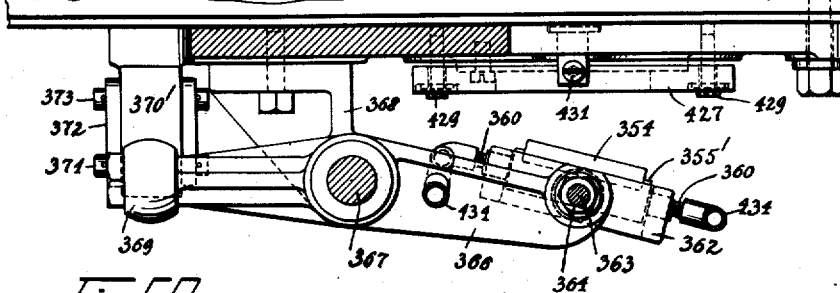

In said drawings, Fig. 1 is partly an elevation of the machine and partly a section substantially on line 1—1 of Fig. 7; Fig. 2 is a vertical section of the base portion of the machine, taken substantially on the same line as Fig. 1, but looking in the opposite direction; Fig. 3 is a horizontal section substantially on line 3—3 of Fig. 2; Figs. 4, 5 and 6 are detail vertical sections on lines 4—4, 5—5, and 6—6 respectively of Fig. 3; Fig. 7 is a partial plan view of the machine, with parts in section; Fig. 8 is a plan view of the blow head and adjacent parts; Fig. 9 is a vertical section on line 9—9 of Fig. 8; Fig. 10 is an elevation of the blow head and some adjacent parts, looking from the end; Fig. 11 is a vertical section on line 11—11 of Fig. 8; Fig. 12 is a detail view showing an air connection for the invertible head, in vertical section on line 12—12 of Figs. 8 and 13, the latter being a bottom view of the blow head support; Fig. 13 is a bottom plan view of a portion of the mechanism shown in Fig. 8, and certain appurtenant mechanism with parts in section; Fig. 14 is a vertical section in the same plane as Fig. 9, showing some parts in a different position, and also showing the neck mold, nipple, and plunger; Figs. 15 and 16 are vertical sections of blow head and blank mold in two subsequent positions; Fig. 17 is a side elevation of the invertible head and the parts carried thereby, partly in section; Fig. 18 is a horizontal section through the invertible head, substantially on line 18—18 of Fig. 17; Fig. 19 is a bottom view of the invertible head, with the blank mold and neck mold open; Fig. 20 is a top view corresponding to Fig. 19; Fig. 21 is a vertical section on line 21—21 of Fig. 18; Fig. 22 is a detail axial section of the nipple and nipple holder, in connection with the plunger; Fig. 23 is a vertical section of the slide carrying the invertible head, taken on line 23—23 of Fig. 24, the latter being an end elevation of said parts, looking outward; Fig. 25 is a top view of the same parts; Fig. 26 is a vertical section on line 26—26 of Fig. 25; Fig. 27 is a detail horizontal section on line 27—27 of Fig. 23; Fig. 28 is a detail section on line 28—28 of Fig. 24; Figs. 29 and 29ª are sections of the central valve, on lines 29—29 of Fig. 30 and 29ª—29ª of Fig. 29 respectively; Fig. 30 is a horizontal section on line 30—30 of Fig. 29; Fig. 31 is a top view of a piston valve controlling the passage of air to the blow head and nipple; Fig. 32 is a vertical section on line 32—32 of Fig. 31; Fig. 33 is a horizontal section on line 33—33 of Fig. 32; Figs. 34 and 35 are cross sections on lines 34—34 and 35—35 respectively of Fig. 32; Fig. 35ª is a section taken in the same plane as Fig. 32, with parts in a different position; Fig. 36 is a vertical section on line 36—36 of Fig. 41, showing the blow mold and adjacent parts; Fig. 36ª is a view similar to Fig. 12, showing an air connection for the blow mold; Fig. 36ᵇ is a partial vertical section substantially in the plane indicated by the line 36ᵇ in Fig. 3; Fig. 37 is a front elevation of the blow mold carrier; Figs. 38 and 39 are vertical sections on lines 38—38 and 39—39 respectively of Fig. 37; Fig. 40 is a vertical section on line 40—40 of Fig. 36; Fig. 41 is a horizontal section on line 41—41 of Fig. 36; Fig. 42 is a partial view corresponding to Fig. 40, but showing a different position of a plate valve; Fig. 43 is substantially a horizontal section on line 43—43 of Fig. 42; Fig. 44 is a detail vertical section on line 44—44 of Fig. 36; Fig. 45 is a vertical section of a gear box and mechanism contained therein, taken on line 45—45 of Fig. 46, the latter being an elevation of said parts; Figs. 47 and 48 are detail vertical sections of certain parts of the gear box mechanism; Fig. 49 is a bottom view of the cut-off knife and certain other mechanism operating near the outlet of the furnace, with parts in section; Fig. 50 is a vertical section on line 50—50 of Fig. 49; Figs. 51 and 52 are horizontal sections on lines 51—51 and 52—52 respectively of Fig. 45; Fig. 53 is a detail elevation of the cams contained in the gear box; Figs. 54 and 55 are horizontal sections of said cams and the adjacent parts, taken in the plane indicated at 54—54 in Fig. 53, and showing two different adjustments of the cams; Fig. 56 is a bottom view of the knife mechanism; Fig. 57 is a vertical section on line 57—57 of Fig. 56; Fig. 58 is an elevation, partly in section on line 58—58 of Fig. 49, but showing the knife in a different position; Fig. 59 is a horizontal section on line 59—59 of Fig. 46; Fig. 60 is a plan of some of the parts shown in Fig. 59, in a different position; Fig. 61 is an elevation of certain parts shown in Figs. 59 and 60; Figs. 62 and 63 are horizontal sections, taken in the plane indicated by the line 62—62 of Fig. 61, and illustrating two different positions of certain parts; Fig. 64 is a vertical section on line 64—64 of Fig. 59; Fig. 65 is a plan view of a "forming cup", with parts in section; Fig. 66 is an elevation of one-half of the forming cup, with parts in section; Figs 67 and 68 are vertical sections on lines 67—67 and 68—68 respectively of Fig. 65; Fig. 69 is a vertical section illustrating the relation of the glass outlet on the furnace, the knife, the forming cup, and the upper portion of the blow head; Fig. 70 (Sheet 18) is a developed elevation of an operating cam; Figs. 71 and 71ᵃ are vertical sections on line 71—71 and 71ᵃ—71ᵃ respectively of Fig. 70; Fig. 72 (Sheet 3) is a developed elevation of another cam; Fig. 73 is a vertical section on line 73—73 of Fig. 72; Fig. 74 (Sheet 27) is a plan of certain other cams, with parts broken away; Figs. 75, 76 and 77 (Sheet 3) are vertical sections on lines 75—75, 76—76, and 77—77 respectively of Fig. 74; Fig. 78 is a detail horizontal section on line 78—78 of Fig. 77; Figs. 79 and 80 (Sheet 28) are detail vertical sections on lines 79—79 and 80—80 respectively of Fig. 41, but Fig. 80 shows the blow mold closed.

Before describing the details of the machine illustrated by the drawings, I will give a brief outline of its construction: About a normally stationary vertical axis is adapted to rotate a carrier on which are mounted sets of cooperating parts sharing the rotation of said carrier. Each of said sets comprises a blow head located at the upper portion of the carrier, a blow mold located at the lower portion of said carrier, beneath said blow head, and an invertible head located between said blow head and said blow mold. This invertible head is mounted on a slide traveling along uprights forming part of the rotary carrier, and is capable of turning on said slide about a horizontal axis radial with respect to the vertical axis of the carrier. The invertible head carries a separable blank mold, a separable neck mold, and a plunger movable lengthwise of the axis of said two molds. Above the blow head (which rotates with the carrier) is located a stationary device for delivering glass through the blow head into the blank mold and neck mold at the time these two molds are in an inverted position and in operative relation to said blow head. This stationary device is also provided with a cut-off knife or flow-controlling mechanism operated by the rotation of the carrier. After certain operations have been performed with the invertible head in the upper position just referred to, the invertible head is lowered and also turned about its horizontal axis to bring the parison and the neck mold, in an upright position, into operative relation to the blow mold, whereupon the parison is blown to the final form, and the completed article removed. The entire machinery rotating about the vertical axis, together with the support or base on which said rotating machinery is supported, may be moved toward and from the stationary glass-delivery device, so as to afford easier access to the parts.

In detail, the construction illustrated is as follows:

At 100 (Figs. 1, 2, 3 and 7) I have indicated the wall of a glass-melting furnace of any suitable construction, with an auxiliary furnace or tank 101 (Figs. 46, 49, 57 and 58) receiving glass from the main furnace and delivering said glass, at times, through the outlet 102 (Figs. 49, 57 and 69), as will be described below. The manner of conveying the glass from the main furnace to the tank 101 is immaterial to my invention, and this detail has not been illustrated. Adjacent to the furnace wall 100 I have shown a chamber or pit 103 (Fig. 2) provided with spaced ledges 104 on which are located parallel rails or tracks 105, 106 (Figs. 3 to 6) extending toward and from said wall. The rail 106 (Fig. 5) is shown of uniform thickness, but the rail 105 (Fig. 4) has its top portion 105′ of slightly reduced thickness, the side surfaces of said reduced portion being accurately finished to form efficient guides for the depending flanges 107′ of a horizontal runner 107 adapted to straddle, and slide along, the said rail 105. This runner is secured rigidly to the base 108, also carrying rigidly another runner 109 parallel with the runner 107 and having a flat lower surface adapted to slide along the top surface of the track or rail 106. With this arrangement, it is not necessary to place the rails 105, 106 at an exact distance from each other, as would be required if both rails and shoes were of the construction shown at 105, 107; also, any warping of the rails or runners will interfere less with the sliding movement of the base 108. To enable the base and the parts carried thereby to be moved along the rails 105, 106, the following construction may be employed: On the base 108 is secured rigidly a nut or internally-threaded socket 108' (Fig. 2) into which is fitted a horizontal screw shaft 110 journaled in a stationary cross bar 111 and held against longitudinal movement. On this shaft is mounted rigidly a pinion 112 in mesh with another pinion 113 on a shaft 114 likewise journaled in said cross bar 111 and in a stationary bearing 115. The shaft 114 may be rotated in one direction or the other, by rocking the actuating lever 116 mounted on said shaft loosely and operating it by means of a pawl-and-ratchet mechanism of reversible character, various forms of such mechanism being well-known, so that I have deemed it unnecessary to illustrate this pawl-and-ratchet mechanism. In order that the normal position of the base and of the machinery carried thereby (which is the position near the furnace, as illustrated in the drawings) may be determined accurately, I have provided a stop 117 (Fig. 6) in the path of the sliding parts, for instance adapted to engage the runner 107, and preferably said stop, while normally stationary, is adjustable lengthwise of said path, as by making said stop in the nature of a screw fitted into a threaded opening at the inner end of the rail 105, and locked, after adjustment, by a nut 118. The base 108 carries rigidly a central vertical pillar 119 (Fig. 1) having a reduced upper portion 119', and to this pillar is secured a plug 120 cooperating, in the manner described hereinafter, with a rotary valve to control the supply of air to the blow heads and molds during the several operations. To the upper part of the pillar portion 119' is further secured rigidly a spider-like support 121 for certain cams described below. The parts mentioned so far are all stationary during the normal operation of the machine.

The base 108 (Fig. 1) is provided with a cylindrical portion 108'' forming a guide for the lower hub portion 122 of the rotary carrier. An annular ball bearing 123 is interposed between the base 108 and the adjacent portion of the carrier. To the annular lower portion 124 of the carrier is also secured rigidly a rim 125 provided with spur teeth in mesh with a pinion 126 on a vertical shaft 127, journaled in a bearing 128 on the base 108. At its lower end the shaft 127 carries rigidly a bevel wheel 129, in mesh with a bevel pinion 130 on a horizontal shaft 131 journaled in brackets 132, 133 rigid with the base 108. The shaft 131 also carries a spur gear 134 in mesh with a pinion 135 on the horizontal shaft of an electric motor 136 suitably secured to the base 108. By this arrangement the entire carrier connected with the toothed rim 125 will be rotated continuously on the base 108.

Rigidly secured to the carrier portion 124 with their lower ends are parallel uprights 137 (Figs. 1, 7 and 41), equidistant from each other, and all at the same distance from the axis about which the carrier rotates, which is the vertical axis of the pillar 119. The upper portions of the uprights 137 are secured rigidly to the outer ends of radial arms 138 (Fig. 7), the inner ends of which are secured to the periphery of an upper hub portion 139 surrounding the pillar portion 119' below the support 121, and preferably resting on a ball bearing 140.

With the upper portions of the uprights 137 are connected the blow heads, constructed as follows (Figs. 8 to 11 and 13) : To said uprights are secured arms or brackets 141 arranged in pairs, the brackets of the same pair converging outwardly and carrying on their opposing faces two vertical guide ribs 142. One of these ribs is made with rack teeth 143 in mesh with a pinion 144 (Fig. 9) carried by a horizontal shaft 145 journaled in the blow head body 146. This body 146 has vertical grooves to receive the guide ribs 142 (see Fig. 8) and it will be understood that by turning the shaft 145 in one direction or the other, the blow head body 146, together with the parts carried thereby, may be adjusted up or down, the brackets 141 having vertical slots 147 (Fig. 9) to allow such vertical movement of the shaft 145. A cover 148 is preferably provided on the body 146 to protect the pinion 144. Normally, the shaft 145 is locked against rotation and against vertical movement, for instance by means of a nut 149 screwed on one end of the shaft and adapted to press a washer 150 against the adjacent face of the bracket 141. At the other end of the shaft 145, I have shown an angular head 145', to which a wrench or key may be applied to turn the shaft after the nut 149 has been loosened.

With the blow head body 146 is connected yieldingly, a slide carrier 151 which, like said body, has vertical grooves to receive the guide ribs 142, so that the carrier 151 will be guided for vertical movement. Bolts 152 secured rigidly to the carrier 151 extend upwardly through suitable vertical holes in the body 146 above said carrier, said bolts having heads 152' adapted to engage washers 153 on the blow head body 146, when the carrier 151 is free to move downwardly under the influence of springs 154 interposed between the carrier and the blow head body, and coiled around the bolts 152. When, however, the carrier 151 is raised slightly at the time the blank mold is in the upper position, as described below, the springs 154 will be compressed and the bolt heads 152' will come out of contact with the washers 153 as shown in Fig. 9. Of course, these washers might be omitted, and the bolt heads engaged directly with the upper surface of the blow head body 146.

The blow head body 146 has a funnel-shaped passage 155 the lower end of which extends into a suitable opening of the carrier 151 and close to the path of an upper slide 156 having an opening or passage 156′ of circular cross section adapted for registry with said funnel-shaped passage. The longitudinal side surfaces and the upper surface of the slide 156 are adapted to engage corresponding guides 157 (Fig. 10) on the carrier 151, while the lower surface of the slide 156 is adapted to engage the upper surface of a lower slide 158 having flanges 158′ the vertical and lower surfaces of which are adapted for engagement with horizontal guide grooves 159, parallel to the guides 157. The lower slide 158 also has a passage adapted to register with the passages 155, 156′, said passage of the lower slide being formed of two superposed funnels 160, 161, the outlet of the lower funnel 161 being smaller than that of the upper funnel, and of about the same size as the bottom opening of the blank mold. The adjacent portions of the funnels 160, 161 are nested, but out of contact, so that an annular space is left between them, by which communication is established with a chamber 158″ into which the funnel 160 projects. The relative movement of the two slides 156, 158 is limited adjustably by means of nuts 162 adjustable on the threaded end of a rod 163 which is secured rigidly to the lower slide 158 and extends in a direction parallel to the path of both slides. This rod 163 passes through a guide sleeve 164 secured rigidly to the upper slide 156 and adapted to impinge against the lower slide 158, which may be made with a recess 158ᵃ (Fig. 9) at the point engaged by said sleeve 164 in the position shown in Fig. 16. The lower funnel 161 is exchangeable to fit different blank molds, and is shown set in a recess of the slide 158, being held in position by a bottom plate 165 secured to the slide rigidly by screws 166 (Fig. 9) and having an opening for said funnel 161 and another opening in which is secured rigidly a disk 167 recessed in its lower surface, as at 167′, for a purpose to be stated presently in connection with the operation of the blank mold. To limit the outward movement of the lower slide 158, I provide a stop screw 168 (Figs. 10 and 16). adjustable lengthwise of the path of said slide, in the threaded opening of a bracket 169 secured to an extension 151′ of the carrier 151. A lock nut 170 holds the screw 168 in its adjusted position.

The bottom plate 165 has upwardly-converging inclined surfaces 165′ (Fig. 10) parallel to the paths of the slides 156, 158. Near the outer end of the bottom plate a lever 171 is pivoted thereto about a horizontal axis 172 transverse to said paths, one end of said lever extending downwardly and carrying a roller 173 rotatable about an axis parallel to the axis 172, while the upper end of said lever has a threaded opening for an adjustable stop screw 174, locked after adjustment by a nut 175, and having its free end or point adapted to engage the upper surface of the plate 165 at a recess 165″.

The following mechanism is provided for the operation of the upper slide 156 (and through it, of the lower slide 158): A rack 176 rigid with the slide 156 is in mesh with teeth 177 on a vertical shaft 178 journaled in a horizontal cross member 179 which connects the two arms 141 of the same pair. This shaft also carries rigidly a pinion 180 in mesh with a rack 181 mounted to slide in the same direction as the slide 156, and through said rack extends loosely lengthwise a screw-threaded rod 182 which is secured rigidly on a slide 183 movable in the same direction as the rack 181 and guided along a plate 184 which is secured, as at 185, to the cross member 179, and at 185′ to a shelf 186 at the upper end of a connecting member 187 secured to the uprights 137 at 188. Nuts 182′, 182″ serve to secure the rack 181 after it has been adjusted to the desired position relatively to the slide 183. The plate 184 has a slot 184′ extending parallel to the path of the slide 183, and through said slot extends a vertical pin 189 fitted into a corresponding hole of the slide 183 so as to move in unison with the slide, the lower end of said pin carrying a roller 190 to be operated by a cam as will be described below. The other end of the pin passes through an upper slide 191 suitably guided along the plate 184 and held in position by a nut 192 on the upper end of the pin 189. A removable cover plate 184″ normally extends over the nut 182′ and the adjacent ends of the rack 181 and slide 183. On the side of the rack 176 opposite to its teeth, said rack is engaged by a roller 193 mounted to turn on a vertical axle 194 extending between the two cross members 179. It will be noted that both the teeth 177 and the roller 193 are of sufficient length to remain in proper engagement with the opposite faces of the rack 176 irrespective of the different positions or levels at which said rack may operate owing to the vertical adjustment of the blow head.

Along the recessed opposing faces of the uprights 137 are disposed gibs 195 having V-shaped guideways for the vertical slide carrying the invertible head with blank mold and neck mold, as will be described below. In order that these gibs may be adjusted to compensate for wear, the engaging surfaces of the gibs and of the uprights are oblique or inclined longitudinally (Fig. 79) so that by moving the gibs up or down, the guideways of the gibs of the same pair may be brought closer together or farther apart. For the purpose of this adjustment, vertical rods 196 are secured rigidly to the upper ends of the gibs 195 and made with a threaded portion extending loosely through corresponding holes in horizontal plates 197 secured to the upper ends of the uprights 137, while nuts 196' screwing on said rods 196, above and below said plates, serve to secure said rods and the corresponding gibs in their adjusted positions.

The vertically-moving slide 198 (Figs. 24 to 26) has parallel edge portions 198' adapted to move in the V-grooves of the gibs 195. This slide, together with the parts carried by it, is balanced by means of a counterweight 199 (Fig. 1) secured to one end of a cable 200 passing over a guide pulley 201 journaled in a bracket 202 secured to the upper hub portion 139. The cable 200 also passes over another pulley 203 journaled in a portion of the connecting member 187 (Fig. 9), and the other end of said cable is secured to the vertical slide 198. At its lower end, said slide has vertical guideways 204 (Figs. 24 and 27) for an auxiliary slide 205 carrying a horizontal pin 206 on which is journaled a roller 207, the pin being held in position by a nut 208 cooperating with a cover plate 209 also engaging the guideways 204. The slide 198 and the auxiliary slide 205 are provided with aligning vertical holes or recesses threaded in opposite directions to cooperate with the correspondingly-threaded portions of an adjusting screw 210 having a head 210' for turning it. The roller 207 is adapted to engage a cam to be described below, for raising and lowering the slide 198 at proper times; in its lowermost position, the said slide rests on a lug 124' (Fig. 1) projected upwardly from the lower carrier portion 124 and engaging the bottom surface 205' at that time.

In a bearing 198" at the upper portion of the slide 198 is journaled to rotate about a horizontal axis radial with respect to the axis about which the carrier rotates, a sleeve 211 (Fig. 23) (with the interposition of a bushing 212) having at one end a flange 211' connected rigidly with the invertible head 213 (Fig. 25) on which the blank mold, neck mold, nipple, and plunger are supported as described below. To the sleeve 211 is secured rigidly a pinion 214 in mesh with a toothed sector 215 mounted on a horizontal axle 216 secured to the slide 198 by a nut 217, the opposite end of the axle having a head 216' with flattened surfaces for the application of a wrench. The sector 215 has a hub 215' with a reduced portion 215" (Fig. 28) of circular cross section surrounded by the hub portion 218' of an arm 218 carrying a roller 219 adapted to be operated by a cam described below. The opening 218" of the hub 218' is of elongated form (Fig. 24) the outline of said opening comprising two short rectilinear central portions parallel to each other at a distance substantially equal to the diameter of the reduced hub portion 215", and at each side of said rectilinear portions, two semicircular portions of substantially the same diameter as said reduced hub portion 215". In line with the major diameter of the elongated opening 218", the arm 218 has two threaded sockets 220 into which are fitted adjustably screws 221 the inner ends of which engage the hub of the sector at surfaces 222 concentric with the axle 216. This arrangement permits the arm 218 to be adjusted in the direction of the major diameter of the opening 218", thereby varying the distance of the roller 219 from the center of the axis 216. Nuts 223 serve to hold the arm 218 in adjusted position, and for the same purpose I have further provided screws 224 the heads of which are adapted to bear against washers 225 engaging the arm 218, while the shanks of the screws extend through slots 226 in said arm, said slots being parallel to the major diameter of the elongated opening 218". The threaded ends of the screws 224 are fitted into correspondingly threaded openings of the sector 215.

An angular adjustment of the arm 218 relatively to the sector 215 is provided for as follows: The width of the slots 226 is sufficiently greater than the diameter of the screws 224 to allow a certain swinging or circumferential movement of the arm 218 relatively to the sector 215. On the said sector are two parallel threaded sockets 227 extending transversely to the arm 218 and receiving screws 228 the heads of which abut against lugs 229 on said arm. Nuts 230 lock said screws after adjustment.

On the invertible head 213 are secured two parallel axles 231 (Figs. 18, 19 and 25) located at equal distances from the horizontal axis about which the head swings, and in a plane perpendicular to said axis. On said axles are mounted to turn arms 232 (Figs. 17 to 19), with the interposition of bushings 233 at the hub portions of said arms, each arm having two aligning, spaced hub portions the opposing edges of which are indicated at 232' in Fig. 17. The arms 232 carry brackets 232" having parallel threaded apertures through which extend adjustable screws 234 locked by nuts 234' and directed toward the respective axles 231. The ends of the screws engage a flat surface on a triangular member 235 the hub portion of which is mounted on the axle 231 loosely between the edges 232', so that by adjusting the screws 234 the position of the arm 232 relatively to the member 235 may be altered about the axle 231. The inner end of said member has a pin 236, parallel to said axle, for connecting said member pivotally with links 237, the other ends of the links 237 having pivotal connections at 238 with a head 239 secured rigidly to one end of a rod 240 mounted to turn with the sleeve 211 but slidable therein lengthwise. The outer ends of the arms 232 have spaced fork members 241 with which are connected pivotally at 242 the separable sections 243 of the blank mold. The sections are provided with brackets 244 to which are pivoted at 244' arms 245 fulcrumed at 245' on brackets 213' carried by the head 213. The axis of the blank mold, and the pivot axes at 231, 236, 238, 242, 244' and 245' are all parallel to each other. When the blank mold is in the closed position (Fig. 18) the axis of the blank mold and the four pivot axes 242, 244' are in the same transverse straight line, and a line connecting the pivot axes 231 and 242 will be parallel to a line connecting the pivot axes 245', 244', said parallel lines being perpendicular to said transverse line, and parallel to the meeting line or plane of the blank mold sections 243. The rod 240 has a longitudinal slot 240' through which extends a transverse rod 246 slidable radially in a hole 211" of the flange 211'. Movement of the rod 240 in the direction away from the blank mold is limited adjustably by means of a longitudinal screw 247 adjustable in a threaded socket 239' of the head 239, and locked by means of a nut 248, the point of said screw engaging the end surface of the flange 211' on the sleeve 211.

The blank mold sections 243, when closed upon each other as in Fig. 21, form a chamber 249 of circular cross section, open at both ends and in the particular example illustrated tapering from one end to the other. Adjacent to the narrow end of said chamber, the mold sections have two inclined faces 250 converging outwardly and adapted for wedging contact with the inclined surfaces 165' of the bottom plate 165 connected with the blow head, see Figs. 9 and 11. The meeting surfaces of the two blank mold sections are preferably made with a step or shoulder as shown in Fig. 18, so that a portion of one mold section will project slightly into the other section, to secure perfect registry of the two mold sections, and said shoulders may have converging surfaces so that a wedge action will be obtained, with greater certainty in the centering and registering action. The said meeting surfaces are arranged, substantially, in a plane passing through the axis of the blank mold when the latter is closed.

Adjacent to the wide end of the chamber 249, the blank mold sections are formed with recesses 251 (Fig. 21) of semi-circular cross section (section perpendicular to the mold axis) and of dovetail formation, see Fig. 21. These recessed portions of the blank mold sections are adapted to fit closely upon corresponding dovetail portions of the carriers 252, to which the neck mold sections 253 are bolted or otherwise secured, said carriers being slidable along aligning spaced guides 254 (Figs. 18 and 19) which are fastened to a plate or bracket 255 rigidly attached to the invertible head 213. The direction in which the slides or carriers 252 move is perpendicular both to the mold axis and to the axis about which the head 213 turns. By means of screws or pins 256 parallel to the mold axis, the carriers 252 are connected pivotally with links 257 extending inwardly and having pivotal connections 258, likewise parallel to the mold axis, with links 259 mounted to swing on the axles 231. These links have projecting arms 259' provided with adjustable screws 260 locked by nuts 261, the heads of said screws being adapted to engage projections 262 rigid on the arms 232. The slides or carriers 252 are urged toward each other by coiled springs 263 (Figs. 20 and 21) interposed between the plate 255 and projections 252' of the carriers, and in order to adjust the tension of said springs, I may provide screws 264 threaded into the plate 255 and rigid with flanged heads 265 against which the outer ends of the springs 263 abut. Nuts 266 serve to hold the screws 264 in their adjusted position.

In its closed position, the neck mold carrier 252 fits with an internal dovetail recess, closely around a dovetail portion of a nipple carrier 267 fitted into a central opening of the plate 255 and secured by a nut 268 engaging the outer surface of said plate, its inner surface being engaged by the enlarged dovetail portion of the carrier 267. Within this carrier is fitted the exchangeable nipple 269 which may be provided with an annular groove 269' adapted to lie flush with the inner or molding surfaces of the neck mold sections 253. The nipple is held in position against an internal shoulder of the carrier 267, by a plug 270 screwing into the inner end of said carrier. The outer end of the nipple is reduced in diameter (Figs. 21 and 22), so as to form an annular chamber 271 between it and the carrier 267, the latter having an exterior annular groove 267' communicating with said chamber 271 by means of a number of radial holes 267". The annular chamber 271 also communicates with the interior chamber 272 of the nipple 269, by means of inclined ducts 269".

In the nipple chamber 272 is adapted to move, lengthwise of the mold axis, a plunger, the cylindrical body 273 of which is adapted to fit into a corresponding central opening 274 of the nipple 269, the widened outer end 275 of the plunger being adapted to engage a stop shoulder 276 formed in said chamber 272. The portion 277 of the chamber 272 is wide enough to form an annular space 278 between said portion and the body 273 of the plunger. The inner or free end of the plunger is preferably tapered, as indicated at 279. The plunger is secured rigidly to a rod 280, on which there is a nut or stop 281 adapted to engage the inner surface of the plug 270. The rod 280 slides in said plug, and also through a gland 282 screwed into a recess of said plug. The forked outer end of the rod 280 has a pin-and-slot connection at 283 with a lever 284 (Figs. 17 and 21) fulcrumed at 285 on a support 286 rigidly secured to the plate or bracket 255. The other end of said lever has an adjustable pivot connection at 287 with a rod 288 mounted on the bracket 255 to slide therethrough in a direction parallel to the rod 246. The opening in the bracket is wide enough to allow a slight lateral motion of the rod 288. Another lever 289 is fulcrumed on the support 286 about an axis 290 parallel to the axis 285, and has a pivotal connection with the rod 288 at 291, and a pin-and-slot connection with the rod 246 at 292. The pivot connection at 287 is at a constant distance from the pivot 291, during the operation of the machine, but by adjusting the pivot 287 toward or from the pivot 291 in the longitudinal slots of the fork at the end of the rod 288 (and then holding the pivot in such position by tightening the nut 293) the position of the lever 284 relatively to the lever 289 may be altered, so as to adjust the normal position of the plunger 273 relatively to the nipple 269. A spring 294, coiled around the rod 288, bears with one end against the bracket 255 and with the other end against a nut 295 adjustable lengthwise on a threaded portion of said rod, so that the tension of the spring may be varied. The spring 294 therefore tends to keep the plunger 273 in its outer or retracted position, with the stop 281 against the inner surface of the plug 270 (Fig. 21) and the rod 246 in its inner position (Fig. 17). Preferably the rod 246 is not in engagement with the walls of the slot 240'.

On the lower slide 158 is provided a projection 296 (Fig. 9) adapted, when said slide is moved in fully, to engage the end of a rod 297 (Fig. 13) mounted to slide horizontally, in the same direction as said slide, in a rib 179' projected downwardly from the lower cross member 179. The opposite end of this rod has a head 298, normally held against said rib by the action of a spring 299 coiled around the rod, one end of said spring engaging the rib 179' on the face opposite to that engaged by the head 298, while the other end of the spring engages a collar 300 fastened on said rod 297. The head 298 is connected by a vertical pivot 301 with a lever or cover 302 fulcrumed on said cross member 179 at 303, to swing about a vertical axis. In the normal position, said lever, which preferably has a knob or button 304 of hard material to resist wear, is in such a position as to form a stop in the path of the rod 246 when the latter moves to its upper position with the vertical slide 198. When however the lever 302 is moved away from the rib 179', by the action of the projection 296 on the rod 297, the knob 304 will no longer be in position to be engaged by the upper end of the rod 246, but will clear the path of said rod, so that the latter may enter a vertical hole 305 (Fig. 9) provided in the cross member 179 in line with the said path. The lever 302 and its knob 304 will therefore normally cover said opening 305 at its lower end, but will clear said opening when the lever is moved aside by the action of the lower slide 158. In its swinging movement, the free end of the lever 302 is guided by the lower surface of a projection 179'' on the cross member 179.

In order to guide the invertible head 213 as it approaches or leaves its upper position, the vertical sides of said head are adapted to engage vertical guide ribs 306 (Figs. 9, 10 and 11) secured on the inner faces of opposing brackets 307 projecting from the brackets 141. The lower ends of these ribs are beveled to form diverging surfaces, and the head 213 preferably has similar diverging surfaces 213'', so as to properly position and guide head 213 (Fig. 21) as it rises.

The longitudinal movement of the rod 240, for opening and closing the blank mold and the neck mold, is obtained by the following mechanism (Figs. 23, 24 and 25): The rod 240 is connected rigidly, with the aid of a lock nut 308, with the threaded end of a thinner rod 309 extending through another rod 310 likewise fitted to slide in the axial bore of the sleeve 211. The rod 309 has a threaded engagement with the outer portion 310' of the rod 310, thereby holding the latter in position, in conjunction with a nut 311. The parts 240, 309, 310 therefore constitute an extensible rod, thereby enabling the parts to be adjusted for accurate operation. The rod 310 has a reduced portion 310'' forming shoulders engaged by the end of a forked crank arm 312 located between two arms of a fork 313 secured rigidly to a bracket 314' projecting from a bearing carrier 314 bolted to the slide 198. Thus the fork 313 and the arm 312 are compelled to move up and down with said slide 198. On the carrier 314 is secured a bearing 314'' for the sleeve 211, longitudinal motion of said sleeve being prevented by means of collars 211$^a$ screwed on the sleeve and held in position by screws 211$^b$ pressing on clamps 211$^c$. Fibre washers 211$^d$ are preferably interposed between the collars 211$^a$ and the bearing 314''. A cover 214' (Fig. 23, omitted from Fig. 25) extends over the gearing 214, 215. The fork 313 and the arm 312 have aligning apertures through which passes a shaft 315 supported in a suitable bearing 316 at the upper portion of the rotary carrier (Figs. 1 and 24). This shaft has no vertical movement, but may be rocked by means of a cam described below, engaging at times a roller 317 at the end of an arm 318 rigid with the rock shaft 315. The forked crank arm 312 straddles the reduced portion 310" of the rod 310, which may turn between the members of said arm, about the axis of said rod; said arm 312 has a key 319 slidable lengthwise in a key-way 315' of the rock shaft 315, so that the shaft and the crank arm 312 are compelled to turn in unison. The shaft 315 extends downwardly a sufficient distance (Fig. 1) to remain in engagement with the fork 313 and crank arm 312 even in the lowermost position thereof.

In order to limit the movement of the invertible head 213 about its horizontal axis, and to accurately determine its final or operative positions, the flange 211' of the sleeve 211 carries two lugs 320, about 180° apart, which are adapted to engage opposite sides of a stop 320' secured to the slide 198 (Fig. 23).

On the lower portion 124 (Fig. 1) of the rotary carrier are provided at intervals upright members 321 supporting mold tables 322 each provided with two horizontal guideways 322' (one of which is shown in Figs. 37 and 38) which extend toward the central portion of the carrier, these mold tables being located exteriorly of the uprights 137. Along these guideways 322' are adjustable inwardly and outwardly, brackets 323 having ribs 323' fitting into said guideways and held in position, after adjustment, by means of screws 324 extending through slots 323" (Fig. 39) which are parallel to the ribs 323'. The adjustment is effected by turning a screw 325 extending parallel to the rib 323' and locked in position, after adjustment by a nut 326. The end portions of the screw 325 are fitted loosely into corresponding openings of the bracket 323, while the central portion of the screw is in threaded engagement with a nut 327 secured to the mold table 322. The upper ends of the brackets 323 are formed with dovetail horizontal guide ribs 328 extending transversely to the direction of the ribs 323'. Along said guide ribs 328 are mounted to slide corresponding portions of the blow mold carriers 329. Preferably, a gib 330 (Figs. 36, 41 and 44) is employed at one side of the guide 328, said gib being adjustable lengthwise to compensate for wear, for which purpose the engaging surfaces of the gib and of the guide 328 are oblique with reference to the direction of the sliding movement, in the same manner as has been explained with reference to the gibs 195 and uprights 137. The gib 330 has an eye 330' through which extends loosely a screw 331 rigidly secured to the sliding mold carrier 329, and parallel to the direction of the sliding movement. Nuts 332 serve to secure the gib 330 after adjustment.

To each of the carriers or slides 329 is secured rigidly, yet detachably, as by means of pins 333 and 334, a blow mold section 335. The two sections have recesses adapted to form a mold cavity of a shape corresponding to that of the finished article to be produced, and their meeting faces are preferably of the same nature as explained above in connection with the blank mold sections. Each of the blow mold carriers 329 is connected pivotally at 336 (Fig. 40) with a link 337 extending lengthwise of the direction in which said carrier is adapted to slide. The other end of such link is connected pivotally at 338 with a lever 339 fulcrumed at 340 on a bracket 322ᵇ secured to the table 322. The lower end of each lever 339 is connected pivotally at 341 with a preferably extensible link 342, the adjacent ends of the two links 342 of the same pair being connected pivotally at 343 with a lever 344 journaled at 345 in a bearing 346 mounted on the rotary carrier. The downward motion of the right-hand arm of the lever 344 (Fig. 40) is limited by a vertically-adjustable normally stationary stop screw 344'. The lever 344 carries a roller 347 adapted to be operated by a cam, as referred to below, to cause the blow mold to open and close at the proper times. It will be understood that the axis of each blow mold is vertical, and in line with the axis of the corresponding blow head located above such mold. The machine illustrated has fifteen sets each comprising a blow head, a blow mold, and an invertible head carrying plunger, nipple, blank mold and neck mold, the latter cooperating alternately with the blank mold and with the blow mold, and the blank mold also cooperating with the blow head at certain times, as will be set forth in detail below.

On each mold table 322 is secured a support 348 (Fig. 36) for the blow mold bottom 349, said support being in line with the axis of the blow mold and of the respective blow head. Preferably the support is adjustable vertically, being secured in position after adjustment, by nuts 350, 351. The blow mold bottom 349 has an annular horizontal rib 349' to effect an accurate fit with the blow mold sections 335, which are made with corresponding grooves. I prefer to render the blow-mold bottom self-adjusting within certain limits, for which purpose the upper end of the support 348 is curved spherically or cylindrically, so as to allow the bottom 349 to swing relatively to the support 348, about a horizontal axis intersecting the vertical axis of the support; for instance, a horizontal pin 352 may be secured to the mold bottom, said pin extending through a diametrical hole in the support 348, to form a pivot about which the bottom 349 may swing, within limits defined by the width of the annular space intervening between the upper end of the support 348 and the inner wall of the bottom socket into which said end projects.

The following device is employed for controlling the flow of glass from the outlet 102 of the auxiliary furnace 101, to the funnel-shaped passage 155 of the blow head body 146 and to the blank mold 243, neck mold 253, and nipple 269 (Figs. 49, 50, 56, 57, 58): It will be understood that the axis of the outlet 102 is so located that as the carrier rotates, the axis of the funnel passage 155 of each set will at a certain time be exactly or approximately in line with said outlet axis. Adjacent to the outlet 102 is a stationary perforated wear-plate or guide-plate 353, along the lower surface of which a knife 354 is arranged to slide or reciprocate. At its forward or cutting portion, the knife is V-shaped, and the bottom or angle of the V-groove is inclined upwardly and forwardly, as shown best in Fig. 57. To facilitate replacement in the case of wear, the knife blade 354 is a separate piece set loosely on a carrier 355, the latter having a pin 356 projecting upwardly into a corresponding recess of the knife blade, and also having longitudinal ribs 355' at each side, to hold the blade 354 in proper position. The front portion of the carrier 355 has a V-groove 357 lying in the continuation of the V-groove of the knife, but preferably the uppermost portion 357' of this groove is vertical instead of inclined, thus forming a shoulder or recess between the inclined groove surfaces of the knife 354 and of the carrier 355. The latter has two horizontal cooling chambers 358 converging in V-fashion, corresponding to the shape of the cutting edge, and two transverse aligning channels 359 communicating with said channels 358 and terminating in aligning horizontal nipples 360. These nipples form trunnions resting loosely in elongated bearing slots 361 (preferably open at the top) formed at the ends of a fork 362 the shank 363 of which carries a nut 364 and washer 364' holding said shank against longitudinal movement relatively to one end 365 of an arm 366 in which said shank is journaled. The arm 366 is mounted to turn on a rod 367 yet held to move lengthwise with said rod, which slides in stationary bearings 368. The other end of the arm 366 carries a roller 369 adapted to travel on the lower surface of a track 370 (Fig. 50) parallel to the rod 367. This track has pivotal connections at 371 with parallel links 372 fulcrumed at 373, and is also connected pivotally at 374 with a rod 375 extending through a stationary guide 376 and carrying an adjustable nut and washer 377, a coiled spring 378 being interposed between the washer and said guide and tending to force the track 370 downward. As the roller 369 travels along the lower surface of this track, the spring 378 will press the arm 366 upward at the knife-carrying end, so that the knife 354 will be held against the wear-plate 353. Owing to the fact that the fork 362 has its shank 363 journaled in the end 365 of the arm 366, one of the trunnions may rise and the other descend, enabling the upper surface of the knife to fit with absolute accuracy against the lower surface of said wear-plate. In the normal operation of the knife, the roller 369 remains in contact with the horizontal main portion of the track 370. By means to be described presently, the rod 367 with the knife and the roller 369 can be given an extra or abnormal throw in the direction away from the guide 376, thus carrying the roller 369 out of contact with the horizontal main portion of the track 370, and into engagement with the upwardly-inclined end portion 370' of said track. Since the knife, its carrier, and the parts connected therewith are considerably heavier than the part of the arm 366 carrying the roller 369, gravity will cause the knife to swing away from the wear-plate 353 whenever the roller 369 is moved to the inclined track portion 370', see Fig. 58, thus rendering the knife 354 readily accessible for renewal, since in this position it can be readily lifted from the carrier 355. Under these conditions, the spring 378 will pull the track 370 somewhat to the right of the position Fig. 50, until the adjustable stop nut 379 engages the guide 376. The roller 369 is always in engagement either with the horizontal main portion 370 or with the inclined extension 370' of the track.

The rod 367 is pivotally connected at 380 (Fig. 49) with a link 381 having a pivotal connection at 382 with an elbow lever 383 mounted to swing about a stationary fulcrum 384. The other arm of said lever has a pivotal connection at 385 with a preferably extensible link 386 pivotally connected at 387 with a crank arm 388 keyed on the upper end of a rock shaft 389 journaled in stationary bearings 390 (Fig. 45). To the lower end of said shaft is keyed or clamped the hub of a handle 391, which therefore rocks in unison with said shaft and crank. Adjacent to the handle 391 a three-armed lever is mounted loosely on the shaft 389, one arm 392 (Fig. 52) of said lever having an opening 392' into which is adapted to project, under the influence of a spring 393 (Figs. 47 and 48), the head of a connecting pin 394 mounted to slide in a socket 391' of the handle 391, in a direction parallel to the shaft 389. The coupled position of the handle 391 and lever arm 392 is shown in Fig. 47; when it is desired to release the handle from the lever, so that said handle may be swung independently to the position in which the roller 369 engages the track portion 370', and the knife drops to the position shown in Fig. 58, the pin 394 is pulled down by means of the knob 394' at its lower end, to bring the head of the pin out of the opening 392', and the pin may be locked in this position by turning it on its axis so that a cross pin 395 carried by said pin may engage the bottom of the socket 391'. Normally, the ends of the said cross pin are received in longitudinal slots 391" of the socket 391'.

The lever of which the arm 392 forms part, has two other arms 396, 397 (Fig. 52) carrying rollers 398, 399 respectively in engagement with cams 400 and 401 both mounted loosely on a vertical shaft 402 journaled in a gear box 403, the cams being held apart by a collar 404 loose on the said shaft. The cams have lugs 400', 401' respectively projected toward the companion cams exteriorly of the collar 404, and equidistant from the axis of the shaft 402, so that in certain positions (Fig. 55) the two lugs will come in contact. With the cams 400, 401 are connected rigidly gear wheels 405, 406 respectively in mesh with pinions 407, 408 respectively secured to vertical shafts 409, 410 respectively journaled eccentrically in disks 411, 412 respectively. These disks are normally stationary, but are mounted loosely on the shaft 402, and may be adjusted circumferentially by means of two independent horizontal worms 413, 414 respectively journaled in the gear box 403 and in mesh with worm teeth 411', 412' at the peripheries of the disks 411, 412 respectively. The shafts of the worms are provided with handwheels 413', 414' respectively, and not only serve to adjust the disks 411, 412 and with them the shafts 409, 410 about the shaft 402, but also hold the disks against accidental movement. On the ends of the shafts 409, 410 opposite to the pinions 407, 408 respectively, are secured rigidly gear wheels 415, 416 in mesh with pinions 417, 418 respectively which are rigid with the shaft 402. This shaft is driven by means of a universal joint coupling 419 from an extensible shaft 420 (consisting of an upper sleeve portion and a lower rod portion fitted into the sleeve slidably, yet held to rotate therewith), the lower end of which is connected by a similar universal joint coupling 421 (Fig. 1) with a short vertical shaft 422 journaled in the bracket 132 and carrying a pinion 423, in mesh with a spur gear 424 on the shaft 127.

The knife 354 and its carrier 355, together with the rod 367, are arranged to reciprocate in a direction such that the path of the central point of the knife (corner of the V) is tangential to the cylindrical surface which the axes of the blow heads and of the blow molds describe during the rotation of the carrier. The wear-plate 353 is beveled at two opposite edges, one of which is engaged by a plate 425 (Fig. 57) having a corresponding undercut edge and secured to the tank or furnace 101 by bolts 426. The other beveled edge of the wear-plate 353 is engaged by the undercut edge of an adjustable plate 427 having slots 428 (parallel to the path of the knife 354) through which extend vertical adjusting screws 429 threaded in said tank 101. The plate 427 is always adjusted in such a manner that its lower surface will be flush with the lower surface of the wear-plate 353, as shown in Fig. 57, and the knife 354 during its reciprocation engages said plates 353 and 427 alternately. The lower surface of the plate 425 however is normally at a level above that of the lower surfaces of the plates 353, 427. When the lower surface wears unevenly, so that they are no longer flush, their proper relation is restored by adjusting the plate 427 up or down as required. The screws 429 press said plate upward, while another screw 430 presses this plate downward, the upper end of the screw 430 engaging the lower surface of the tank 101, but sliding in or out along said surface as the plate 427 is moved slightly inward or outward simultaneously with its downward or upward movement respectively, said plate 427 being pressed inwardly against the wear-plate 353 by a screw 431 fitted into a post 432 projecting downwardly from the tank 101.

On its lower face, the plate 427 is provided with a channel 427' transverse to the path of the knife 354 and connected with an internal duct 427'' receiving oil continuously from a suitable source through a pipe 433, to lubricate the contact faces of the knife and of the plates 427 and 353 along which it reciprocates.

One of the nipples 360 of the knife carrier 355 is connected to a source of water or other cooling liquid by one of the pipes 434, the other nipple being connected with the other pipe 434 which serves to carry off the liquid which has passed through the channels 358, 359. The pipes 434, which reciprocate with the knife, preferably rest on an additional support 435 secured to the shank 363 by means of nuts 436. The plate 425 has a channel 425' adjacent to the wear-plate 353, so that water for cooling purposes may be admitted through one of the pipes 434' and carried off through the other.

Beneath the outlet 102 of the auxiliary furnace or tank 101, and below the path of the knife 354, is arranged a device which I term a "forming cup", for guiding and forming the glass as it drops from the knife to the funnel-shaped passage 155 of the blow head body 146. This cup (Figs. 59, and 65 to 69) comprises two sections 437, 438 each having a conical or flaring recess 439 connected at the bottom with a semi-cylindrical groove 440, to form together a funnel-shaped passage extending through the cup from top to bottom when the two sections are in contact or "closed", as in Fig. 65. The cup section 437 is connected with two parallel horizontal rods 441 extending transversely to the path of the knife 354, the connection being effected by means of nuts 442 screwed on said rods and engaging the ends of sleeves 443 through which said rods extend, said sleeves being integral with the section 437. The rods 441 have a sliding fit in sleeves 444 integral with the other cup section 438, and also in sleeves 445 projected from a vertically adjustable carrier 446 formed integral with jaws 447 which by means of a clamping screw 448 (Fig. 49) may be tightened upon the vertical guide 449' on a slide 449. A vertical screw 450 is mounted to turn, without longitudinal motion, in a plate 451 secured to the slide 449, said screw being in threaded engagement with the carrier 446, (Fig. 64), so that, after loosening the screw 448, the said carrier may be adjusted up or down by turning said screw 450. The slide 449 moves horizontally along guides 452 (Fig. 49) secured to the tank 101 and parallel to the path of the knife 354. By a vertical pivot 453, the slide 449 is connected with a rod 454 having a longitudinally-adjustable pivotal connection 455 with a crank arm 456 mounted to rock in unison with a vertical shaft 457 journaled in stationary bearings 390' (Figs. 45 and 46). The lower end of said shaft is connected rigidly with a handle 458 of an elastic character and normally snapped into a notch 459' (Fig. 59) in a plate 459 attached to the gear box 403. In this position the slide 449 engages a stop screw 449'' (Figs. 49 and 64) adjustable lengthwise of the guides 452.

To the cup section 438 are secured rigidly, as by screwing them into bosses 444', (Figs. 65 and 66) two pins 460 extending parallel to the rods 441 and provided with heads 461. A plate or cross head 462, mounted to slide on said pins, is normally pressed against the heads 461 by springs 463 coiled around the said pins. To said cross head is secured rigidly, as by nuts 464, a rod 465 parallel to the rods 441 and located between them, in the same horizontal plane. Where the rods 441, 465 extend into the carrier 446, they are provided with rack teeth in their opposing surfaces (see Fig. 59), and an idle pinion 466 journaled in the carrier 446, about a vertical axle 467, meshes with the rack teeth of the rod 465 and of one of the rods 441. The teeth of the other rod 441, and the corresponding teeth of the center rod 465, are in mesh with a long pinion 468, carried by a vertical shaft 469 (Fig. 64) which is journaled in the slide 449 and its plate 451. The vertical adjustment of the carrier 446 relatively to the slide 449 therefore will not disturb the meshing of the pinion 468 with the respective rack teeth of the rods 441 and 465. The center rod 465 has a head 470 (Fig. 59) against which bears a coiled spring 471 the other end of which bears against a washer 472 engaging the carrier 446, the spring therefore tending to move the forming cup sections 437, 438 apart to the open position shown in Fig. 59. Copper washers 442' (Fig. 65) serve to obtain liquid-tight joints.

At the lower end of the rock shaft 469 is secured a crank arm 473, pivotally connected at 474 with a link 475 the other end of which is mounted to slide in a sleeve 476 having a pivotal connection at 477 with a lever 478 fulcrumed at 479 on the cover of the gear box 403. The lever carries a roller 480 operated by a cam arm 481 which is rotated around the shaft 402 as described below. The outer end of the sleeve 476 is adapted to engage one of the nuts 482 secured to the rod 475, to operate said rod outwardly (toward the right in Fig. 59). The lever 478 also carries a projection 483, adapted to ride at times along an inclined surface 484 (Figs. 61, 62 and 63), and at others to lie against a stop surface 485, both of said surfaces being formed on a lever 486 fulcrumed at 487. At 488, the lever 486 is connected pivotally with a rod 489 passing through a stationary guide 490 and a spring 491 coiled on said rod, tends to press the connection 488 toward the shaft 402, such inward movement being limited by nuts 492 screwed on the outer end of the rod 489. The lever 486 has a rounded surface 493 adapted to be engaged by the outer end of the cam arm 481 as the same sweeps along during the rotation of the shaft 402. Furthermore, at 494 the lever 478 is connected pivotally with a rod 495 at the other end of which is a piston 496 fitted to slide in a cylinder or dash-pot 497 which is fulcrumed at 498 to the cover of the gear box 403. The action of the dash-pot may be regulated by means of a cock or valve 499 for increasing or decreasing the effective cross section of the passage from the head of the dash-pot to the surrounding air. The cylinder 497 has lateral holes 500 adapted to be covered and uncovered at times by the piston 496, as will be described below.

The cam arm 481 is driven as follows: Said arm is integral with a sleeve 501 (Fig. 45) journaled in the cover of the gear box 403 and the upper end of the shaft 402 extends into said sleeve loosely. A gear wheel 502, mounted to turn in unison with said sleeve, meshes with a pinion 503 at the upper end of a vertical shaft 504 journaled eccentrically in a disk 505 which is normally stationary, but may be adjusted around the shaft 402, by means of a worm 506 engaging worm teeth 505' on the periphery of said disk, said worm being journaled on the gear box 403 and provided with a handwheel 507 (Fig. 51). On the lower end of the shaft 504 is keyed or otherwise secured a gear wheel 508 in mesh with the pinion 417.

To properly guide the invertible head in the neighborhood of its lower position, in which it is in operative relation with the blow mold, two spaced vertical guide ribs 509 (Figs. 1, 25 and 36) carried by brackets 510 secured to the uprights 137, are arranged at the lower part of the machine, in alignment with the upper guide ribs 306, and the upper ends of the lower ribs 509 have upwardly diverging inclined surfaces 509', corresponding to the downwardly diverging inclined surfaces shown in Fig. 10 at the lower ends of the upper guide ribs 306.

The air connections of the machine are as follows: The plug 120 (Figs. 1, 7, 29, 29ª and 30) has two vertical channels 511, 512 screw-threaded at their upper and lower ends, one end of each channel being closed by a plug 513. The other ends of the channels 511, 512 are connected by pipes 514, 515 respectively (Fig. 1) with sources supplying compressed air at two different pressures, the high-pressure connection being through pipe 514 to channel 511, and the low-pressure connection through pipe 515 to channel 512. From each of the channels 511, 512 a duct 516, 517 respectively leads outwardly to a peripheral groove 518, 519 respectively, the circumferential extent of the groove 518 being greater than that of the groove 519, in the particular embodiment shown. The two grooves are in the same plane of rotation, and the conical outer surface along which said grooves extend, is in contact with the conical inner surface of a rotary valve 520 having evenly spaced ducts 521 adapted for registry with the grooves 518, 519. There are as many ducts 521 as there are sets of blow heads, invertible heads, and blow molds, that is to say, fifteen in the particular example illustrated. Fig. 30 shows that each groove 518, 519 always communicates with a plurality of ducts 521. Into the threaded outer ends of the ducts 521 are screwed the inner ends of metal pipes 522. The rotary valve 520 is confined between two collars 523, 524 screwed on the plug 120 and preferably clamped or set tight, for instance by means of screws 523', 524', pressing against clamping pieces 523'', 524'' respectively. The outer ends of the pipes 522 are secured at 525 (Fig. 8) to a valve casing or cylinder 526 suitably fastened as at 527 to the connecting member 187. The valve casing or cylinder 526 has another connection or nipple 528 (Figs. 9, 32, 34 and 35) from which a rigid pipe 529 leads to a flexible pipe 530 connected to a nipple 531 in communication with a passage 158ᵇ leading to the chamber 158''. Another nipple 532 of the cylinder 526 is connected by a rigid pipe 533 (Figs. 8, 9, 11 and 12) with the interior of a casing 534 on the cross member 179. This casing receives a downwardly-projecting nipple 535 (Fig. 12) held in position by a nut 536 and provided with a longitudinal vertical channel 537. A perforated washer 538 of leather or other suitable material is held against the lower surface of the nipple 535 by a nut 539.

The washer 538 is for the purpose of establishing an air-tight joint, when the invertible head 213 is in its upper position (Fig. 11), with a nipple 540 projected from said head (Fig. 17) and communicating with a channel 541 which passes to one side of the axis of the head and is vertical when the head is in its upper position. The other end of the channel 541 communicates with a channel 542 (Fig. 18) arranged at a right angle thereto, but in the same plane perpendicular to the axis of the head. From the inner end of the channel 542, a duct 543, parallel to the axis of the head, leads outwardly, to communicate with an aligned channel 544 located in the plate or bracket 255 and communicating with the groove 267' of the nipple carrier 267. A leather washer 545 (Fig. 17) is interposed between the adjacent ends of the duct 543 and channel 544 to obtain a tight joint at this place.

The valve casing or cylinder 526 has still another nipple 546 connected by a pipe 547 (Figs. 7 and 8) with an upright pipe 548 (Figs. 7, 36 and 41) running along one of the uprights 137 and connected at the bottom by a pipe 549 with a casing 534' having a nipple 535' corresponding to the upper nipple 535. The construction of the lower nipple is shown in detail in Fig. 36ª, and as it is substantially like the upper nipple shown in Fig. 12, it will be unnecessary to repeat the detailed description, particularly as similar reference numerals have been used to designate corresponding parts in Figs. 12 and 36ª.

Within the valve casing or cylinder 526 (Figs. 31 to 35 and 35ª) is mounted to slide a piston valve or plunger 550 the projecting end of which carries a roller 551 adapted to be engaged, as described below, by a cam which presses said piston valve inwardly against the tension of a coiled spring 552 one end of which bears against said valve and the other against a screw plug 553 at the corresponding end of the cylinder 526. In order that the roller 551 may always engage its cam properly, the piston valve 550 is held against turning relatively to the cylinder 526, as by means of a screw 554 the inner end of which projects into a longitudinal groove 555 also serving as an air exhaust, in conjunction with an annular groove 556. The part of the cylinder chamber between the piston valve 550 and the cap 553 is in permanent communication with the outside air, as by an aperture 557, so that the valve may move freely. The valve is made with a longitudinal passage 558 extending in a vertical plane which also contains the inner ends of parts of the nipples 525, 528 and 546. The nipples 528 and 546 are equidistant (longitudinally) from the supply nipple 525, and the length of the slot or passage 558 corresponds to this distance; in Fig. 32 the nipples 525 and 528 are connected by said passage, while in the position Fig. 35ª the passage 558 connects the nipples 525 and 546. At the end of the passage 558 nearest the roller 551, there is a horizontal duct 559 intersecting said passage; this duct is adapted to register with the port at the inner end of the nipple 532, at a time when the passage 558 communicates with the supply nipple 525, see Fig. 33.

To the slide 449 is secured an inclined trough 560 (Figs. 46, 59 and 64) located at one side of the forming cup 437, 438, so that by the movement of said slide along the guides 452, either the forming cup or the trough may be brought into position to receive the glass issuing from the outlet 102. Water supplied through a pipe 561 (Fig. 59) is injected or sprayed into the trough 560 at its upper end through a spray head or nozzle 562 having a plurality of narrow openings. The forming cup 437. 438 also has cooling means as follows (Figs. 65 to 68): The pins 460 with their heads 461 have axial passages, connected at the head ends with pipes 563, 564 respectively, one of which serves to supply cooling water, and the other to carry off the water from a set of cooling channels 565 in the forming cup section 438, said channels communicating with the passages of the pins 460, by ducts 566 in the bosses 444'. Similarly, the forming cup section 437 has a set of cooling channels 567 connected with annular chambers formed in the sleeves 443 by making the rods 441 with reduced portions 441'. The rods also have apertures 441'' by which their interior communicates with said annular chamber, and water is supplied to one of the rods by a pipe 568, and carried off from the other by a pipe 569 (both pipes being shown in Fig. 59, and the pipe 569 being also shown in Fig. 46).

The following means are provided for blowing air against the blank mold, the blow mold bottom, and the blow mold, to cool them: A chamber 570 (Figs. 2, 3, 36, and 36ᵇ) is formed adjacent to a portion of the periphery (for instance, about 200°) of the cylindrical portion 108' of the base 108. The outer wall of said chamber is formed by the cylindrical hub portion 122 of the lower portion 124 of the rotary carrier. From the inner wall 108'' of the chamber 570 extend radially inward, base channels 571 the outer ends of which are of rectangular cross section (Figs. 3 and 72), said channels having inner portions of circular cross section into which are fitted the outer ends of pipes 572 (Fig. 2) likewise of circular cross section. The inner ends of the pipes 572 are connected with a wind chest 573 into which air is driven by a fan 574 suitably actuated, as by an electric motor indicated at 575, the said pipes 572, wind chest 573, and its supply pipe 573', being secured to the base 108, while the motor 575, fan 574 and discharge pipe 574' are secured to the bottom of the pit 103. The pipes 573', 574' have a telescopic sliding connection with a substantially airtight fit. In the hub portion 122 are formed ports or openings 122' (Figs. 36 and 36a), two for each set of devices, and from these ports inclined channels 576 lead outwardly, to connect with vertical channels 577 (Fig. 40) in the upright members 321, the upper ends of said channels being connected with a wind box 578 secured rigidly to said upright members 321. At its central portion, the wind box 578 has two superposed openings 579 (Figs. 40, 42) controlled by a vertically-sliding valve 580 which closes them alternately. The lower opening 579 leads to two channels 581 (Figs. 43 and 80) located below the mold table 322, and through openings 322'' in said table the channels 581 communicate with channels 582 having nozzles 583 (Figs. 40, 41, 42 and 80) arranged to discharge air against the blank mold, as will be described below. The upper opening 579 leads to a channel 584 (Figs. 36 and 80) having a nozzle 585 to discharge air against the blow mold bottom 349 (which projects into said nozzle) and against the blow mold itself. The valve 580 is connected with a rod 586 (Figs. 36 and 42) guided in a vertical rib 578' located at the center of the openings 579, a spring 587 tending to keep said rod and valve in their lower position. The upper end of the rod has a pin-and-slot connection at 588 with a crank arm 589 on a rock shaft 590 journaled in a bearing 591 (Fig. 41) carried by a bracket 592 (Fig. 36) on the wind box 578 (Fig. 1). This shaft has another crank arm 593 carrying a roller 594 adapted to be engaged by an angle iron or operating projection 595 (Figs. 26 and 41) on the vertical slide which carries the invertible head.

The spider-like support 121 carries an annular horizontal plate 596 (Fig. 1, 7 and 74 to 77) on which are mounted cams for operating the slides 156, 158 of the blow head, the blank mold and the neck mold, and the piston valve 550.

The following cam arrangement, located above the plate 596, is adapted to cooperate with the roller 190 (Figs. 8 and 9) which controls the movement of the blow head slides 156, 158: A cam having an outwardly-inclined entrance portion 597 (Figs. 74 and 75), a concentric portion 597', and an inwardly-inclined portion 597'' at the exit end, is pivoted about a vertical axis 598 to a plate 599 secured to the plate 596, the lower surface of said pivoted cam being in sliding engagement with the upper surface of the plate 599. The latter is provided with a lug 600 having a threaded hole for the reception of an approximately radial screw 601 extending loosely into an opening 597ᵃ of the cam portion 597'. The screw 601 is held in position by a lock-nut 602, and its outer portion is surrounded by a coiled spring 603 engaging the pivoted cam and tending to swing it outwardly on its pivot 598, said spring being also in engagement with a head 604 adjustable lengthwise with the screw 601 to vary the tension of the spring. To limit adjustably the movement of the pivoted cam, and to determine the normal position of said cam, an inwardly-extending rod 605 is secured rigidly to the cam portion 597, said rod and the cam portion to which it is attached, being guided in a suitable opening of the plate 599 (see Fig. 75), and the free end of the rod 605 carries a washer 606 and adjustable nuts 606'. Adjacent to the inwardly-inclined portion 597'' of the pivoted cam, but spaced therefrom outwardly, is arranged the inwardly-inclined portion 607 of a cam secured to the plate 599 rigidly, said cam also having an outwardly-inclined portion 607' on the exit side, it being understood that the carrier on which the blow head and other parts are mounted, rotates contra-clockwise, as indicated by the arrow in Fig. 74, while the cams shown in this figure do not rotate. The cam portions 597'', 607 are parallel, or approximately so, when the pivoted cam is in its normal position. In registry with the exit end of the cam portion 597'', is the concentric portion 608 of another cam secured rigidly to the plate 596, said cam having an inwardly-inclined portion 608' at its exit end. Located exteriorly of said cam portion 608', and adjacent thereto, is the inwardly-inclined portion 609 of another cam pivoted to the plate 596 about a vertical axis 610 and provided at its exit end with an outwardly-inclined portion 609'. The lower surface of the cam 609, 609' engages a plate 611 similar, in a general way, to the plate 599. To a lug 612 projected from said plate 611 is secured a screw 613, held in position, after adjustment, by a nut 614, and extending into a hole 609'' of said cam. On said screw is also mounted rigidly a head 615, engaged by one end of a spring 616, the other end of which engages the cam 609, 609' and tends to press it inwardly. The cam has a projection 609<sup>a</sup> extending into an opening 611' in the plate 611, and the inward movement of the cam is stopped by the engagement of said projection with the end wall of said opening. Finally, after an interval of about 60°, there are two opposing cams secured rigidly to the plate 596, the first of these cams being placed farther from the center than the other and comprising an inwardly-inclined entrance portion 617 and an outwardly-inclined exit portion 617', while the inner cam comprises an outwardly-inclined entrance portion 618 parallel and adjacent to the cam portion 617', and an inwardly-inclined exit portion 618'.

On the underside of the annular plate 596 are secured the cams for operating the piston valve 550 and for controlling the opening and the closing of the blank mold and of the neck mold.

The cam engaging the roller 551 (Fig. 9) of the piston valve 550 is constructed as follows (Fig. 74). Said cam extends continuously around the plate 596, near its outer edge, and comprises a concentric portion 619, followed by an inwardly-inclined portion 620, another concentric portion 621, nearer the center than the portion 619, an outwardly-inclined portion 622, another concentric portion 623 (which, as shown, may be at the same distance from the center as the portion 619), an outwardly-inclined portion 624, another concentric portion 625, which is at a greater distance from the center than the portion 619, an outwardly-inclined portion 626, a long concentric portion 627 farther away from the center than the portion 625, an outwardly-inclined portion 628, a concentric portion 629, farther from the center than the portion 627, an inwardly-inclined portion 630, a concentric portion 631 (which, as shown, may be at the same distance from the center as the portion 627), and an inwardly-inclined portion 632 connecting the adjacent ends of the concentric portions 631 and 619.

The cam for opening the blank mold 243, by acting on the roller 317 (Fig. 24), comprises two opposing members secured rigidly to the underside of the plate 596 (Fig. 74), adjacent to the cam portion 627, and following the cams 617, 618. The outer member has an inwardly-inclined entrance portion 633 and an outwardly-inclined exit portion 634, while the inner member has an outwardly-inclined entrance portion 635, a concentric portion 636, and an inwardly-bent or inclined exit end portion 637.

At a point about diametrically opposite to the blank-mold-opening cam 633, 634, 635, 636, 637 is located another set of cams for opening the neck mold and for controlling the closing of the neck mold and of the blank mold. This set of cams also comprises two opposing members secured to the underside of the plate 596 and adapted to cooperate with the roller 317. The inner member has an outwardly-bent or inclined entrance end 638, a short concentric portion 639 which projects outwardly, a concentric portion 640 nearer the center than the portion 639, and an inwardly-inclined exit portion 641. The outer member has an inwardly-inclined portion 642 opposing, substantially, the portion 641 of the inner cam member, and an outwardly-inclined exit portion 643. All the cams carried by the plate 596 have their operating faces vertical, so as to operate the respective rollers 190, 551, and 317 inwardly or outwardly.

The base 108 carries a number of standards 644 (Figs. 1, 72 and 73) on which are supported the cams for the turning the invertible head and for raising and lowering the vertical side, on which said head is mounted. The two cams for turning the head are not carried by the standards 644 directly, but by brackets 645, 646 (Fig. 72) secured to said standards. These two cams are adapted for engagement with the roller 219 (Figs. 1 and 18)

23), and each of them comprises opposing upper and lower members. The upper member of the cam carried by the bracket 645 has a downwardly-inclined entrance portion 647, followed by an upwardly-inclined exit portion 648 the end of which is horizontal, as at 649. The lower member of this cam has portions 650, 651, 652 parallel respectively to the portions 647, 648, 649 of the upper cam member, the horizontal portion 652 extending beyond the portion 649, and having at its exit end a downwardly-inclined portion 653. The upper member of the cam carried by the bracket 646 has an approximately horizontal entrance portion 654, a downwardly-inclined portion 655, and an upwardly-inclined exit end 656. The lower member of this cam has an upwardly-inclined entrance portion 657, in advance of the entrance end of the upper member, and portions 658, 659 substantially parallel to the portions 654, 655 respectively of the upper cam member. The uppermost points of the two cams carried by the brackets 645, 646 are at the same level, and their lowermost points likewise.

The cam for lifting and lowering the vertical slide on which the invertible head is mounted, operates on the roller 207 (Figs. 1 and 23), and comprises the following parts: An entrance portion 660 having converging upper and lower walls, an upwardly-inclined portion 661, a horizontal portion 662, another upwardly-inclined portion 663, another horizontal portion 664, a short dip portion 665, a second horizontal portion 666 at the same level as the portion 664, a downwardly-inclined portion 667, a horizontal portion 668 which, as shown, may be at the same level as the portion 662, a downwardly-inclined portion 669, and an exit end 670 with diverging upper and lower walls, located at the same level as the entrance portion 660. It will be understood that the cams carried by the standards 644 and brackets 645 have surfaces to engage the rollers 207 and 219, said rollers being moved up or down by these cams.

The opening and closing of the blow mold 335 is controlled by a cam adapted to engage the roller 347 (Figs. 1 and 40) and carried by standards or brackets 671 (Figs. 3, 70 and 71) secured to the base 108. To the first of these standards is secured an upper cam member having a downwardly-inclined entrance face 672 and an upwardly-inclined exit face 673. To said standard is also secured the upwardly-inclined entrance end 674 of the lower cam, which is followed by a horizontal portion 675 extending to the next standard 671, at which said lower cam has a downwardly-inclined portion 676, whereupon follows a horizontal portion 677 extending to the third standard 671, at which the lower cam terminates with a downwardly-inclined exit portion 678. To the second standard 671 is secured the downwardly-inclined entrance end 679 of another upper cam portion, followed by a horizontal portion 680 extending to the third standard 671. At the exit end of the cam portion 680 is pivoted, about a horizontal radial axis 681, an upper cam portion forming a continuation of the cam portion 680 and comprising a downwardly-inclined portion 682 followed by an upwardly-inclined exit portion 683. Connected with said cam portion 682, 683 in such a manner as to turn therewith about the axis 681, is an arm 684 having a number of apertures 685 at different distances from its pivot 681, for the adjustable suspension of a weight 686 which thus tends to keep such cam in its lower position, such position being determined adjustably by a stop screw 687, threaded into said cam, and engaging a projection 678' on the cam portion 678. A nut 688 locks the screw 687 after adjustment. Like the rollers 207 and 219 (Fig. 1), the roller 347 is moved up and down by the corresponding cams.

In Fig. 3 I have indicated at 689 an endless traveling chain the supports of which turn in stationary bearings and therefore do not rotate about the center of the machine, said chain carrying an ejector (not shown) of any suitable design, said chain being driven continuously by its engagement with teeth 322ª (Fig. 1) provided on the entire circumference of the mold table 322, see Figs. 36 and 41. The ejector mechanism is located adjacent to the cam 672—683 which controls the opening and closing of the blow mold 335.

The operation of the machine is as follows:

Let us assume an initial position in which the outlet 102 is closed by the knife 354 as in Figs. 56 and 57, and the forming cup 437, 438 closed as in Fig. 65, and in its normal position, that is to say, in operative relation to said outlet, substantially as in Fig. 69, and the invertible head, with the blank mold above and the neck mold below, in operative relation to the blow head as in Fig. 9. At a certain moment, outlet 102 is opened to the position shown in Fig. 69, by moving the knife 354 to one side, in a direction tangential to the path of the blow head, and opposite to the direction in which the blow head moves about the axis of hollow shaft 119. This opening movement of the knife is obtained by the action of the rotating cam 401 (Figs. 45, and 52 to 55) on the roller 399, thereby swinging the lever arms 397, 396 and 392. Through the pin 394, which normally is in the connecting position, Fig. 47, the lever arm 392 takes along with it the handle 391 and, since the latter is keyed to the shaft 389, Fig. 49, this shaft is rocked in one direction (contra-clockwise with reference to Fig. 49) until it reaches the position shown in Fig. 49. By means of the crank arm 388, link 386, elbow lever 383, link 381, rod 367 and arm 366, this movement of the rock shaft 389 is transmitted to the fork 362, knife carrier 355 and knife 354, bringing the latter to the position in which it uncovers the outlet 102, as in Figs. 49 and 69. During its movement, the knife 354 is pressed against the wear-plate 353 and the plate 427 (Fig. 57), by the action of the spring 378 (Figs. 49 and 50) which presses the track 370 downward, and by the pressure of said track on the roller 369 traveling along it, tends to turn the arm 366 on the rod 367 in such a manner as to press the knife 354 upward. In its movement, the knife is lubricated by oil supplied from the pipe 433 (Fig. 56) to the channel 427' and duct 427'' of the plate 427. The knife carrier 355 and the knife 354 are cooled by water supplied through one of the pipes 434 to the channels 358, 359 of said carrier, and the plate 425 is cooled by water admitted to the channel 425' from one of the pipes 434'.

When the outlet 102 has thus been cleared, glass will flow from the tank 101 and the depending end of the flowing glass will enter the recess 439 of the closed forming cup 437, 438, the grooves 440 forming a channel, open at the bottom, through which air may escape. The parts are in the position Fig. 69, the forming cup, as stated, being closed, as shown best in Fig. 65. The purpose of this forming cup is to temporarily support the lower end of the flowing glass, so as to preserve its proper shape and prevent undue elongation.

Thereupon follows the cutting or severing movement of the knife 354, which movement is in a direction tangential to the path of the blow head, and corresponding to the direction in which the blow head rotates about the pillar 119, so that the knife and blow head will, to a certain extent, move in the same direction during the cutting operation. This operation is brought about by the action of the cam 400 on the roller 398 (Figs. 45, and 52 to 55), thereby swinging the lever 396, 397, 392 and the shaft 389 in the direction opposite to that described with reference to the action of the cam 401. The knife 354 is thus brought (by the same mechanism as explained above in connection with the opening movement of the knife) from the open position Figs. 49 and 69, to the closed or cut-off position shown in Figs. 56 and 57. The fact that knife and blow head move in substantially the same direction during the cutting operation, causes the glass severed by the knife, to follow the blow head in its rotation, as it were, thus preserving for a greater length of time the relation during which the blow head may properly receive the glass thus severed. A relatively considerable speed may thus be given to the rotary carrier on which the blow head is mounted, and the output of the machine is increased correspondingly.

The timing of the knife movement may be varied without stopping the machine, by operating the hand wheels 413', 414' (Figs. 45, 46, 51, 52), of which the hand wheel 413' operates to turn the disk 411 and through the gearing 415, 407, 405, change the position of the upper cam 400 circumferentially of the shaft 402, while the hand wheel 414' by similar mechanism effects the circumferential adjustment of the lower cam 401. It will be noted that each of these two cams is adjustable independently of the other, and I am thus enabled to time as desired (within wide limits) the opening movement of the knife, and, independently thereof, the closing or severing movement of the knife. Figs. 54 and 55 illustrate two different adjustments of the cams 400, 401 for closing and opening the knife 354 respectively, Fig. 55 being one of the limit positions governed by the engagement of the lugs 400', 401'.

At about the same time with the severing stroke of the knife 354, the forming cup 437, 438 is opened to withdraw the temporary support from the lower end of the flowing glass and to allow the severed glass to drop into the blow head and into the blank mold. The forming cup is cooled by water flowing through its channels 565, 567 from the connections described above. The fully open position of the forming cup as shown in Fig. 59, is obtained by the action of the spring 471. The forming cup is closed for a relatively short time only; for instance, it may be closed during about one-fourth of a revolution of the shaft 402, and open during the remaining three-fourths of a revolution. The opening and closing of the forming cup is obtained by the mechanism shown in Figs. 59 to 64. In Fig. 59, the forming cup is open, and the cam arm 481 is just beginning to press the roller 480 and lever 478 to the right. This will give a like movement to the link 475 and the crank arm 473, thus rocking the shaft 469 and the pinion 468 contra-clockwise. Owing to the engagement of said pinion, on opposite sides, with rack teeth on one of the rods 441 connected with the forming cup section 437, and with teeth on the rod 465 connected with the cup section 438, the cup sections will be moved equally in opposite directions, whenever the pinion 468 is rocked. The contra-clockwise movement of this pinion will cause the cup sections 437, 438 to move toward each other. As the lever 478 swings to the right, its projection 483 will ride on the inclined surface 484 of the lever 486, as illustrated by Fig. 63, the lever swinging slightly on its fulcrum 487, and the spring 491 yielding to permit such movement. As the lever 478 continues to swing to the right, and finally reaches the extreme position shown in Figs. 60 and 62, the projection 483 clears the end of the lever 486, and the latter under the influence of the spring 491, snaps back to its normal position shown in Figs. 59, 60 and 62, and the lever 478 is retained in this extreme position temporarily by the engagement of the projection 483 with the stop surface 485 at the end of the lever 486, this position being illustrated by Figs. 60 and 62. The spring 471 tends to pull the lever 478 toward the left, so as to keep the projection 483 against the stop surface 485. This position corresponds to the closed position of the forming cup, Fig. 65. It will be noted that the springs 463 provide a resilient connection between the rod 465 and the cup section 438, so as to avoid breakage such as might result if glass or some other obstacle prevented the cup sections 437, 438 from closing fully. As the cam arm 481 continues to rotate contra-clockwise from the position shown in full lines in Fig. 60, the forming cup 437, 438 will remain in its closed position until said arm 481 reaches the position indicated in dotted lines and comes into engagement with the lever 486 at the left of its fulcrum 487. As the cam arm 481 turns farther, its outer end will force the left-hand end of the lever outwardly, and therefore the right-hand end inwardly. The projection 483 and the lever 478 will thus be released, and the spring 471 will pull the lever over to the left until it engages the hub portion of the cam arm 481 as in Fig. 59, the cup sections 437, 438 at the same time being moved apart equally, to the position shown in Fig. 59. (The pinion 466 and the rack teeth (on the rods 465 and 441) engaged thereby are not absolutely essential, but avoid one-sided strains. The opening of the forming cup, under the influence of the spring 471, will be quick, so as to reduce the danger of glass sticking to one of the cup sections and being taken along thereby. However, too quick an opening movement would throw the lever 478 against the hub of the cam arm 481 with a sharp blow, and to prevent this, I have provided the dash pot 497. When the spring 471 moves the lever 478 and piston 496 to the left from the extreme position shown in Fig. 60, the movement is quick at first, the dash pot offering practically no resistance as long as air may escape therefrom through the side holes 500 as well as through the opening controlled by the valve 499. The opening movement of the forming cup is however slackened considerably as soon as the dash pot piston 496 moving to the left (Figs. 59 and 60), covers the holes 500, so that the air can escape only through the opening controlled by the valve 499. The forming cup sections 437, 438 therefore will at first move apart very quickly, and then move slowly, and the rate of this slow movement may be adjusted by means of the valve 499.

The timing of the forming cup movements (opening and closing) may be varied without stopping the operation of the machine, by turning the hand wheel 507 (Figs. 46, 51 and 59) which adjusts the disk 505 (Fig. 45) and the cam arm 481 (through connections 508, 503, 502, 501) circumferentially of the shaft 402. It will be understood that this shaft and the cam arm 481 rotate simultaneously, but at a different speed, but the hand wheel 507 enables the said arm to be adjusted circumferentially, to vary its position relatively to those of the cams 401, 400 which govern the opening and the closing or cutting stroke respectively of the knife 354.

The horizontal direction $a$ in which the forming cup sections move toward and from each other (lengthwise of rods 441, 465, Fig. 59) is radial with respect to the axis of rotation of the carrier, and transverse of the direction in which the knife 354 reciprocates. In the particular and preferred arrangement shown, the direction $b$ of the knife movement is perpendicular to $a$, and parallel to a horizontal line intersecting the axes of the shafts 402, 389, and 457.

The forming cup 437, 438 may be adjusted up and down, so as to vary its vertical distance from the tank outlet 102 above and from the blow head below (see Fig. 69) by turning the screw 450 (Fig. 64) in one direction or the other, after loosening the clamp screw 448. This adjustment is to regulate the action according to the smaller or greater viscosity of the molten glass.

The severed gob or charge of glass drops into the inverted blank mold 243 and neck mold 253 at about the point A indicated in Figs. 72 and 74, the blow head 146 and blank mold being in the position shown in Figs. 9 and 11, the relative position of blank mold 243, neck mold 253, nipple 269 and plunger 273 being as indicated in Fig. 14, that is to say, said plunger is in its upper position and fits into the nipple so as to close the blank mold cavity 249 at the bottom and prevent glass from running out. (For details of neck mold, nipple and plunger, see Figs. 21 and 22 which however show the plunger in its lower or outer position). The plunger 273 is in this upper or inner position for the reason that at this time the lever 302 covers the hole 305 as in Figs. 9 and 13, and the upper end of the rod 246 therefore engages the knob or button 304, which thus holds said rod down, and the plunger up. The piston valve 550, with its roller 551 engaging the outer surface of the cam portion 619, is at that time in a position farther in the cylinder 526 than in Figs. 31 and 32, that is to say, in a position intermediate between those shown in Figs. 32 and 33, so as to cut off the air supply nipple 525 from connection with the other nipples of said cylinder. The outlet at the lower end of the funnel-shaped passage 161 (Fig. 9) is preferably smaller than the opening at the upper end of the blank mold 243. Thus the lower edge of said passage will overhang slightly the upper edge of the mold cavity 249, and there will be no danger of the glass being caught by the upper edge of the mold, even if the axes of the mold and of said passage are not in perfect registry.

As the carrier turns (contra-clockwise in Fig. 74), the cam portion 607, engaging the roller 190 (Figs. 8 and 9) imparts an inward movement to the connected slides 191, 183 and to the rack 181, thereby rotating the pinion 180, the shaft 178, and the pinion 177. The latter, by its engagement with the rack 176 secured to the upper slide 156, moves this slide inward from the position shown in Fig. 9, to that illustrated by Fig. 14, the other parts of the blow head remaining as before. While the slide 156 was in the position Fig. 9, the severed glass dropped through the funnel-passage 155 of the blow head body, the passage 156' of the upper slide 156, and the funnels 160, 161 of the lower slide 158 into the inverted blank mold and neck mold below. Thus when the upper slide 156 is moved inward to the position shown in Fig. 14, it passes above the glass charge and closes at the top, a chamber containing said charge.

As the carrier continues to rotate, the cam portion 620 allows the piston valve 550 to be moved toward the center of this machine, that is, farther out of the cylinder 526, by the tension of the spring 552, to the position shown in Figs. 31, 32 and 35, in which the air-supply nipple 525 is in communication with the nipple 528 by means of the longitudinal passage 558 of the piston valve 550. At that time, the rotary distributing valve 520 at the top of the machine (Figs. 1, 7, 29 and 30) is in such a position that the pipe 522 leading to the nipple 525 of the particular blow head under discussion, is in communication with the peripheral groove 518, the duct 516, and the vertical channel 511 connected with a source of high-pressure compressed air, so that such air will pass through the nipples 525, 528, pipes 529, 530, nipple 531 (Fig. 9), duct 158$^b$, chamber 158'', and into the lower funnel 161 through the annular opening or slot between the nested funnels 160, 161. The piston valve 550 remains in the position Figs. 31 and 32 until the roller 551 reaches the cam portion 622, that is to say, as long as the roller travels on the cam portion 621. During this time, therefore, air under high pressure presses downwardly on the charge or parison contained in the blank mold chamber 249 and in the neck mold 253 (Fig. 14), and forces such glass into close contact with the nipple 269 and with the upper end of the plunger 273, thus molding the neck and mouth of the bottle. This downward blow occurs at about the sector marked B in Figs. 72 and 74. At the cam portion 622, the piston valve 550 is moved out to a position in which the supply nipple 525 is again cut off from communication with the other nipples of the cylinder 526, and the valve 550 remains in this cut-off position while the roller 551 travels along the cam portion 623. While the roller 551 engages the cam portions 619 and 623, the piston valve 550 is in such a position that the groove 556 registers with the nipple 528.

As the carrier by its continued rotation brings the particular mold under consideration to the point C, the roller 207 on the vertical slide 198, which roller has been traveling along the uppermost horizontal cam portion 664 (Fig. 72) during the periods A and B, reaches the dip portion 665, and this causes the vertical slide 198 to drop slightly (but leaving it in contact with the guide ribs 306, Fig. 11), thus carrying the blank mold 243 away from the blow head, to a position such as shown in Fig. 15. This is for the purpose of releasing the bottom plate 165 and the lower slide 158 from the upward pressure of the blank mold, so that said plate 165 and slide may be moved inward readily from the position shown in Fig. 15 to that illustrated by Fig. 16. It will be noted that when the blank mold 243 is lowered as in Fig. 15, the springs 154 will cause the slide carrier 151 to move down slightly in relation to the blow head body 146, until the bolt heads 152' engage the washers 153; in the previous position, the bolt heads 152' were out of contact with the washers 153, see Fig. 9. Similarly, as long as the blank mold 243 presses upward against the bottom plate 165, see Fig. 10, the flanges 158' press against the upper walls of the guide grooves 159, but exert no pressure against the upper slide 156, so that the latter can be moved freely from the position Fig. 9 to the position Fig. 14, as described above. When however the blank mold 243 drops away from the bottom plate 165, as in Fig. 15, the lower slide 158 drops slightly until its flanges 158' engage the lower walls of the guide grooves 159, and the upper slide 156, which rests on said lower slide, also drops slightly so that its upper surface is out of contact with the slide carrier 151, as indicated in Fig. 15, this also facilitating the movement of the lower slide 158 and bottom plate 165 to the position Fig. 16.

This movement is brought about, at C, by the engagement of the roller 190 with the cam portion 609. The action is of the same character as described above in connection with the action of the cam portion 607, and moves the upper slide 156 farther inward from the position Fig. 15 to the position Fig. 16. At first, the slide 156 moves alone, but then the sleeve 164 comes into engagement with the lower slide 158 at the recess 158$^a$, and from that moment both slides 156 and 158 (and the bottom plate 165) move inward in unison.

While the vertical slide 198 is being lowered to the position Fig. 15 by the action of the cam portion 665 on the roller 207, as described above, the spring 294 keeps the upper end of the rod 246 (Fig. 17) in contact with the knob or button 304, that is to say, the rod 246 remains stationary at first while the slide 198 is moving downward, and this causes the levers 289 and 284 to swing in such a manner as to bring the plunger 273 from the upper or inner position shown in Fig. 14 to the outer position Figs. 21 and 22. This outward movement of the plunger is stopped by the engagement of the nut 281 with the plug 270, and the downward movement of the slide 198 produced by the cam portion 665 is slightly more than required to shift the plunger to this outer position, so that at the end of this downward movement the rod 246 will move down in unison with the vertical slide 198 and will move slightly away from the knob 304.

At about this moment, the projection 296 (Fig. 9) on the inwardly-moving lower slide 158 comes into engagement with the end of the rod 297 (Fig. 13), and by pushing said rod swings the lever 302 on its fulcrum 303 until the knob 304 no longer covers the hole 305 (Fig. 9) in the plate or lug 179''.

Now, as the vertical slide 198 rises again under the influence of the ascending exit end of the cam portion 665, the rod 246, finding the hole 305 uncovered, will rise freely therein, that is to say, the relative position of the rod and invertible head 213 will remain as in Fig. 17, and the plunger 273 therefore will stay in its outer position Figs. 21 and 22.

The joint inward movement of the slides 156, 158 is limited by the engagement of the roller 173 (Figs. 9, 14, 15 and 16) with a stop surface 243' on the blank mold sections 243. The limit may be adjusted by means of the screw 174 to vary the position of the roller 173 relatively to the bottom plate 165. To guard against any breakage in the event of improper adjustment or any other cause which would tend to move said slides inward after the stop position Fig. 16 has been reached, the cam 609, 609' has been made yielding as described.

As the blank mold 243 rises to the position shown in Fig. 16, the mold cavity 249 being now in registry with the recess 167', the inclined surfaces 250 (Figs. 10, 11, 17, 19, and 21) on the blank mold sections come in contact with the inclined surfaces 165' (Figs. 9, 10 and 11) of the bottom plate 165, and thus the blank mold sections 243 are forced together firmly, and owing to their engagement with the neck mold sections 253 as shown in Fig. 21, the neck mold sections also are held firmly against each other. The rising blank mold also lifts the slides 158, 156 and their carrier 151 slightly against the tension of the springs 154, so that the carrier 151 will be raised from the position Fig. 15 to the position Fig. 9, said springs therefore pressing the bottom plate 165 down into tight contact with the blank mold, in the position Fig. 16.

At about this time, the roller 551 reaches the inclined cam portion 624, and this forces the piston valve 550 farther away from the center of the machine, and farther into the cylinder 526, against the tension of the spring 552, until the position Fig. 33 is reached, which position of the valve is maintained during the arc or period D, while the roller 551 is traveling on the concentric cam portion 625. This cam portion is farther from the center of the machine than the cam portion 619. During this period, air is blown into the cavity which has been formed in the parison by the plunger 273 and particularly by its tapered end 279, it being remembered that the plunger at this time has been retracted from the parison and is in the position shown in Figs. 21 and 22. The flow of the high-pressure air at this time is as follows: From the high-pressure channel 511 (Figs. 29 and 30) to the groove 518, the duct 521 and pipe 522 corresponding to the particular set of mechanisms under consideration, the corresponding nipple 525 (Figs. 9 and 33), the passage 558 of the piston valve 526, duct 559, nipple 532, pipe 533 (Figs. 8, 11 and 12), casing 534, nipples 535 and 540 (which at this time are fitted airtight to each other as in Fig. 12), channels 541 and 542 of head 213 (Figs. 17 and 18), duct 543, perforated washers 545, channel 544, annular chamber formed by the groove 267' of the nipple carrier 267 (Figs. 21 and 22), ducts 267'', annular chamber 271, duct 269'', interior chamber 272 of nipple 269, and through the annular space 278 around the inner end of the plunger 273, into the cavity which has previously been formed in the parison by the said plunger. The air thus blown upwardly into the parison enlarges said cavity and distends the parison and also lengthens it so that its upper end will finally come in contact with the top wall of the recess 167' in the disk 167 carried by the bottom plate 165 (Fig. 16). This blowing of the parison stops as soon as the roller 551, by engagement with the cam portion 626, causes the piston valve 550 to be shifted away from the center of the machine, and therefore farther into the cylinder 526, from the position shown in Fig. 33, to a position intermediate between those shown in Figs. 33 and 35ª, in which intermediate position the supply nipple 525 is cut off from communication with all the other nipples of the cylinder 526. The recess 167' of the disk 167 should be of the same diameter as the upper end of the mold cavity 249, so that when said recess and cavity register, as in Fig. 16, their edges fit together accurately, thus avoiding the formation of a ridge or burr on the outer surface of the parison near the bottom of the bottle. The fit of the mold against the edge of the recess 167' is not air-tight, so that air outside the parison can escape from the mold cavity 249 as the parison is expanded therein by the air blown through the nipple 269.

A short time after this second blowing operation has stopped, at the point E, the roller 207 of the vertical slide 198 (Figs. 23, 24 and 27) comes into engagement with the descending portion 667 (Fig. 72) whereby the vertical slide is carried considerably farther down than it was previously by the dip portion 665. While the roller 551 travels along the cam portion 627, the groove 556 of the piston valve 550 is in registry with the nipple 532. It will be noted that air may thus escape from the parison through the ducts 269″, 267″, groove 267′, channel 544, duct 543, channels 542, 541, nipple 540, channel 537, pipe 533, nipple 532, and grooves 556, 555. It will be seen from Fig. 74 that the cam portion 627 (and the escape of air from the parison just described) begins before the point E at which the slide 198 carrying the invertible head 213, is lowered. Therefore the compressed air has escaped from the parison by the time that the blank mold 243 is moved out of contact with the slide bottom 165. If the parison still contained compressed air at the time the mold 243 is brought away from the plate or slide bottom 165, such compressed air might injuriously distend the parison as the mold moves away from said bottom 165. By the action of the descending cam portion 667 on the roller 207, as referred to above, the invertible head 213 is dropped from the position indicated in Fig. 11 sufficiently to come clear of the guide ribs 306, so that the head will be free to turn about its horizontal axis. Very shortly after the head 213 has thus been freed from the guides 306, the roller 219 (Figs. 23 and 24) comes in engagement with the cam portion 647, entering between this portion and the opposing parallel cam portion 650. Since the path of the roller 219 between these cam portions 647, 650 is parallel to the path of the roller 207 in the adjacent portion of the cam guide 667, the vertical distance between these two rollers remains unchanged during this period, that is to say, the arm 218 does not turn (on the axle 216) relatively to the slide 198. As the latter continues to descend, by the action of said cam portion 667, the roller 219 passes between the upwardly-inclined cam portions 648, 651 (Fig. 72), and is thus lifted relatively to the slide 198 and caused to rotate about the horizontal axle 216, from the position shown in Fig. 24, in the direction of the arrow, thus turning the head 213 from the position in which the blank mold is above the neck mold (Figs. 1 and 21) to the position (see, substantially, Figs. 26 and 80) in which the neck mold is at a higher level than the blank mold. With the particular construction of cams illustrated, the reversing of the head 213 continues and ends while the slide 198 is traveling horizontally by the action of the cam portion 668. At the end of the reversing movement (which takes place along the arc F) the lug 320 which was previously at the top comes to the lower position and engages the stop 320′ as indicated in Fig. 26.

About simultaneously with the inverting of the head 213 (period or arc F) the cam portion 617 (Fig. 74) engages the roller 190 (Figs. 8 and 9) and guides it (if required) to engagement with the cam portion 618, so that the roller 190 and the slides 191, 183, and rack 181 connected therewith, are moved outwardly. By means of the mechanism previously described, this causes an outward movement of the upper slide 156 (toward the right from the position shown in Fig. 16). At first, the slide 156 will move alone, but after a while the sleeve 164 will come into engagement with the inner nut 162, as in Fig. 9, and from that time on both slides 156 and 158 (with the bottom plate 165) will move outwardly in unison, being thus brought toward, but not quite to, the position shown in Fig. 9. This outward movement of the slide 158 also carries the projection 296 away from the rod 297 (Fig. 13), so that the spring 299 will swing the lever 302 on its fulcrum 303 until it covers the hole 305 (Fig. 9).

At about the point E, the openings 122′ and channel 576 of the rotary carrier (Figs. 40 and 41) come into registry with the chamber 570 (Fig. 3) and each set of openings 122′ will remain in registry with said chamber during a little more than half a revolution of the carrier. Air will thus be blown from the chamber 570 through said channels 576 into the seven or eight wind boxes 578 whose channels 576 are at that time in communication with the chamber 570. During the time that a particular windbox 578 passes from the point E to the end of the arc F or a little beyond, the corresponding blow mold 335 (generally containing a fully blown bottle) is in the closed position shown in Figs. 40 and 80, and thus during this period the air passing from the windbox 578 through the upper opening 579 (the valve 580 being in the lower position, Figs. 36 and 40) will be discharged against the closed blow mold through the channel 584 and nozzle 585 (Figs. 36 and 80).

At about the end of the period F, or shortly thereafter, as at G, the extractor (the path of which is indicated at 689 in Fig. 3) approaches the path of the finished bottle made during the preceding operation and seizes said bottle at its upper portion which projects above the closed blow mold 355. The extractor for a short arc moves in a path concentric with the machine, as indicated in Fig. 3, and during such arc moves substantially in unison with the blow mold, or at least with the blow-mold axis.

Shortly after the end of the arc or period F, and after the point G, say at the point H, the blow mold 335 is opened, so that from that moment on, and until the valve 580 is shifted to its upper position as described below, air from the nozzle 585 will be blown along the outer surface of the blow-mold bottom 349 against the inner surface of the blow mold, against the finished bottle (from the preceding operation) which is hanging from the extractor and rests on the bottom 349 of the blow mold, until the said finished bottle is removed by the extractor, say at the point J. I thus obtain an efficient cooling of the blow mold and bottle. The opening of the blow mold 335 at the point H is effected by the engagement of the roller 347 (Figs. 40 and 70) with the ascending cam portion 674. As the roller rises owing to such engagement, the lever 344 swings on its fulcrum 345 in such a way as to first swing the pivot connections 341 slightly from each other (until the connections 343 are in line with the respective connections 341 and with said fulcrum), this movement being too slight to affect the relative position of the blow mold sections. It will be noted from Fig. 40 that the connection 343 nearest the roller 347 is, in that position, slightly below a line connecting the fulcrum axis with the axis of the right-hand pivotal connection 341, and the other connection 343 is slightly above a line connecting the axis of the fulcrum 345 with the axis of the left-hand pivotal connection 341. As the roller 347 continues to rise, the two pivot connections 341 will move toward each other, thus rocking the levers 339 in such a way as to move the blow mold carriers 329 apart and open the blow mold to the position shown in Fig. 41.

At about the same time that the blow mold opens as just described, the blank mold 243 begins to open under the action of the cam 635 (Fig. 74) on the roller 317 (Fig. 24), which causes the shaft 315 and the crank arm 312 (Figs. 23 to 26 inclusive) to rock in such a direction as to carry the rods 310, 309 and 240 away from the center of the machine, that is to say, toward the right in Figs. 17 and 18 which show the closed position of the blank mold 243. In Fig. 25, the dotted lines at the left indicate the extreme position occupied by the crank arm 312 at the time the blank mold is in the closed position Figs. 17 and 18. The cam portion 635 causes the blank mold to be opened only partly, by the swinging of the links 237 relatively to the head 239 of the sliding rod 240, which links swing the triangular members 235 on the axles 231, together with the arms 232 and the blank mold sections 243. This motion continues only until the projections 262 on the arms 232 engage the screws 260, that is to say, the screws 260, the arms 259' and the links 259, 257 connected with the neck mold sections 253 are not moved at this time, and the neck mold remains closed. Fig. 80 shows the position of the parts when the blank mold 243 has thus been partly opened while leaving the neck mold 253 closed; at that time the crank arm 312 occupies a position midway between the two extreme positions which Fig. 25 indicates in full lines and dotted lines respectively.

The vertical slide 198, which has remained at the same level while the roller 207 engaged the horizontal cam portion 668, descends again by the action of the cam portion 669 (Fig. 72), and shortly after this further downward movement has begun, the blow mold 335 is closed partly by the action of the cam portion 679 (Fig. 70) on the roller 347. It will be remembered that the descending blank mold 243 is in a partly open position (Fig. 80), and the blow mold when fully open (as in Fig. 41) is in the path of such partly-open blank mold; hence the necessity for closing the blow mold 335 sufficiently to clear the path of the descending blank mold while leaving the blow mold open sufficiently to clear the path of the parison which, after the partial opening of the blank mold described above, remains suspended from the neck mold 253. This partial closing of the blow mold occurs at about the point K.

As the descent of the vertical slide 198 continues, the roller 594 (Figs. 1, 36 and 41) is swung down by the angle iron 595 carried by said slide, thus causing the shaft 590 to rock the crank arm 589 and lift the valve 580, against the tension of the spring 587, to the upper position (Fig. 42) in which the lower opening 579 is cleared, so that air from the windbox 578 will now pass through the channels 581 (Figs. 42, 43 and 80), openings 322", and channels 582 to the two nozzles 583 which are directed upwardly, facing the respective sections 243 of the partly-open blank mold, so that these sections are cooled by the blasts of air directed against them. This shifting of the valve 580 to its upper position occurs at about the point marked L.

At approximately the same time, the inclines 213" (Fig. 21) of the invertible head 213 come in contact first with the inclines 509' (Figs. 1 and 36) and then the side surfaces of said head engage the vertical guide ribs 509, with which said head remains in contact during the further descent of the slide 198, and also during the first part of the subsequent rise of the slide. The invertible head is thus held steady in a proper position for the operations taking place in its lower position. The engagement of the head with the ribs 509 is similar to its engagement with the ribs 306 illustrated by Fig. 11.

As the slide 198 with the closed neck mold 253 and the parison suspended from it, finally reaches the lowermost position, at about the point M, the nipple 540 on the head 213 comes into contact with the washer 538' to establish an air-tight connection between said nipple on the head and the lower nipple 535' (Figs. 36 and 36ª). It has been explained that when the head 213 is in its upper position, the nipple 540 is not in the same vertical plane with the horizontal axis about which the head turns, but to one side of such plane; therefore, after the head has been inverted as described, the nipple 540 will be on the opposite side of said plane. From this it follows that the two relatively stationary nipples 535 and 535' will not be in vertical alignment, but located on opposite sides of, and equidistant from, the path of said horizontal axis.

At about the time the slide 198 reaches its lowermost position, the blow mold 335 is closed fully as shown in Figs. 40 and 80. This operation is brought about by the action of the cam portion 682 (Figs. 70 and 71) on the roller 347, and it will be noted that as the roller 347 moves down to the position shown in Fig. 40, the lever 344 is caused to swing in such a manner as to bring the pivot connections 343 slightly beyond the points where each of them is in the straight line connecting the corresponding pivot connection 341 with the fulcrum 345. I thus guard against any accidental separation of the blow mold sections 335. The weighting of the cam portion 682 at 686 is for the purpose of enabling this portion to yield, and thus to avoid breakage, in the event of an inaccurate adjustment of parts, or in case solidified glass or some other obstruction prevents the blow mold from closing fully. The parison hanging from the closed neck mold 253 first engages the blow mold bottom 349, as the slide 198 approaches its lowermost position, and as the blow mold sections 335 come to the closed position, Figs. 40 and 80, they confine the parison in the mold chamber thus formed. The pivoting of the blow mold bottom 349 at 352 enables it to adjust itself to the parison and to the blow mold sections 335 as they move to the closed position. It will be noted from Fig. 80 that the neck mold 253 in its lowermost position does not come in contact with the blow mold 335, but a slight space is left between them. The length of the chamber of the blow mold is substantially the same as the length of the blank mold chamber 249.

After the roller 207 on the vertical slide 198 leaves the exit portion 670 of the cam controlling the vertical motion of said slide (Fig. 72), and before said roller reaches the entrance portion 660 of said cam, the bottom surface 205' (Figs. 23, 24 and 26) of the auxiliary slide 205 comes into engagement with the corresponding lug 124' (Fig. 1) of the lower carrier portion 124, as will be understood best from Fig. 41, and during this period, therefore, the vertical slide 198 and the parts thereon, will be supported by direct engagement with said lug of the carrier.

The parison will be carried along by the closed blow mold through an arc of about 90° before the final blowing begins. This final blowing takes place during the period N, and is started by the action of the cam portion 628 (Fig. 74) on the roller 551, thus moving the piston valve 550 (from a position intermediate between those shown in Figs. 33 and 35ª) away from the center of the machine, and further into the cylinder 526, to the position shown in Fig. 35ª. At that time the rotary valve 520 (Figs. 29 and 30) is in such a position that the pipe 522 corresponding to the particular blow mold under discussion, is in communication with the peripheral groove 519 and through the duct 517 with the vertical channel 512 connected with a source supplying air under relatively low pressure. The path of the low-pressure air during the final blowing of the bottle is as follows: From the channel 512 through duct 517, groove 519, duct 521 corresponding to the particular blow mold, pipe 522 (Figs. 29, 30, 8 and 9), nipple 525 (Figs. 9 and 35ª), longitudinal passage 558 of piston valve 550, nipple 546, pipe 547 (Figs. 8 and 9), upright pipe 548 (Figs. 36 and 41), pipe 549 (Figs. 36, 36ª and 41), casing 534' (Fig. 36ª), channel 537' of lower nipple 535', perforation of washer 538', nipple 540 and channel 541 of invertible head 213 (Figs. 36ª and 18), channel 542, duct 543 (Figs. 17 and 18), perforation of washer 545, channel 544, chamber formed by the groove 267' (Figs. 21, 22 and 80) of the nipple carrier 267 and the opening of the plate 255 in which said carrier is set, ducts 267'', annular chamber 271, duct 269'', chamber 272 and through an annular space 278, around the tapered end 279 of the parison plunger 273, into the cavity of the parison held in the neck mold 253 and blow mold 335. Fig. 80 shows the position of the parts during the final blowing operation, the parison however has been omitted, for the sake of clearness. The final blowing operation stops when the roller 551 reaches the cam portion 630 (Fig. 74) so that the spring 552 forces the piston valve 550 from the position Fig. 35ª into a position intermediate between those of Fig. 35ª and 33, so that the air-supply nipple 525 is again cut off from communication with the nipples of the cylinder 526.

Shortly after the end of the final blowing operation, at about the point O, the roller 317 (Fig. 24) comes into engagement with the cam portion 639 (Fig. 74) and causes the crank arm 312 to swing into the extreme position indicated by full lines in Fig. 25. This (by the same mechanism which has been described above in connection with the partial opening of the blank mold) swings the blank mold sections slightly farther apart, and during this movement, owing to the engagement of the projections 262 (Figs. 19 and 21) on the arms 232 with the screws 260 on the arms 259', these arms together with the links 259 are moved in such a manner as to open the neck mold 253 by means of the links 257 and sliding carriers 252, the parts thus reaching the position shown in Fig. 19 (and also in Fig. 20). The neck portion of the finished bottle, projecting above the closed blow mold 335, is thus released. The further steps occurring in connection with the finished bottle have already been described; that is, the closed blow mold 335, with the body of the finished bottle therein, and the neck of such bottle projecting freely above the closed blow mold, travels in this condition for about half a revolution of the carrier, or slightly more, to the point G, where, as described above, the extractor takes hold of the projecting neck of the bottle, whereupon, at H, the blow mold opens while the extractor still holds the bottle, the extractor then carrying the bottle away from the machine and discharging or releasing such bottle at J'. While I have referred to a mechanical extractor operated automatically by the rotation of the machine (through the teeth 322ᵃ on the mold table 322), I do not desire to restrict myself thereto, it being evident that the operator might apply a hand tool, say of fork-like character, to the projecting neck of the finished bottle, shortly before the blow mold opens at the point H, and by means of this manual extractor remove the bottle after it has been released, that is, between the points H and K.

Reverting now to the operations affecting the parts other than the blow mold, during the further rotation of the carrier, I will say that at about the point 0 the openings 122' and channels 576 (Fig. 41) corresponding to the particular set of molds under consideration, come out of registry with the air chamber 570 of the base 108 (Fig. 3), and therefore the blowing of cooling air against the open blank mold 243 is stopped at this point.

At about the same time, the roller 207 on the vertical slide 198, having passed through the entrance portion 660 of its controlling cam (Fig. 72) and reached the ascending cam portion 661, causes the slide 198 to rise, the invertible head 213 being first held against turning, by the guide ribs 509.

While the slide 198 is rising under the influence of said cam portion 661, the neck mold 253 is closed at the point P (while leaving the blank mold 243 partly open), owing to the roller 317 (Fig. 24) passing from the cam portion 639 (Fig. 74) to the cam portion 640, the springs 263 (Fig. 21) operating to close the neck mold, and the crank arm 312 passing to a position intermediate between the two shown in Fig. 25.

At about the same time, the angle iron 595 (Fig. 1) rises clear of the roller 594, and under the influence of the spring 587 (Fig. 36) the rod 586 and valve 580 are brought back to their lower position (Fig. 40), a stop pin 586' (Fig. 36) being preferably provided on said rod to engage the upper surface of the windbox 578.

Subsequently, at about the point Q, the head 213 having risen clear of the guide ribs 509, the roller 219 (Figs. 23 and 24), after first traveling in unison with the slide 198 along the cam portion 657 (Fig. 72), is depressed relatively to the still rising slide, by the horizontal cam portion 654 and is then further depressed by the descending cam portion 655, whereby the arm 218 and toothed sector 215 are swung back (clockwise with reference to Fig. 24) to the position shown in in said Fig. 24. The invertible head 213 is thus given half a revolution in the opposite direction to the turn it received during the downward movement of the slide 198, and the (partly open) blank mold 243 is thus brought to a position above the (closed) neck mold 253. The reversal of the invertible head 213 to its original position is completed at about the point R. During reversal, the reduced portion 310'' of the rod 310 (Fig. 23) turns in the forked end of the crank arm 312.

At about the same time (Q) that the reversal of the said head begins during the upward movement of the slide 198, the roller 317 (Fig. 24) comes into engagement with the cam portion 642, and while the head is being reversed, the crank arm 312 is swung by the action of the said cam portion on said roller, from a position intermediate between the two shown in Fig. 25, to the extreme position shown by dotted lines in said figure. The blank mold 243 is thus brought to the closed position, Figs. 18 and 21.

While the head 213 is thus being reversed, at about the point R, the roller 551 of the piston valve 550 passes along the cam portion 632 (Fig. 74) and said valve is thus shifted from a position intermediate between those shown in Figs. 33 and 35ᵃ, to one intermediate between those shown in Figs. 32 and 33. This movement of valve 550 is accomplished while the duct 521 (Fig. 30) of the particular unit, is out of registry with channels 518, 519, that is, said duct has passed the point of registry with said channel 519 but has not yet reached the point of registry with channel 518, and the escape of compressed air is thus prevented.

The slide 198, which has remained at the same level while its roller 207 engaged the horizontal cam portion 662 (Fig. 72), resumes its rising movement, for instance at the point S, under the influence of cam portion 663, shortly after the reversal of the head 213 has been completed, and while this final rising of the slide is in progress, for instance at point T, the roller 190 (Figs. 1, 8 and 9) comes into engagement with the cam portion 597 (Fig. 74) and, together with the slides 183, 191 is moved farther away from the center of the machine, thus carrying the slides 156 and 158 back to the initial position shown in Fig. 9. The cam having the portions 597, 597′, 597″ is yielding as described, so as to avoid breakage in case the outward movement of the slides 156, 158 is arrested before the roller 190 has reached the cam portion 597′, for instance if the slide 158 should come in contact with the stop screw 168 (Figs. 8 and 10) before the roller 190 reaches the cam portion 597′.

The vertical slide 198 reaches its uppermost position at about the point A, or shortly before, and as it approaches said position, the invertible head 213 is guided by the vertical ribs 306 as shown in Fig. 11, and the nipple 540 comes in contact with the upper perforated washer 538 as shown in Fig. 12. The blank mold inclines 250 engage the converging surfaces 165′ of the bottom plate 165, as indicated in Fig. 10, thus insuring a perfect closing of the blank mold 243, and the bottom 165, slides 158 and 156, with their carrier 151, are raised slightly relatively to the blow head body 146, to the position shown in Fig. 9, the downward pressure of the springs 154 insuring an airtight joint between the bottom 165 and the blank mold 243.

This completes the description of the automatic operation of the machine under normal conditions.

During such normal position, the forming cup 437, 438 is in operative relation to the outlet 102, as described, and therefore the trough 560 (Figs. 1, 46 and 64) is to one side of the said outlet, and out of operative relation thereto, the slide 449 which carries both the trough and the forming cup, being in the extreme position, against the stop screw 449″, as in Fig. 64, and the handle 458 being locked in the notch 459′ of plate 459, as in Figs. 51, 52 and 59. At times, it may be desirable to discharge a certain amount of glass from the furnace through the outlet 102 without allowing such glass to reach the forming cup, the blow head, and the molds. In such cases, the operator by means of the handle 458, which he first presses downward until it is disengaged from the notch 459′, and then swings over to the position indicated by dotted lines in Fig. 59, moves the slide 449 together with the trough 560 and the forming cup 437,438, in the direction indicated by the arrow b in said figure, thereby carrying the forming cup away from registry with the outlet 102, and bringing the upper portion of the inclined trough below the said outlet. Any glass running from the outlet at this time will fall into the trough 560, will be cooled by the water discharged from the nozzle 562, and sliding down in said trough, will be diverted and discharged to any convenient place, for instance a receptacle such as indicated at 690 in Figs. 1 and 46. Of course, both the forming cup 437, 438 and the trough 560 move at a level below the path of the knife 354 (see Figs. 46 and 69), so that there will be no interference between these parts. The trough 560 will generally be brought into operative position at the beginning, to determine if the glass is of proper viscosity, the operator at this time disconnecting the handle 391 from the knife-operating mechanism and bringing the knife 354 to the position in which it clears the outlet 102, by means of said handle. When the glass is found to be flowing properly, the connection of handle 391 with the driving mechanism in gear box 403 is restored by means of the pin 394 (Figs. 47 and 48), the pieces of glass thus cut off dropping into the trough 560; during this time the operator may adjust the cam 401 (Figs. 45 and 52 to 55) by means of hand wheel 414′, to a position that will allow a sufficient quantity of glass to be cut off at each stroke of the knife 354. This quantity of glass has to be gaged by the operator's eye and generally the pieces are made lighter than required until the molds become sufficiently heated by the contact of the glass dropped into them, at which time the weight of the pieces of glass is increased to the desired amount. After the desired size of the pieces of glass has been reached, the operator moves the forming cup 437, 438 into registry with the opening 102, thus starting the normal mechanical operation of the entire apparatus.

The machine described herein has provision for adjustments of various kinds, so that the parts may be properly positioned, and also for the purpose of exchanging certain parts so that different articles may be produced at different times on the same machine, and also for varying the timing of certain operations. As has been explained above, the timing of the forming cup movements may be varied, while the machine is in operation, by turning the hand wheel 507. Similarly, without stopping the operation of the machine, the opening of the outlet 102 by the knife 354 can be set earlier or later by turning the handwheel 414′, and, independently thereof, the closing of said outlet by the knife (cutting-off) can be timed to cut earlier or later, by turning the hand wheel 413′, this adjustment also being possible without requiring the machine to be stopped. Of course, the stop lugs 400′, 401′ are located in such a manner as to prevent any simultaneous engagement of the two rollers 398, 399 by the respective cams 400, 401.

Among the numerous other adjustments I will call special attention to the following as being the most important ones: The blow head can be adjusted up or down by turning the shaft 145 (Fig. 10), after the locking nut 149 has been loosened. The position of the roller 190 relatively to the rack 181 is adjustable by means of the threaded rod 182. The length of the independent movement of the slide 156, relatively to the slide 158, can be varied by means of the nut 162. The inward movement of the slides 156 and 158 is variably limited by the adjustable roller 173 (Fig. 9). The forming cup 437, 438, is adjustable vertically between the blow head and the knife 354, by turning the screw 450. The position of the end of the crank arm 312 (Fig. 23) relatively to the rod 240 can be varied by turning the hollow shaft 310 relatively to the rod 309. The roller 207 is adjustable vertically on the slide 198 by turning the screw 210. The roller 219 is adjustable relatively to the sector 215, by means of the screws 228, so that the roller 219 may be adjusted up or down, into the proper relation to its operating cam, without changing the position of the sector 215.

The blank mold 243, neck mold 253, and blow mold 335 are easily removable, so that others may be substituted, thus enabling various articles to be blown with the aid of the same machine. The plunger 273 and nipple 269 also are readily exchanged, after removing the plug 270 from the nipple carrier 267.

The entire machine consisting of the rotary carrier, the base 108 on which it is supported, and the molding mechanism mounted on the carrier, may be moved toward or from the receptacle or tank 101 by turning the shaft 110 through the medium of the lever 116; the various parts of the machine are thus readily accessible for inspection or repairs. It will be noted that sliding the machine toward or from the receptacle 101 will not disturb the driving relation of the mechanism which rotates the carrier, to the mechanism which operates the forming cup 437, 438 and the knife 354, since the universally jointed and extensible shaft 419, 420, 421 will always follow the parts in such a way as to preserve an actuating connection between the shaft 422 and the shaft 402.

I claim:

1. In a machine for making molded articles, blow head and blow mold devices mounted to rotate in unison in parallel planes, a slide mounted to rotate in unison with said devices and movable relatively to them in a direction parallel to the axis of rotation, a head mounted on said slide to turn for inversion about an axis lying in a plane parallel to said planes, blank and neck mold devices carried by such invertible head, means for moving said slide to and fro between said blow head and blow mold devices, means for effecting inversion of said head, and means for operating the several molds as the said devices and slide travel around the axis of rotation.

2. In a machine for making molded articles, blow head and blow mold devices mounted to rotate in unison in parallel planes, a slide mounted to rotate in unison with said devices and movable relatively to them in a direction parallel to the axis of rotation, a head mounted on said slide to turn for inversion about an axis intersecting the axis of rotation and lying in a plane parallel to said planes, blank and neck mold devices carried by such invertible head, means for moving said slide to and fro between said blow head and blow mold devices, means for effecting inversion of said head, and means for operating the several molds as the said devices and slide travel around the axis of rotation.

3. In a machine for making molded articles, blow head and blow mold devices mounted to rotate in unison in parallel planes, a slide mounted to rotate in unison with said devices and movable relatively to them in a direction parallel to the axis of rotation, a head mounted on said slide to turn for inversion about an axis intersecting the axis of rotation, blank and neck mold devices carried by such invertible head, means for moving said slide to and fro between said blow head and blow mold devices, means for effecting inversion of said head, and means for operating the several molds as the said devices and slide travel around the axis of rotation.

4. In a machine for making molded articles, blow head and blow mold devices mounted to travel in unison in parallel paths, a slide mounted to travel in unison with said devices and movable relatively to them in a direction transverse to said paths, a head mounted on said slide to turn for inversion about an axis transverse to both movements of the slide, blank and neck mold devices carried by such invertible head, means for moving said slide to and fro between said blow head and blow mold devices, means for effecting inversion of said head, and means for operating the several molds as the said devices and slide travel in unison.

5. In a machine for making molded articles, superposed spaced blow head and blow mold devices mounted to travel in unison in parallel horizontal paths, a slide mounted to travel in unison with said devices and movable relatively to them vertically, a head mounted on said slide to turn for inversion about a horizontal axis normal to the surface containing said parallel horizontal paths, blank and neck mold devices carried by such invertible head, means for moving said slide to and fro between said blow head and blow mold devices means for effecting inversion of said head, and means for operating the several molds as the said devices and slide travel in unison.

6. In a machine for making molded articles, axially-aligning spaced blow head and blow mold devices mounted to travel in unison in fixed relation to each other, a head movable in unison with said devices and also movable between them transversely to their path, said head being further mounted to turn for inversion, a blank mold carried by said head and adapted, in one extreme position thereof, to cooperate with said blow head a neck mold adapted to cooperate with said blank mold and also adapted, in the other extreme position of said head, to cooperate with said blow mold, and means for actuating the above-mentioned parts.

7. In a machine for making molded articles, a continuously traveling blow head, a blow mold mounted to travel in unison with said blow head and in fixed relation thereto, a neck mold movable in unison with said blow head and blow mold and also movable between them transversely to their paths, said neck mold being further mounted to turn for inversion, and adapted, in one extreme position, to cooperate with said blow mold, and a blank mold movable in unison with the neck mold and adapted to cooperate therewith, said blank mold, in the other extreme position of the neck mold, cooperating with said blow head.

8. In a machine for making molded articles, a blow mold, a blow head located above the same, said mold and blow head being movable in unison, a head susceptible of inversion, movable in unison with said blow head and said mold, and also movable up and down between them, mating mold-forming sections carried by the invertible head and movable toward and from each other, means for imparting to said invertible head a motion that will carry such head up and down and that will also bring said mold forming sections alternately to an upright position when near the blow mold and to an inverted position when near the blow head, and means for closing said mold-forming sections carried by the invertible head while they are being swung from the upright to the inverted position, and for opening said mold-forming sections after they have been swung in a closed condition from the inverted to the upright position and while they are in such upright position.

9. In a machine for making molded articles, a blow mold, a head susceptible of inversion, located above said blow mold and movable up and down away from and toward the same, a blank mold and a neck mold both carried by said invertible head, and means for imparting to said head a motion that will carry such head up and down and that will also bring the neck mold mounted thereon alternately to an upright position when near the blow mold and to an inverted position when away from such blow mold.

10. In a machine for making molded articles, a blow head body having a channel extending therethrough from top to bottom for the passage of the moldable material, molding mechanism adapted to register with said channel and movable toward and from said blow head body, a laterally movable closure slide interposed between said blow head body and said molding mechanism and spring-pressed downwardly relatively to the said body, said slide also having a passage effective in one position thereof to connect said channel with the molding mechanism, and blowing mechanism connected with said passage, for settling the glass in said molding mechanism when the closure slide is positioned to close the upper end of the blowing mechanism.

11. In a machine for making molded articles, a carrier, a blow head body adjustable up and down relatively to said carrier and having a channel extending from top to bottom for the passage of moldable material. molding mechanism adapted to register with said channel and movable toward and from said blow head body, a laterally movable closure slide carried by said blow head body to share its up and down adjustment, said slide being spring-pressed downwardly relatively to said body, and interposed between said body and the molding mechanism, and also having a passage to connect said channel of the blow head body with the molding mechanism, and blowing mechanism connected with said passage for settling the glass in the molding mechanism when said slide is in its passage closing position.

12. In a machine for making molded articles, a member having a passage extending therethrough from top to bottom, molding mechanism adapted to register with said passage and to receive moldable material therefrom, means for blowing the material contained in said mechanism, and a plate provided with an opening and movable between said mechanism and said member to either bring said opening into registry with said passage and the interior cavity of the mold mechanism, or to close said mechanism at the top, and a stop carried by said plate and adapted to engage the molding mechanism.

13. In a machine for making molded articles, a member having a passage extending therethrough from top to bottom, molding mechanism adapted to register with said passage and to receive moldable material therefrom, means for blowing the material contained in said mechanism, and a plate provided with an opening and movable between said mechanism and said member to either bring said opening into registry with said passage and the interior cavity of the mold mechanism, or to close said mechanism at the top, and a stop carried by said plate and adapted to engage the molding mechanism. said stop being pivoted to said plate for adjustment, and having means for adjusting its normal position.

14. In a machine for making molded articles, a member having a passage extending therethrough from top to bottom, a mold adapted to register with said passage and to receive moldable material therefrom, means for blowing the material contained in said mold, a plate provided with an opening and movable between said member and said mold to either bring said opening into registry with said passage and with the mold, or to close the mold at the top, co-operating parts on the said plate and mold to limit the movement of said plate in one direction, and mechanism for yieldably moving the plate in the opposite direction.

15. In a machine for making molded articles, an upper slide and a lower slide each provided with a passage adapted to register with that of the other slide, said slides being provided with co-operating parts to limit the relative movement of the slides, and to operate the lower slide through the movement of the upper slide, actuating mechanism connected with said upper slide, a mold adapted to register with both slides when their passages are in registry with each other, means for admitting a fluid under pressure into the passage of the lower slide at a time when said passage is closed at its upper end by the upper slide and is open to the mold at its lower end, and means for admitting a fluid under pressure into the parison contained in the mold, at a time when the lower slide closes the upper end of said mold.

16. In a machine for making molded articles, an upper slide and a lower slide each provided with a passage for the moldable material at the time such passages are in registry, the lower slide also having a bottom-forming recess in its lower surface, said slides being provided with co-operating parts to limit the relative movement of the slides, and to operate the lower slide through the movement of the upper slide, actuating mechanism connected with said upper slide, a mold adapted to register with both slides when their passages are in registry with each other, means for admitting a fluid under pressure into the passage of the lower slide at a time when said passage is closed at its upper end by the upper slide and is open to the mold at its lower end, and means for admitting a fluid under pressure into the parison contained in the mold, at a time when the lower slide closes the upper end of said mold and has its bottom-forming recess in registry with said mold.

17. In a machine for making molded articles, a mold, a member having a passage for the moldable material and movable to bring said passage into or out of registry with said mold, a plunger co-operating with said mold and controlling a passage for admitting a fluid under pressure to the parison contained in the mold, and means, co-operating with said plunger and controlled by said movable member, for causing said plunger to open the fluid-admitting passage only when the said movable member has its passage out of registry with the mold and closes said mold at the top.

18. In a machine for making molded articles, a mold, a member movable above the mold to open or close the upper end thereof, a plunger co-operating with said mold and controlling a passage for admitting a fluid under pressure to the parison contained in the mold, and means, controlled by the movement of said member, for causing the plunger to move to the fluid-admitting position only when said movable member closes the upper end of the mold.

19. In a machine for making molded articles, a mold, a member movable above the mold to open or close the upper end thereof, and means, controlled by the movement of said member, for admitting fluid under pressure to the parison contained in said mold, only when said member closes the upper end of the mold.

20. In a machine for making molded articles, a mold, a lower slide having a passage adapted to register with said mold, an upper slide movable in the same direction as the lower slide and adapted to close the upper end of said passage, a rod secured to one of said slides and extending parallel to the paths of the slides, a member carried by the other slide and having a limited sliding movement along said rod, to compel both slides to move in unison after such limit has been reached, means for admitting fluid under pressure to said passage, and mechanism for actuating both slides, connected with one of them.

21. In a machine for making molded articles, a mold, a lower slide having a passage adapted to register with said mold, an upper slide movable in the same direction as the lower slide and adapted to close the upper end of said passage, means for admitting fluid under pressure to said passage, co-operating parts on the two slides permitting one slide to move relatively to the other within certain limits but compelling both slides to move in unison after such limits have been reached, and actuating mechanism connected with the upper slide.

22. In a machine for making molded articles, a mold, a lower slide adapted to open or close the upper end of the mold, means for admitting fluid under pressure to the parison contained in said mold, an upper slide movable in the same direction as said lower slide and having a passage adapted to register with said mold, co-operating parts on the two slides permitting one slide to move relatively to the other within certain limits but compelling both slides to move in unison after such limits have been reached, and actuating mechanism connected with the upper slide.

23. In a machine for making molded articles, a mold, a slide movable across the mold above its upper end to open or close said end, means for adjusting said slide vertically, an actuating slide movable at a constant level in a direction parallel to the path of the first-named slide, and motion-transmitting mechanism interposed between said slides and comprising a toothed rotary device in mesh with rack teeth on the respective slides and permitting the vertical adjustment of the first-named slide while keeping it in mesh with said rotary toothed device.

24. In a machine for making molded articles, an actuating slide movable horizontally, a mold, another slide movable horizontally across the mold above the upper end of the mold to open or close said end, the second-named slide being adjustable up and down relatively to the path of said actuating slide, and motion-transmitting mechanism connecting said slides operatively and including a toothed rotary device in mesh with rack teeth on the respective slides and permitting the up and down adjustment of the second-named slide while keeping it in mesh with said rotary toothed device.

25. In a machine for making molded articles, a mold, a vertically-adjustable slide movable across the mold above the upper end of the mold to open or close said end, a pinion mounted to turn about a vertical axis and having long teeth in permanent mesh, throughout the range of the vertical adjustment of said slide, with rack teeth sharing such adjustment and causing the transverse movement of the slide, and actuating means for rotating said pinion.

26. In a machine for making molded articles, a mold, a vertically-adjustable slide movable horizontally across the top of the mold to open or close the upper end of said mold, a pinion mounted to turn about a vertical axis and having long teeth in permanent mesh, throughout the range of the vertical adjustment of said slide, with rack teeth sharing such adjustment and causing the slide to move transversely when the pinion rotates, and horizontally movable rack mechanism for actuating said pinion.

27. In a machine for making molded articles, a transversely movable member having a downward passage for the moldable material, a mold movable up and down toward and from said member, and adapted to register with said passage in one position of said member, a plunger co-operating with said mold and controlling a passage for admitting fluid under pressure to the parison contained in said mold, a rod connected with said plunger and normally moving up and down in unison with the mold, and a stop, actuated by said transversely movable member, to clear the path of said rod when the said member has its passage out of registry with the mold and closes the upper end of the mold, and to be in the path of said rod when the said member has its passage in registry with the mold.

28. In a machine for making molded articles, a mold movable up and down and having a passage for admission of a fluid under pressure, a plunger carried by the mold movably and controlling said passage, means for normally tending to hold the plunger in the position in which it opens said passage, an actuating member connected with said plunger, a transversely movable member for opening or closing the upper end of the mold, and a stop actuated by said transversely movable member, to clear the path of said actuating member when the mold is closed by said transversely movable member, and to be in the path of said actuating member when the upper end of the mold is open, and thus to cause the plunger to be brought into the passage-closing position, by the action of said stop against said actuating member as the mold rises at a time when the transversely movable member leaves the upper end of the mold open.

29. In a machine for making molded articles, a mold movable up and down and having a passage for admitting fluid under pressure, a plunger carried by the mold movably and controlling the said passage, a spring tending to throw said plunger into the position in which it opens said passage, an actuating member connected with said plunger, and a transversely movable member for opening and closing the upper end of the mold and operating to clear the path of said actuating member when said transversely movable member closes the upper end of the mold but to obstruct said path when said transversely movable member leaves the upper end of the mold open.

30. In a machine for making molded articles, a transversely movable member, a mold movable up and down relatively to said member and co-operating therewith, a plunger movable axially in said mold, a spring tending to retract said plunger, and an actuating member connected with said plunger and controlled by said transversely movable member in such a manner that in one position of said transversely movable member the path of the actuating member is unobstructed and the spring-pressed plunger will remain in its retracted position, while in another position of the transversely movable member the path of the actuating member will be obstructed to cause said member to bring the plunger to its inward or projected position as the mold rises.

31. In a machine for making molded articles, a support, a mold comprising separable sections, and pairs of non-parallel arms for connecting said mold sections with said support, one pair for each section, said arms being fulcrumed on said support at different parallel but non-aligned axes and pivotally connected with the respective mold sections at different and non-aligned axes.

32. In a machine for making molded articles, a support, a mold comprising separable sections, and pairs of arms for connecting said mold sections with said support, one pair for each section, said arms being fulcrumed on said support at different points and pivotally connected with the respective mold sections at different points, the lines which connect the fulcrums of the several arms with the respective pivotal connections on the mold sections, being parallel to the joint of the closed mold sections.

33. In a machine for making molded articles, a support, a mold comprising separable sections, and arms for connecting said mold sections to said support, said arms being fulcrumed on said support and pivotally connected with the respective mold sections, the lines which connect the fulcrums of said arms with the respective pivotal connections on the mold sections, being parallel to the joint of the closed mold sections.

34. In a machine for making molded articles, a body mold comprising two separable sections, a neck mold comprising two sections mounted to slide toward and from each other, fulcrumed arms connected pivotally with the body mold sections, another set of fulcrumed arms co-operating with the first-named arms, and links the respective ends of which are pivotally connected with the second-named arms and with the neck mold sections.

35. In a machine for making molded articles, a blow mold, a slide movable up and down above said blow mold, an invertible head carried by said slide rotatably, means, operated in conjunction with the vertical movement of the slide, for turning the head relatively to the slide, and a blank mold and a neck mold carried by said head.

36. In a machine for making molded articles, a blow mold, a slide movable up and down above said blow mold, an invertible head carried by said slide rotatably, means for moving the head in unison with the slide, without rotation, while the head is adjacent to the mold, and for turning the head relatively to the slide when the head is at a distance from the mold, and a blank mold and a neck mold carried by said head.

37. In a machine for making molded articles, a blow mold, a slide movable up and down above said blow mold, an invertible head carried by said slide rotatably, blank mold mechanism carried by said head, a pinion held to turn with said head, and a toothed actuating sector journaled on the slide and meshing with said pinion.

38. In a machine for making molded articles, a blow mold, a slide movable up and down above said blow mold, an invertible head carried by said slide rotatably, blank mold mechanism carried by said head, a pinion held to turn with said head, a toothed actuating sector journaled on the slide and meshing with said pinion, and a cam-operated arm secured to said sector and adjustable relatively thereto about the axis of the sector.

39. In a machine for making molded articles, a blow mold, a carrier movable up and down above said mold, an invertible head mounted to turn on said carrier, a blank mold and a neck mold carried by said head, and a rod slidable longitudinally of the axis about which said head turns, and operatively connected to open and close said blank mold and neck mold.

40. In a machine for making molded articles, a blow mold, a carrier movable up and down above said mold, an invertible head mounted to turn on said carrier, blank mold mechanism carried by said head, a rod slidable lengthwise of the axis about which said head turns, and operatively connected with said mechanism, a rock shaft extending parallel to the path of said carrier, and a crank arm held to turn with said rock shaft but adapted to slide lengthwise thereof as the carrier moves up or down, said crank arm engaging said rod to slide it lengthwise.

41. In a machine for making molded articles, a blow mold, a carrier movable up and down above said mold, an invertible head mounted to turn on said carrier, blank mold mechanism carried by said head, a rod mounted to turn with said head but slidable lengthwise of the axis of the head and operatively connected with said blank mold mechanism, a rock shaft extending parallel to the path of said carrier, and a crank arm held to turn with said rock shaft but adapted to slide lengthwise thereof as the carrier moves up or down, said crank arm having a forked end embracing the said rod and moving in unison therewith lengthwise of the axis of the head as well as up or down, while allowing the rod to turn in said forked end as the head turns on the carrier.

42. In a machine for making molded articles, a blow mold, a slide movable up and down above the said mold, an invertible blank-mold-carrying head mounted to turn on said slide, guide ribs adjacent to said blow mold and guide engaging surfaces on said head, said surfaces being shaped to engage said guide ribs to prevent turning of said head while it is adjacent to the blow mold.

43. In a machine for making molded articles, a blow mold, a blow head located above said mold, a slide movable up and down between said blow head and said blow mold, an invertible head mounted to turn on said slide, blank mold mechanism carried by said invertible head, separate guides located adjacent to the blow head and to the blow mold respectively, and guide engaging surfaces on said head, said surfaces being shaped to engage said separate guides to prevent turning said head while it is adjacent to either the blow head or the blow mold of said head but the guides and guide engaging surfaces being arranged to leave such invertible head free to turn when it is at a distance from said blow head and from said blow mold.

44. In a machine for making molded articles, a rotary carrier, a blow mold thereon, a vertically movable slide mounted to turn with the carrier and supported thereby, an invertible head mounted to turn on said slide, a blank mold and a neck mold carried by said head and adjacent to, but out of contact with, said blow mold when the slide is at the lowermost position of its movement and stationary cam mechanism to move the slide vertically up and down, and to turn the head, as the carrier rotates.

45. In a machine for making molded articles, a traveling carrier, a blow mold thereon, a slide movable in unison with the carrier and also movable toward and from said blow mold, co-operating mold mechanism carried by said slide, the latter in its lowermost position resting on the carrier and holding said co-operating mold mechanism adjacent to the blow mold but clear of supporting engagement therewith, and stationary cam mechanism for moving the said slide away from and toward said carrier during the travel of the carrier.

46. In a machine for making molded articles, a traveling carrier, a blow mold thereon, a slide movable in unison with the carrier and also movable relatively thereto toward and from the blow mold, co-operating mold mechanism carried by said slide, and means whereby the travel of the carrier will cause the said co-operating mold mechanism to move toward and from the blow mold without at any time coming into contact with said blow mold.

47. In a machine for making molded articles, a blow mold, a blow head located above said mold, a slide movable up and down between said blow mold and said blow head, an invertible head mounted to turn on said slide, blank mold mechanism carried by said invertible head, upper and lower air supply members adjacent to the blow head and to the blow mold respectively, and means carried by said invertible head and adapted to connect with the respective supply members in the uppermost and the lowermost position of said invertible head.

48. In a machine for making molded articles, a separable blow mold, and an air nozzle disposed axially below said mold and arranged to discharge cooling air both while the mold is closed and while it is open.

49. In a machine for making molded articles, a blow mold, and an air-discharge nozzle arranged axially below said mold.

50. In a machine for making molded articles, a separable blow mold, means for opening and closing it, and a device for discharging air against the mold while it is closed and against the molded article after the mold has been opened.

51. In a machine for making molded articles, a blow mold, a separable neck mold movable toward and from the blow mold, a separable blank mold movable in unison with the neck mold but having an opening and closing movement independently of the neck mold, conduits adapted to discharge cooling air against the blank mold and against the blow mold respectively, and valve mechanism, operated by the movement of the neck mold toward and from the blow mold, for governing the passage of air through said conduits.

52. In a machine for making molded articles, a blow mold, a carrier movable toward and from said mold, a neck mold and a blank mold on said carrier, conduits adapted to discharge air against the blank mold and against the blow mold respectively, and valve mechanism, operated by the movement of the carrier toward and from the blow mold for governing the passage of air through said conduits.

53. In a machine for making molded articles, a blow mold, a carrier movable toward and from said mold, a neck mold and a blank mold on said carrier, conduits adapted to discharge air against the blank mold and against the blow mold respectively, a common supply means for said conduits, and valve means, operated by the movement of the carrier toward and from the blow mold, for shifting the connection of said supply means alternately to one conduit and the other.

54. In a machine for making molded articles, a blow mold, a carrier movable toward and from the blow mold, co-operating mold mechanism mounted on said carrier, and means, operated by the movement of the carrier toward the blow mold, for blowing air against said co-operating mold mechanism.

55. In a machine for making molded articles, a blow mold, a carrier movable toward and from said mold, a separable blank mold mounted on said carrier and adapted to have its sections move at each side of the blow mold, and nozzles located at each side of the blow mold and adapted to discharge air against the blank mold sections.

56. In a machine for making molded articles, a blow mold, a carrier movable toward and from said mold, a separable blank mold mounted on said carrier and adapted to have its sections move at each side of the blow mold, nozzles located at each side of the blow mold, in line with the blank mold sections when open, and means operated by the movement of the carrier toward the blow mold, for discharging air through said nozzles.

57. In a machine for making molded articles, a traveling carrier, a base having air-blowing connections adjacent to a portion of the carrier path, and mold mechanism mounted on said carrier and arranged to receive cooling air from said connections at said portion of the carrier path.

58. In a machine for making molded articles, a blow mold, a blow head above said mold, a carrier movable up and down between said blow head and said blow mold, co-operating mold mechanism on said carrier, upper and lower air supply members adjacent to the blow head and to the blow mold respectively, blowing means associated with said co-operating mold mechanism and adapted to connect with the respective supply members when the carrier is in its uppermost and in its lowermost positions, blowing means associated with said blow head, and valve mechanism comprising a casing having an air-supply connection and three delivery connections leading respectively to said upper and lower supply members and to said blow head, and a controlling valve member movable in said casing.

59. In a machine for making molded articles, a blow mold, a blow head above said mold, a carrier movable up and down between said blow head and said blow mold, co-operating mold mechanism on said carrier, upper and lower air supply members adjacent to the blow head and to the blow mold respectively, blowing means associated with said co-operating mold mechanism and adapted to connect with the respective supply members when the carrier is in its uppermost and in its lowermost positions, blowing means associated with said blow head, and valve mechanism comprising a casing having an air-supply connection and three delivery connections leading respectively to said upper and lower supply members and to said blow head, and a controlling valve member movable in said casing, said valve member having a passage for connecting said supply connection with any one of the three delivery connections, and also having an exhaust duct adapted to register with the delivery connection leading to the upper supply member.

60. In a machine for making molded articles, a blow mold, a blow head above said mold, a carrier movable up and down between said blow head and said blow mold, co-operating mold mechanism on said carrier, upper and lower air supply members adjacent to the blow head and to the blow mold respectively, blowing means associated with said co-operating mold mechanism and adapted to connect with the respective supply members when the carrier is in its uppermost and in its lowermost positions, blowing means associated with said blow head, and valve mechanism comprising a casing having an air-supply connection and three delivery connections leading respectively to said upper and lower supply members and to said blow head, and a controlling valve member movable in said casing, said valve member having a passage for connecting said supply connection with any one of the three delivery connections, and also having an exhaust duct adapted to register with the delivery connections leading to the blow head and to the upper supply member respectively.

61. In a glass forming machine, the combination of a mold open at its upper end to receive a charge of glass, a guide directly over the mold and spaced therefrom, and a head movable laterally in a horizontal direction into and out of an operative position between said guide and mold.

62. In a glass forming machine, the combination of a mold open at its upper end to receive a charge of glass, a guide above the mold and spaced therefrom, a mold closing head, and automatic means to move said head horizontally into and out of mold closing position beneath the guide.

63. In a machine for making molded articles, a traveling blow mold, a neck mold moving in unison with said blow mold and also movable vertically, a blank mold also mounted to travel in unison with said blow mold and cooperable with said neck mold to form a blank, means for forming a blank in said blank mold and said neck mold, means for opening said blank mold after the formation of a blank and at a position of said blank and neck molds in which the blank will be upright, means for lowering the upright blank by its neck to a position within said blow mold, means for then closing said blow mold about said upright blank, and means for admitting blowing pressure into the interior of said blank to expand it to final form in said blow mold.

64. In a machine for making molded articles, a traveling blow mold, a neck mold moving in unison with said blow mold and also movable vertically, a blank mold also mounted to travel in unison with said blow mold and cooperable with said neck mold to form a blank, means for forming a blank in said blank mold and neck mold, means for opening said blank mold after the formation of a blank and at a position of said blank and neck molds in which the blank will depend vertically from said neck mold, means for then lowering said neck mold to move the depending blank to a position within said blow mold, means for then closing said blow mold about said depending blank, and means for admitting air into the interior of said blank through said neck mold to expand the blank to final form in said blow mold.

65. In a machine for making molded articles, a continuously traveling blow mold, a neck mold moving in unison with said blow mold and also movable vertically, a blank mold also mounted to travel in unison with said blow mold and cooperable with said neck mold to form a blank, means for forming a blank in said blank mold and neck mold, stationary cam means for opening said blank mold after the formation of a blank and at a position of said blank and neck molds in which the blank will depend vertically from said neck mold, stationary cam means for lowering said neck mold to move the depending blank to a position within said blow mold, stationary cam means for thereafter closing said blow mold about said depending blank, and means for thereafter admitting blowing air into the interior of said blank through said neck mold to expand the blank to final form in said blow mold.

66. In a machine for making molded articles, an annular base member, a continuously rotating support mounted on said base member, a plurality of blow molds each comprising separable portions and disposed about the periphery of said support adjacent to the lower part thereof, a corresponding number of vertical guide members mounted on said support, a slide carrying a neck mold mounted for vertical movement on each of said guide members, a cam roller vertically adjustably mounted on each of said slides, a stationary cam on said base member with which said rollers cooperate for moving said slides vertically, a blank mold mounted for continuous rotation with said support and cooperation with each of said neck molds, means for forming blanks in said neck molds and cooperating blank molds when said slides are adjacent to the upper end of their vertical paths of travel, stationary cam means for thereafter opening said blank molds and at a position of said blank and neck molds in which the blanks will depend vertically from said neck molds, the first named stationary cam having a contour such that said slide and neck molds are thereafter lowered along said guides to move the depending blanks to a position between the then open portions of said blow molds, a stationary cam mounted on said base member, means mechanically inter-connecting the last-named cam with said blow molds, said last-named cam having a contour such as to close the portions of said blow molds successively after the blanks are respectively positioned there-between, and means for thereafter admitting blowing pressure into the interior of said blanks through said neck molds for expanding the blanks successively to final form in said blow molds.

67. In a machine for making molded articles, a blow mold, a carrier movable up and down above said mold, blank mold mechanism mounted on said carrier, a member slidable at right angles to the direction of up and down movement of said carrier and operatively connected with said mechanism, a rock shaft extending parallel to the path of said carrier, and a crank arm held to turn with said rock shaft but adapted to slide lengthwise thereof as the carrier moves up and down, said crank arm engaging said member to slide it as aforesaid.

68. In a machine for making molded articles, a blow mold, a carrier movable up and down above said mold, blank mold mechanism mounted on said carrier, a member also mounted on said carrier but slidable in a direction at right angles to the direction of movement thereof and operatively connected with said blank mold mechanism, a rock shaft extending parallel to the path of said carrier, and a crank arm held to turn with said rock shaft, but adapted to slide lengthwise thereof as the carrier moves up and down, said crank arm having a forked end embracing said member and movable in unison therewith in the direction of movement of said member as well as up and down.

69. In a machine for making molded articles, a continuously rotating carrier, a series of blow molds mounted on said carrier adjacent to the lower portion thereof, a corresponding number of pairs of vertical guide members mounted on said carrier, a slide mounted for vertical up and down movement on each of said pairs of guide members, a blank mold carried by each of said slides, a radially movable member mounted in each of said slides and operatively connected with said blank mold to open and close them, a plurality of rods respectively associated with each of said guides and blow molds and mounted for movement with said carrier but rockable with respect thereto and extending parallel to said guides, a crank feathered on each of said rods and operatively connected with each of said members to impart opening and closing movements to said blank molds from rocking movements of said rods respectively, and a stationary cam mechanism for rocking said rods to successively operate said blank molds.

70. In a machine for making molded articles, a blow mold, a blank mold normally positioned in vertical alignment therewith, means for forming a blank in said blank mold, means to open said blank mold in a position thereof in which the blank will be neck uppermost and in axial alignment with said blow mold, means to lower the blank by its neck into said blow mold, and means to expand said blank to final form in said blow mold.

71. In a machine for making molded articles, a rotatable support, a blow mold carried thereby adjacent to the lower portion thereof, a blank mold also carried by said support and normally positioned in vertical alignment with said blow mold, means for forming a blank in said blank mold, means to open said blank mold in a position thereon in which the blank will be neck uppermost and in axial alignment with said blow mold, means to lower the blank by its neck into said blow mold, and means to expand said blank to final form in said blow mold.

72. In a machine for making molded articles, a blank mold adapted to receive a charge of glass issuing downwardly from a charge delivery means, means to raise and lower said blank mold toward and from said charge delivery means respectively, the mold being at its uppermost position at the time the charge of glass is delivered thereto, means to form said charge of glass into a blank, means to invert said mold and the glass therein, a blow mold, means to transfer the formed blank into said blow mold, and means to expand the blank to final form within said blow mold.

73. In a machine for making molded articles, a blank mold and a neck mold together adapted to receive a charge of glass issuing downwardly from a charge delivery means including a downwardly opening orifice in a container for molten glass, means to raise and lower said blank mold and said neck mold simultaneously toward and away from said orifice, the molds being in their uppermost position and with the neck mold positioned beneath the blank mold at the time the charge of glass is delivered thereto, means to form said charge of glass into a blank in said blank and neck molds, means to invert said molds and the glass therein, a blow mold, means to transfer the formed blank into said blow mold, and means to expand the blank to final form within said blow mold.

In testimony whereof I have signed this specification.

FRANK H. LOBB.

CERTIFICATE OF CORRECTION.

Patent No. 1,878,942.          September 20, 1932.

FRANK H. LOBB.

It is hereby certified that error appears in the printed specification of the above numbered patent requiring correction as follows: Page 1, line 37, after "support" insert the comma and words ", with parts in section"; and lines 39 and 40, strike out the words "with parts in section"; page 6, line 109, for "outer" read "inner"; page 7, line 91, strike out "(Fig. 21)" and insert the same after - 243" - in line 90; page 14, line 125, for "side" read "slide"; page 20, lines 123 and 130, for "Fig. 3" read "Fig. 2"; page 24, line 85, after "cam" insert the word "member"; and line 118, for "cut" read "occur"; page 30, line 2, claim 43, after "turning" insert the words "of said head"; and line 4, strike out the words "of said head" and insert a "comma"; and that the said Letters Patent should be read with these corrections therein that the same may conform to the record of the case in the Patent Office.

Signed and sealed this 20th day of December, A. D. 1932.

(Seal)

M. J. Moore,
Acting Commissioner of Patents.

the blank will be neck uppermost and in axial alignment with said blow mold, means to lower the blank by its neck into said blow mold, and means to expand said blank to final form in said blow mold.

72. In a machine for making molded articles, a blank mold adapted to receive a charge of glass issuing downwardly from a charge delivery means, means to raise and lower said blank mold toward and from said charge delivery means respectively, the mold being at its uppermost position at the time the charge of glass is delivered thereto, means to form said charge of glass into a blank, means to invert said mold and the glass therein, a blow mold, means to transfer the formed blank into said blow mold, and means to expand the blank to final form within said blow mold.

73. In a machine for making molded articles, a blank mold and a neck mold together adapted to receive a charge of glass issuing downwardly from a charge delivery means including a downwardly opening orifice in a container for molten glass, means to raise and lower said blank mold and said neck mold simultaneously toward and away from said orifice, the molds being in their uppermost position and with the neck mold positioned beneath the blank mold at the time the charge of glass is delivered thereto, means to form said charge of glass into a blank in said blank and neck molds, means to invert said molds and the glass therein, a blow mold, means to transfer the formed blank into said blow mold, and means to expand the blank to final form within said blow mold.

In testimony whereof I have signed this specification.

FRANK H. LOBB.

CERTIFICATE OF CORRECTION.

Patent No. 1,878,942.  September 20, 1932.

FRANK H. LOBB.

It is hereby certified that error appears in the printed specification of the above numbered patent requiring correction as follows: Page 1, line 37, after "support" insert the comma and words ", with parts in section"; and lines 39 and 40, strike out the words "with parts in section"; page 6, line 109, for "outer" read "inner"; page 7, line 91, strike out "(Fig. 21)" and insert the same after - 243" - in line 90; page 14, line 125, for "side" read "slide"; page 20, lines 123 and 130, for "Fig. 3" read "Fig. 2"; page 24, line 85, after "cam" insert the word "member"; and line 118, for "cut" read "occur"; page 30, line 2, claim 43, after "turning" insert the words "of said head"; and line 4, strike out the words "of said head" and insert a "comma"; and that the said Letters Patent should be read with these corrections therein that the same may conform to the record of the case in the Patent Office.

Signed and sealed this 20th day of December, A. D. 1932.

(Seal)

M. J. Moore,
Acting Commissioner of Patents.

CERTIFICATE OF CORRECTION.

Patent No. 1,878,942.  September 20, 1932.

FRANK H. LOBB.

It is hereby certified that error appears in the printed specification of the above numbered patent requiring correction as follows: Page 1, line 37, after "support" insert the comma and words ", with parts in section"; and lines 39 and 40, strike out the words "with parts in section"; page 6, line 109, for "outer" read "inner"; page 7, line 91, strike out "(Fig. 21)" and insert the same after - 243" - in line 90; page 14, line 125, for "side" read "slide"; page 20, lines 123 and 130, for "Fig. 3" read "Fig. 2"; page 24, line 85, after "cam" insert the word "member"; and line 118, for "cut" read "occur"; page 30, line 2, claim 43, after "turning" insert the words "of said head"; and line 4, strike out the words "of said head" and insert a "comma"; and that the said Letters Patent should be read with these corrections therein that the same may conform to the record of the case in the Patent Office.

Signed and sealed this 20th day of December, A. D. 1932.

M. J. Moore,
Acting Commissioner of Patents.

(Seal)